(12) United States Patent
Elford

(10) Patent No.: US 12,412,007 B2
(45) Date of Patent: Sep. 9, 2025

(54) SYSTEM AND METHOD FOR GENERATING A PANEL INFILL GEOMETRY OF A SANDWICH PANEL

(71) Applicant: The Boeing Company, Chicago, IL (US)

(72) Inventor: Michael C. Elford, Springfield (AU)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/933,059

(22) Filed: Sep. 16, 2022

(65) Prior Publication Data

US 2024/0095423 A1  Mar. 21, 2024

(51) Int. Cl.
*G06F 30/23* (2020.01)
*B33Y 50/02* (2015.01)
(Continued)

(52) U.S. Cl.
CPC .............. *G06F 30/23* (2020.01); *G06F 30/10* (2020.01); *B33Y 50/02* (2014.12); *B33Y 80/00* (2014.12); *G06F 2113/10* (2020.01)

(58) Field of Classification Search
CPC ........ G06F 30/23; G06F 30/25; G06F 30/367; G06F 30/398; G06F 30/10; G06F 30/00; G06F 2113/10; G06F 30/17; G06F 30/12; G06F 30/20; G06F 30/13; G06F 2113/26; G06F 2113/28; B33Y 50/02; B33Y 80/00; B32B 3/02; B32B 3/263
See application file for complete search history.

(56) References Cited

U.S. PATENT DOCUMENTS

| 4,757,665 A | 7/1988 | Hardigg |
| 6,207,256 B1 | 3/2001 | Tashiro |
| (Continued) | | |

FOREIGN PATENT DOCUMENTS

EP   3034208   6/2016

OTHER PUBLICATIONS

Simsek, Ugur, et al. "Parametric studies on vibration characteristics of triply periodic minimum surface sandwich lattice structures." The International Journal of Advanced Manufacturing Technology 115 (2021): 675-690. (Year: 2021).*

(Continued)

*Primary Examiner* — Michael Edward Cocchi

(57) ABSTRACT

A method of generating a panel infill geometry of a sandwich panel, includes providing a driver mesh representing a panel mid-surface of a sandwich panel. The driver mesh is comprised of a plurality of quadrilateral elements. The method further includes providing a reference unit cell mesh configured to fit exactly within a cube. The reference unit cell mesh is comprised of a unit infill mesh interconnecting a pair of unit face sheet meshes. The method additionally includes mapping a plurality of the reference unit cell meshes respectively onto a plurality of hexahedral elements respectively associated with the plurality of quadrilateral elements, through the use of basis functions defined on each of the plurality of quadrilateral elements in a manner causing adjustment of the size and shape of the plurality of reference unit cell meshes to conform respectively to the plurality of hexahedral elements.

22 Claims, 50 Drawing Sheets

(51) Int. Cl.
  *B33Y 80/00*    (2015.01)
  *G06F 30/10*    (2020.01)
  *G06F 113/10*   (2020.01)

(56) References Cited

U.S. PATENT DOCUMENTS

| | | |
|---|---|---|
| 2004/0074206 A1 | 4/2004 | Tanase |
| 2013/0000247 A1 | 1/2013 | Sypeck |
| 2015/0017383 A1 | 1/2015 | Yang |
| 2015/0175210 A1 | 6/2015 | Raymond |
| 2019/0337220 A1 | 11/2019 | Beyerle |
| 2020/0272131 A1 | 8/2020 | Wang |
| 2021/0061495 A1 | 3/2021 | Aston |

OTHER PUBLICATIONS

Yang, Nan, et al. "Multi-morphology transition hybridization CAD design of minimal surface porous structures for use in tissue engineering." Computer-Aided Design 56 (2014): 11-21. (Year: 2014).*

Liu, Fei, et al. "Shell offset enhances mechanical and energy absorption properties of SLM-made lattices with controllable separated voids." Materials & Design 217 (2022): 110630. (Year: 2022).*

Ma, Xiangyu, et al. "A novel design method for TPMS lattice structures with complex contour based on moving elements method." (2022). (Year: 2022).*

Provaggi, Elena, et al. "3D printing assisted finite element analysis for optimising the manufacturing parameters of a lumbar fusion cage." Materials & Design 163 (2019): 107540. (Year: 2019).*

McCaw, John CS, and Enrique Cuan-Urquizo. "Curved-layered additive manufacturing of non-planar, parametric lattice structures." Materials & design 160 (2018): 949-963. (Year: 2018).*

Feng, Jiawei, et al. "Sandwich panel design and performance optimization based on triply periodic minimal surfaces." Computer-Aided Design 115 (2019): 307-322. (Year: 2019).*

Simsek Ugur et al: "Parametric studies on vibration characteristics of triply periodic minimum surface sandwich lattice structures", The International Journal of Advanced Manufacturing Technology, Springer, London, vol. 115, No. 3, Oct. 7, 2020, pp. 675-690.

Xiao Xiao et al: "Infill topology and shape optimisation of lattice-skin structures", Arxiv.org, Cornell University Library, 201 Olin Library Cornell University, Ithaca, NY 14853, Oct. 28, 2021.

EPO, Extended European Search Report for appl. No. 23182997.9, issued on Jan. 29, 2024.

Anderson et al., "Automated All-Quadrilateral Mesh Adaptation through Refinement and Coarsening," Proceedings of the 18th International Meshing Roundtable, Jan. 2009, pp. 557-574.

Rati Verma et al.: "Design and Analysis of Biomedical Scaffolds Using TPMS-Based Porous Structures Inspired from Additive Manufacturing", Coatings, vol. 12, No. 6, Jun. 15, 2022.

Ye Guo et al.: "Tetrahedron-Based Porous Scaffold Design for 3D Printing", Designs, vol. 3, No. 1, Feb. 18, 2019, pp. 1-17.

Elena Provaggi et al.: "3D printing assisted finite element analysis for optimising the manufacturing parameters of a lumbar fusion cage", Materials & Design, vol. 163, Dec. 6, 2018.

Fei Liu et al.: "Functionally graded porous scaffolds in multiple patterns: New design method, physical and mechanical properties", Materials & Design, Elsevier, Amsterdam, NL, vol. 160, Oct. 3, 2018.

Xiangyu Ma et al.: "A novel design method for TPMS lattice structures with complex contour based on moving elements method", Research Square, Mar. 5, 2022, pp. 1-18.

Marschall, David, et al.: "Boundary conformal design of laser sintered sandwich cores and simulation of graded lattice cells using a forward homogenization approach", Materials & Design, Elsevier, Amsterdam, NL, vol. 190, Feb. 7, 2020 (Feb. 7, 2020).

Jason Nguyen et al.: "Conformal Lattice Structure Design and Fabrication", Laboratory for Freeform Fabrication, Jan. 1, 2012, pp. 138-161.

Dong-Jin Yoo: "Computer-aided porous scaffold design for tissue engineering using triply periodic minimal surfaces", International Journal of Precision Engineering and Manufacturing, vol. 12, No. 1, Feb. 1, 2011, pp. 61-71.

Niu Jie et al.: "Numerical study on load-bearing capabilities of beam-like lattice structures with three different unit cells", International Journal of Mechanics and Materials in Design, Springer Netherlands, Dordrecht, vol. 14, No. 3, Jul. 26, 2017 (Jul. 26, 2017), pp. 443-460.

* cited by examiner

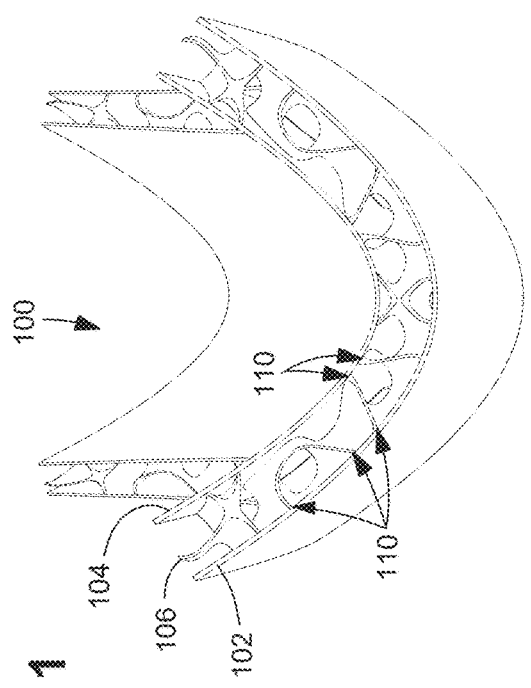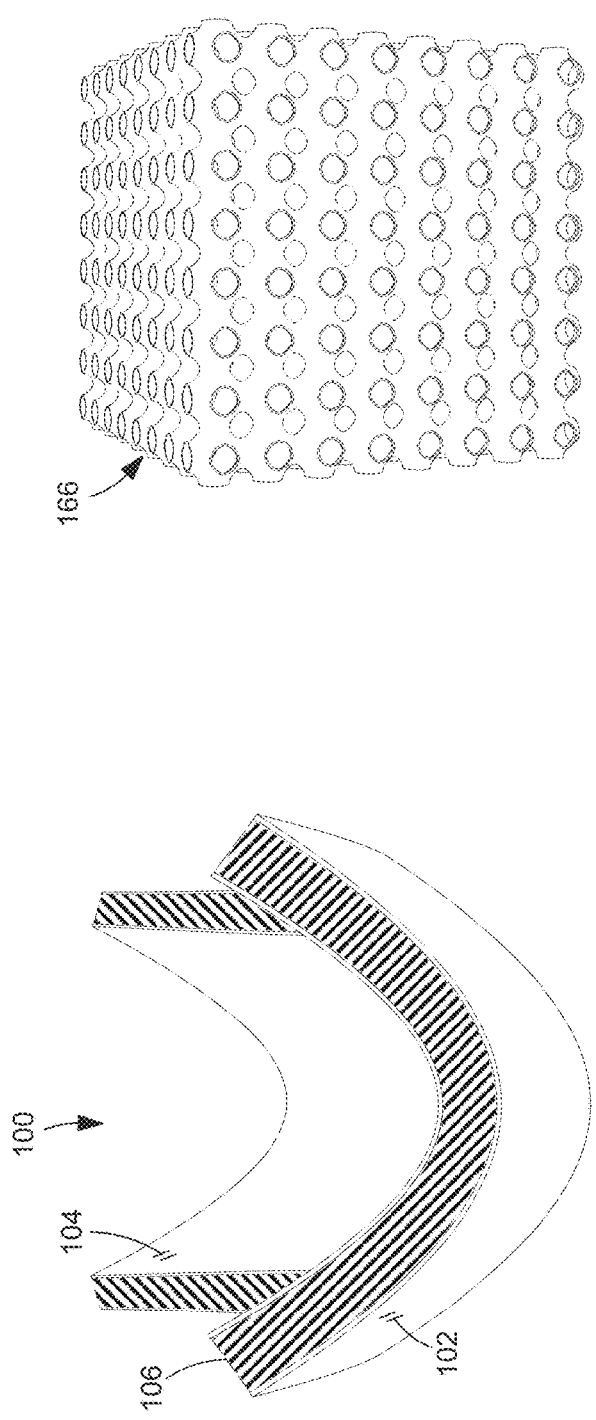

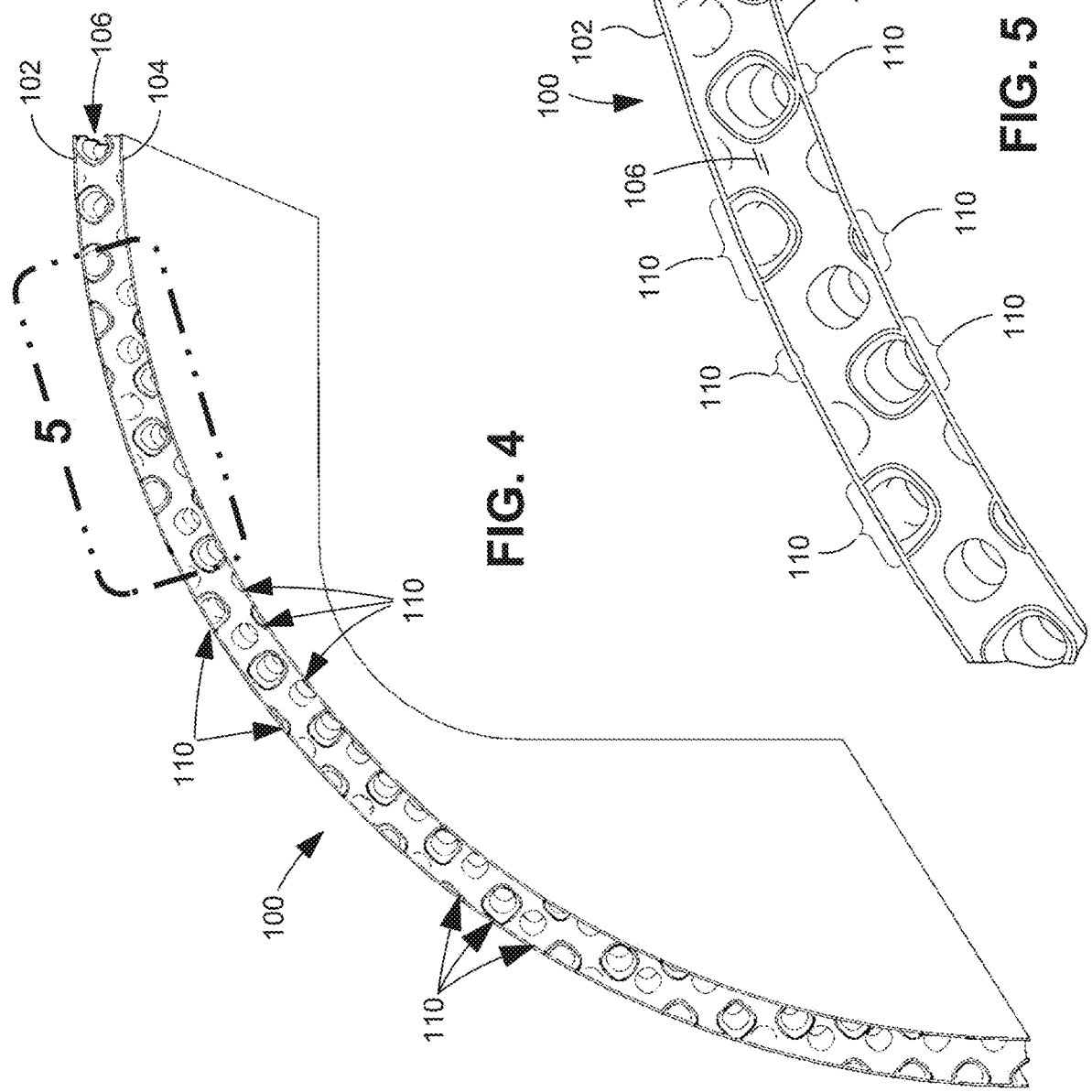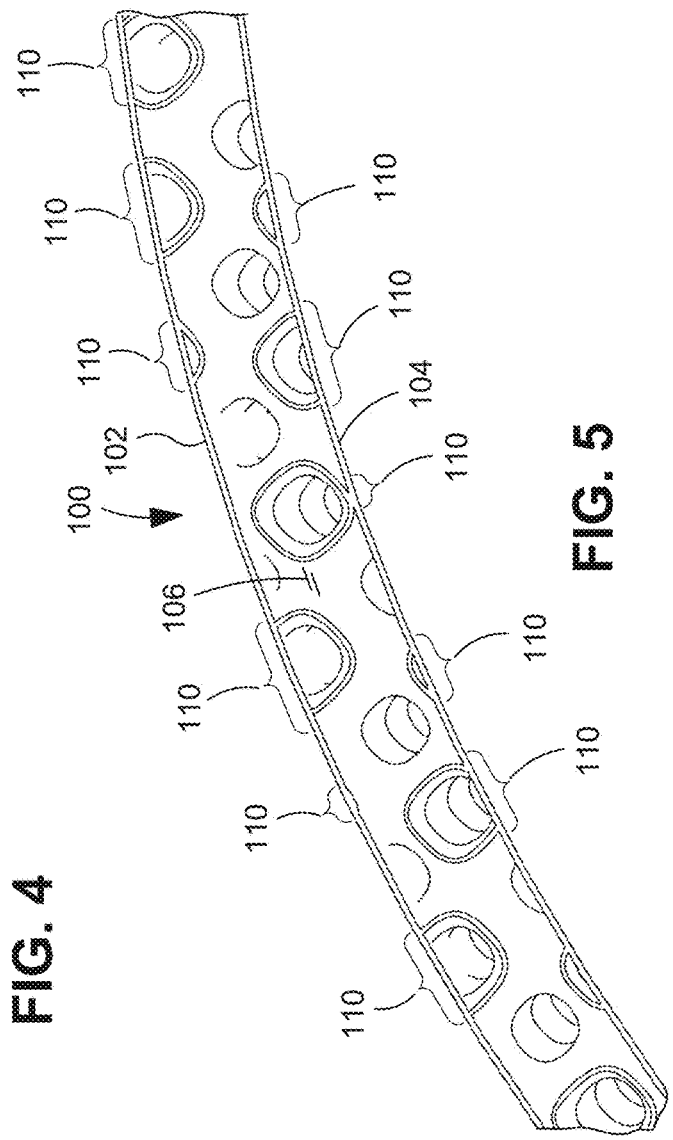

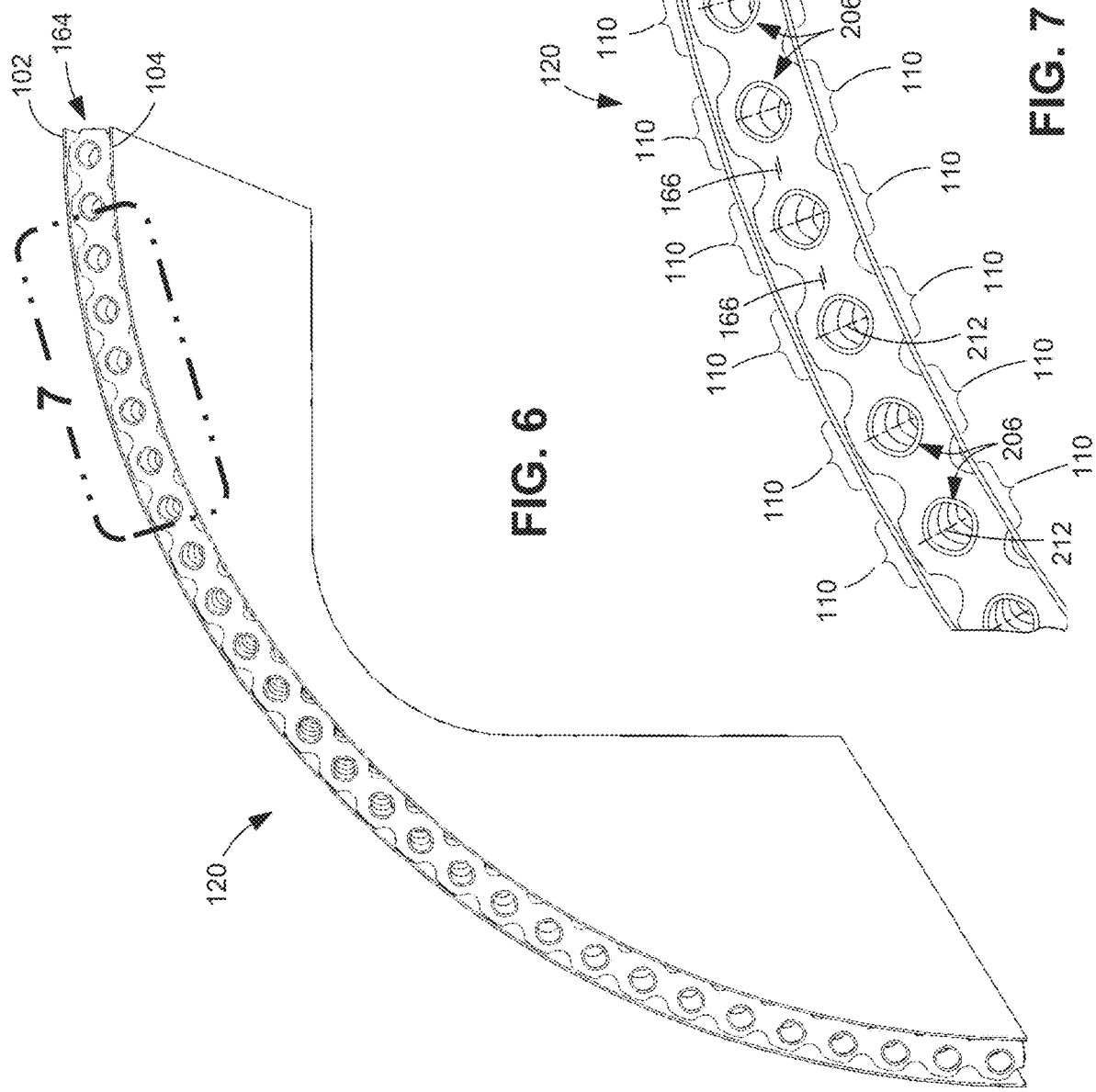

700

702 — PROVIDING A DRIVER MESH REPRESENTING A MID-SURFACE OF A SANDWICH PANEL, THE DRIVER MESH IS COMPRISED OF A PLURALITY OF QUADRILATERAL ELEMENTS

704 — PROVIDING A REFERENCE UNIT CELL MESH CONFIGURED TO FIT EXACTLY WITHIN A CUBE, THE REFERENCE UNIT CELL MESH IS COMPRISED OF A UNIT INFILL MESH INTERCONNECTING A PAIR OF UNIT FACE SHEET MESHES

706 — MAPPING A PLURALITY OF THE REFERENCE UNIT CELL MESHES RESPECTIVELY ONTO A PLURALITY OF HEXAHEDRAL ELEMENTS RESPECTIVELY ASSOCIATED WITH THE PLURALITY OF QUADRILATERAL ELEMENTS, THROUGH THE USE OF BASIS FUNCTIONS DEFINED ON EACH OF THE PLURALITY OF QUADRILATERAL ELEMENTS IN A MANNER CAUSING ADJUSTMENT OF THE SIZE AND SHAPE OF THE PLURALITY OF REFERENCE UNIT CELL MESHES TO CONFORM RESPECTIVELY TO THE PLURALITY OF HEXAHEDRAL ELEMENTS, AND RESULTING IN A PLURALITY OF MAPPED UNIT CELL MESHES COLLECTIVELY FORMING AN INFILL MESH HAVING AN INFILL GEOMETRY INTERCONNECTING A PAIR OF FACE SHEET MESHES OF A SANDWICH PANEL

708 — STITCHING TOGETHER THE MAPPED UNIT CELL MESHES TO FORM A STITCHED MESH, BY CHECKING PAIRS OF CELL MESH NODES FOR DUPLICATES, DELETING ONE OF THE DUPLICATES, AND UPDATING CELL INFORMATION TO REFER TO THE CELL MESH NODE THAT IS RETAINED

FIG. 8

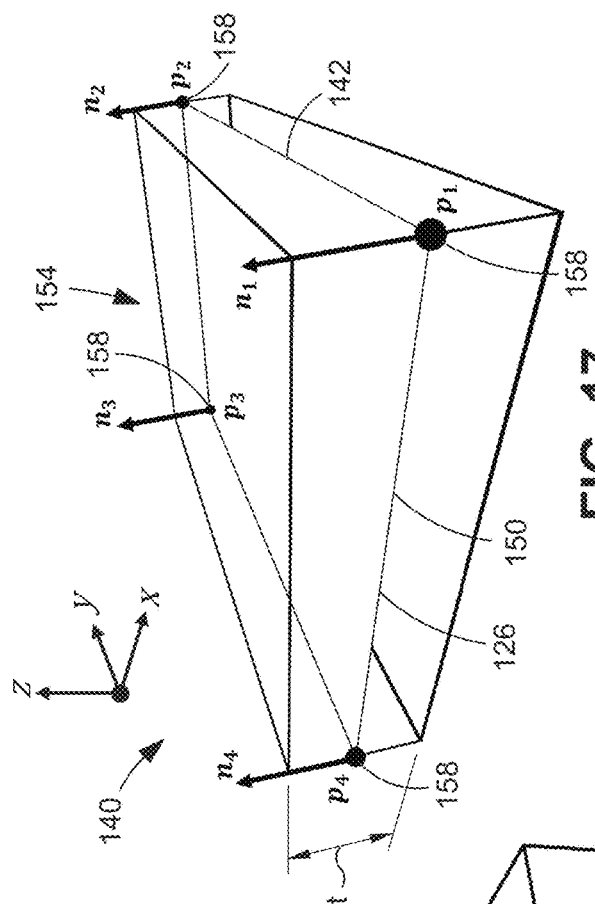
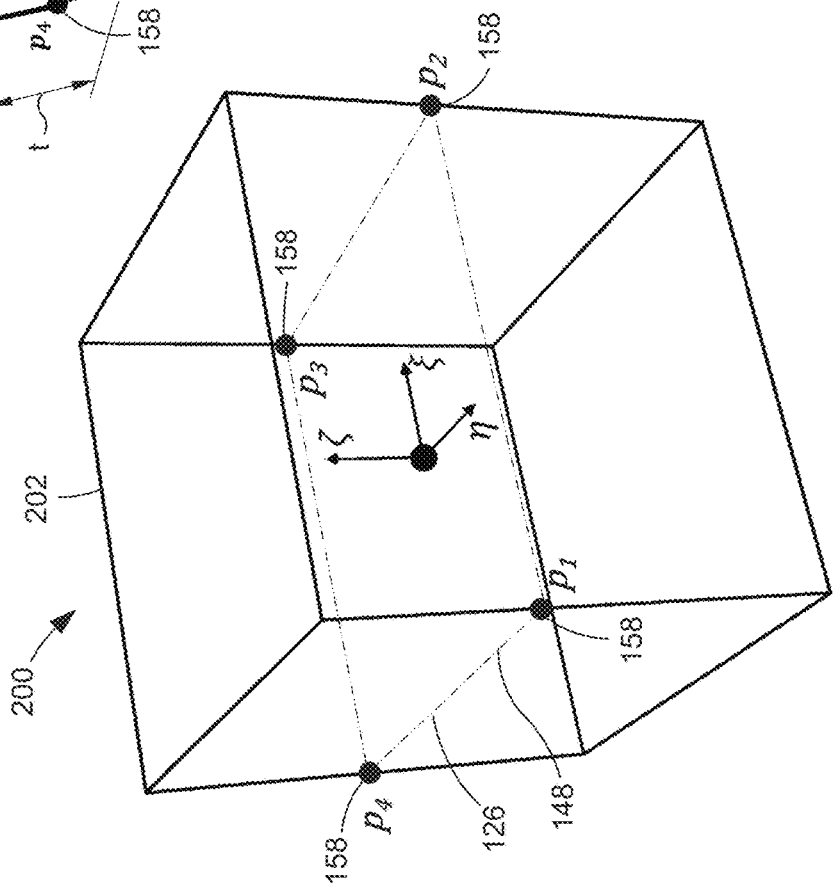
FIG. 17
FIG. 16

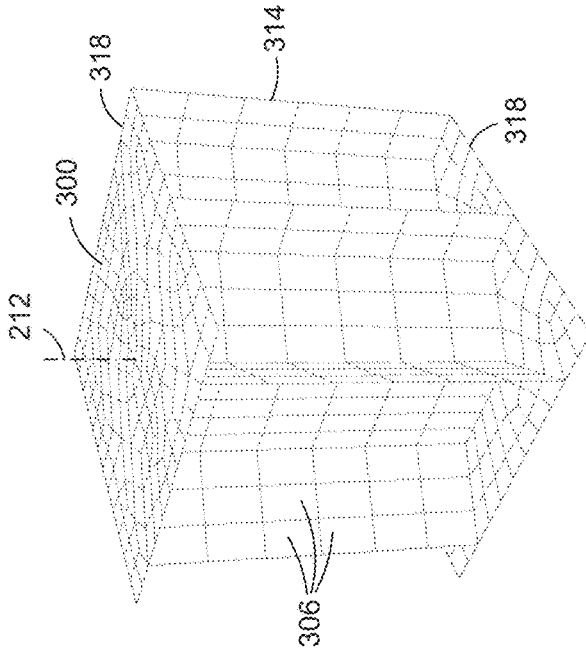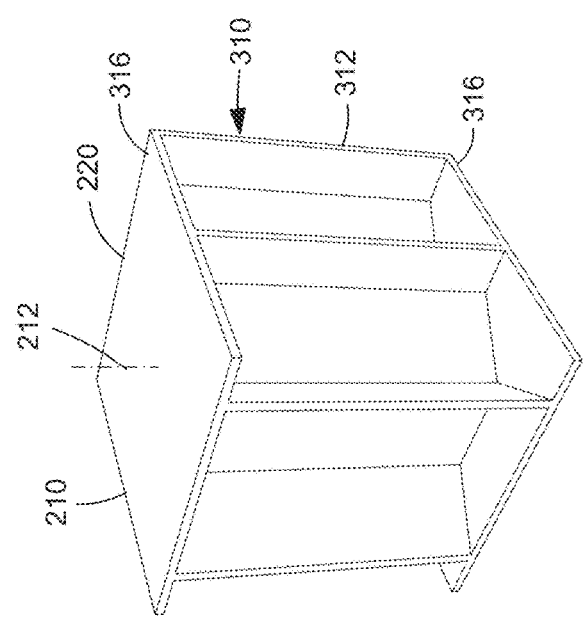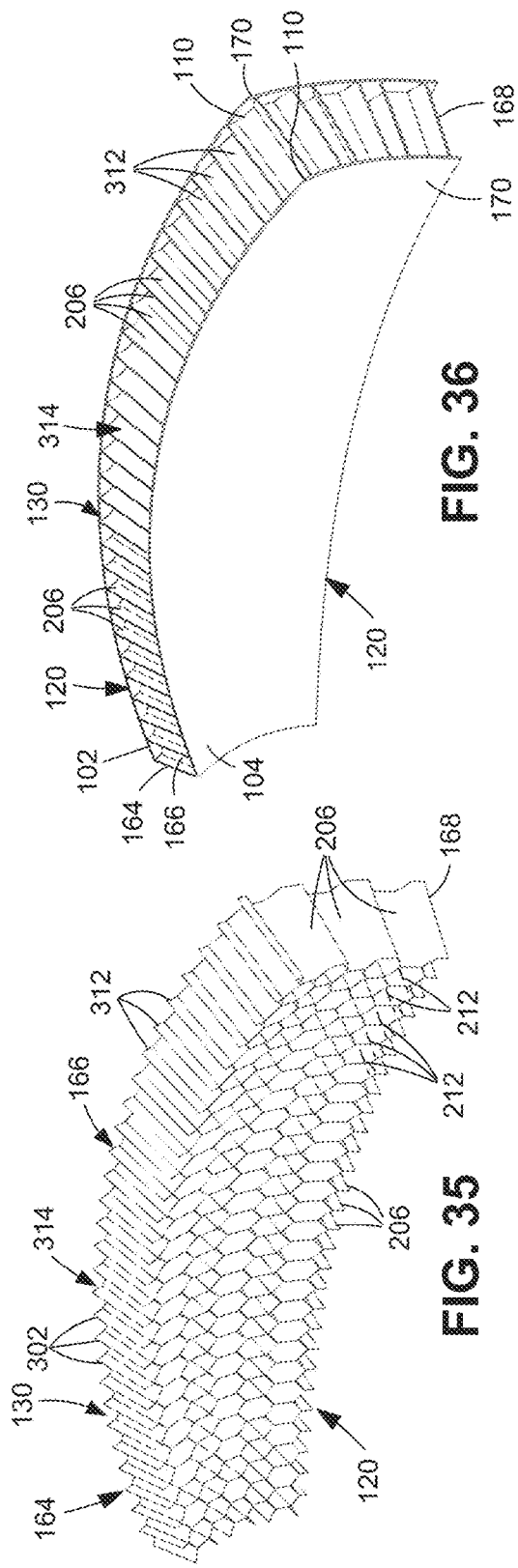
FIG. 33
FIG. 34
FIG. 35
FIG. 36

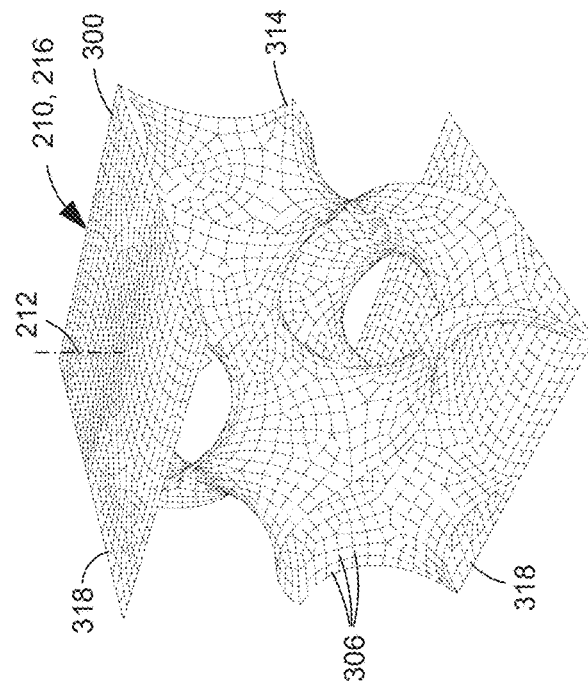
FIG. 38
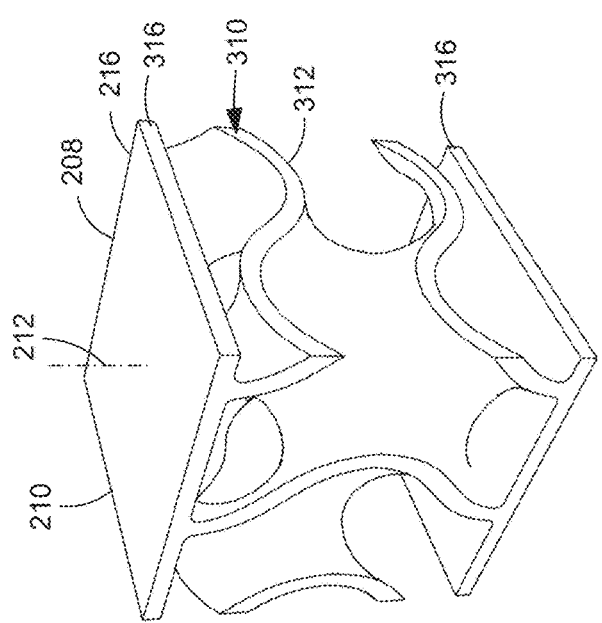
FIG. 37
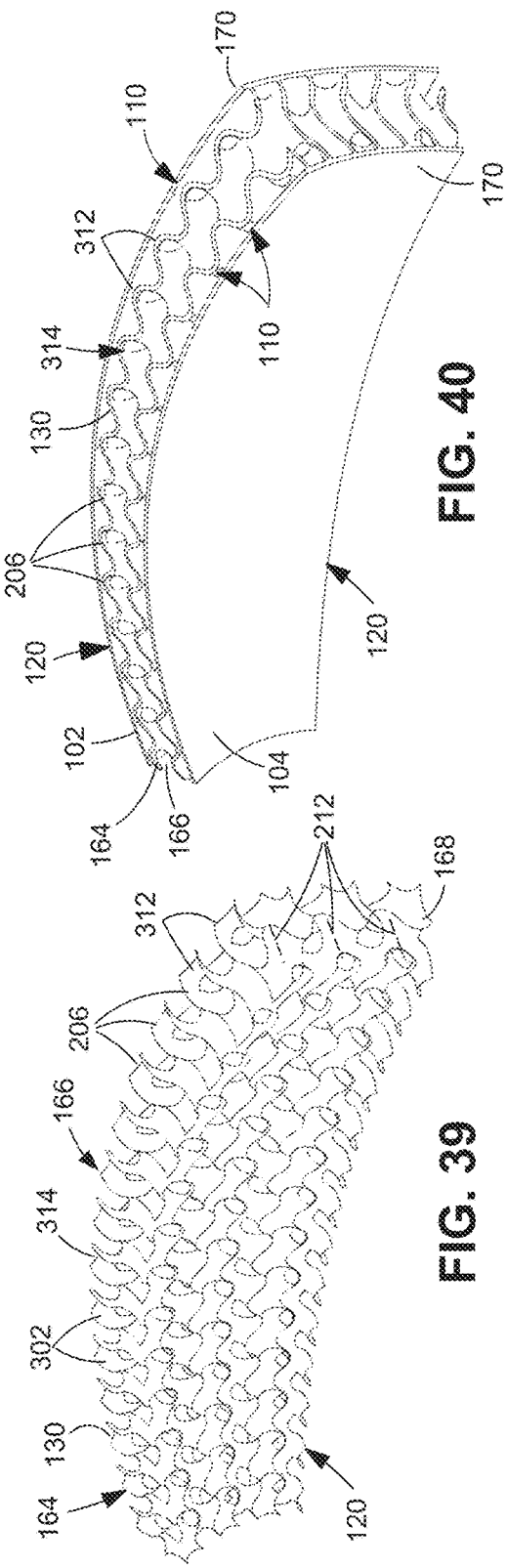
FIG. 40
FIG. 39

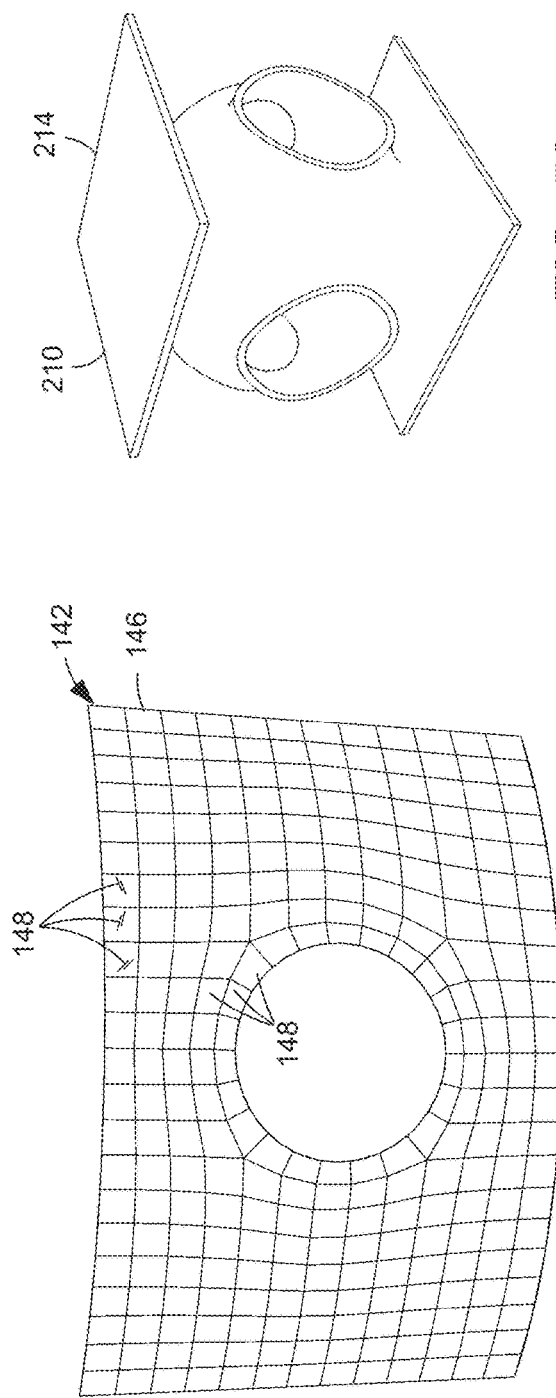
FIG. 57
FIG. 58
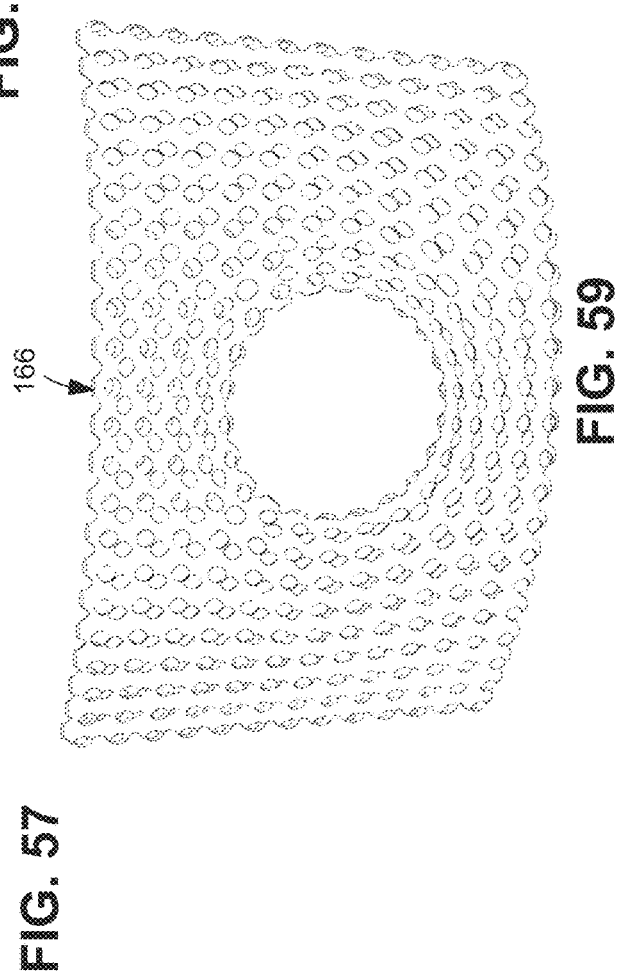
FIG. 59

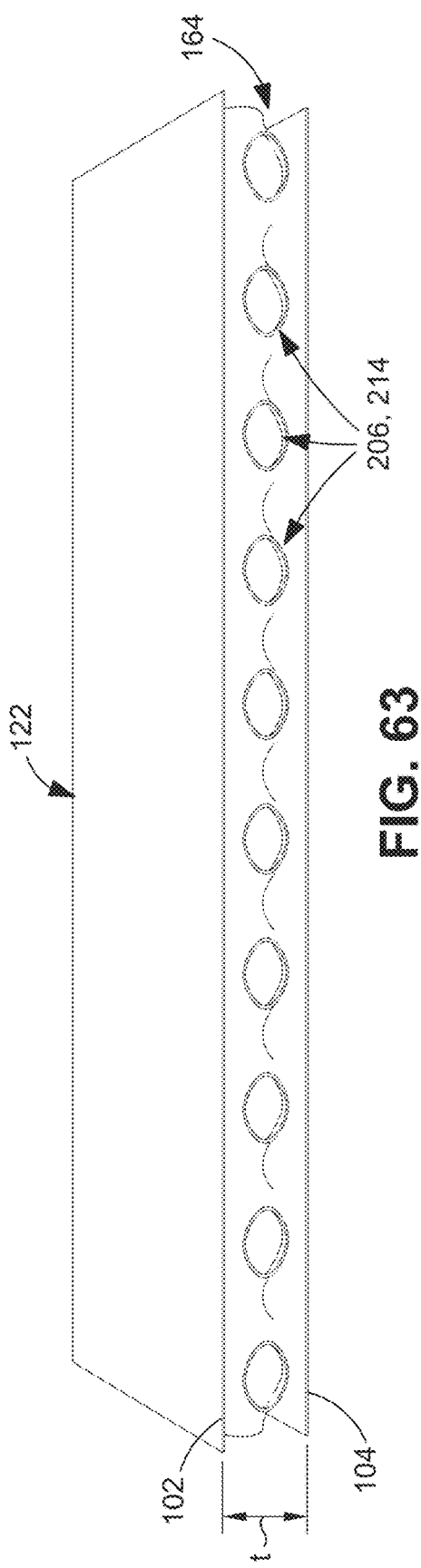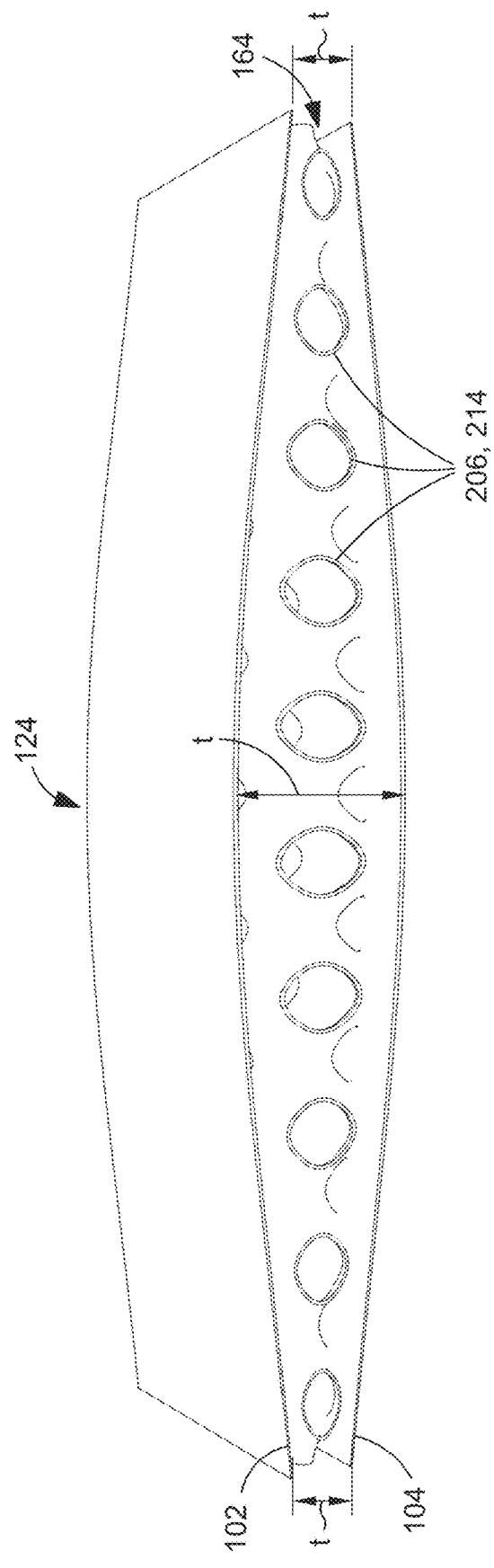

SYSTEM AND METHOD FOR GENERATING A PANEL INFILL GEOMETRY OF A SANDWICH PANEL

FIELD

The present disclosure relates generally to additive manufacturing and, more particularly, to a system and method for generating a panel infill geometry for an additively manufacturable sandwich panel.

BACKGROUND

A sandwich panel is a structure made up of a pair of face sheets, interconnected by an inner core. The inner core is typically a relatively lightweight material or a lightweight structural arrangement, and results in a lightweight panel having a relatively high specific bending stiffness. Sandwich panels can be fabricated using additive manufacturing, which involves the successive application and solidification of layers of material on top of each other.

The conventional process of additively manufacturing a sandwich panel involves fabricating the inner core based on a prior art infill geometry. A prior art infill geometry has an orthogonally-repeating structural pattern of uniform size and shape. During additive manufacturing, only the portion of the structural pattern that lies between the boundaries of the face sheets is fabricated. This may result in irregular and inconsistent topology at the interfaces between the inner core and the face sheets. The shape at certain interface locations can present manufacturing challenges, and/or can result in stress concentrations when the sandwich panel is loaded.

As can be seen, there exists a need in the art for a method of generating a panel infill geometry for an inner core of a sandwich panel in a manner that results in a consistent footprint pattern at the interface locations between the inner core and the face sheets.

SUMMARY

The above-noted needs associated with manufacturing sandwich panels are addressed by the present disclosure, which provides a method of generating a panel infill geometry for interconnecting a pair of face sheets of a sandwich panel. The method includes providing a driver mesh representing a panel mid-surface of a sandwich panel. The driver mesh is comprised of a plurality of quadrilateral elements. The method also includes providing a reference unit cell mesh configured to fit exactly within a cube. The reference unit cell mesh is comprised of a unit infill mesh interconnecting a pair of unit face sheet meshes. Additionally, the method includes mapping a plurality of the reference unit cell meshes respectively onto a plurality of hexahedral elements respectively associated with the plurality of quadrilateral elements, through the use of basis functions defined on each of the plurality of quadrilateral elements in a manner causing adjustment of the size and shape of the plurality of reference unit cell meshes to conform respectively to the plurality of hexahedral elements, and resulting in a plurality of mapped unit cell meshes collectively forming a panel infill mesh having a panel infill geometry interconnecting a pair of face sheet meshes.

Also disclosed is a processor-based system for generating a panel infill geometry for interconnecting a pair of face sheets of a sandwich panel. The processor-based system comprises a memory device configured to store a driver mesh representing a panel mid-surface of a sandwich panel. The driver mesh is comprised of a plurality of quadrilateral elements. The memory device is also configured to store a reference unit cell mesh configured to fit exactly within a cube. The processor-based system further comprises a unit cell mapping module configured to map a plurality of the reference unit cell meshes respectively onto a plurality of hexahedral elements respectively associated with the plurality of quadrilateral elements, through the use of basis functions defined on each of the plurality of quadrilateral elements in a manner causing adjustment of the size and shape of the plurality of reference unit cell meshes to conform respectively to the plurality of hexahedral elements, and resulting in a plurality of mapped unit cell meshes collectively forming a panel infill mesh having a panel infill geometry interconnecting a pair of face sheet meshes.

In addition, disclosed is a sandwich panel, comprising a first face sheet, a second face sheet, and a panel infill structure comprising an array of unit infill structures arranged in one or more layers connecting the first face sheet to the second face sheet, and each unit infill structure has a main axis that is locally normal to an imaginary mid-surface midway between the first face sheet and the second face sheet.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description, taken in conjunction with the accompanying drawings, which illustrate preferred and exemplary versions, but which are not necessarily drawn to scale. The drawings are examples, and are not meant as limitations on the description or the claims.

FIG. 1 is a perspective view of an example of sandwich panel, comprised of first and second face sheets, and an inner core;

FIG. 2 is a perspective view of an example of the orthogonal pattern of geometry from which the prior art infill geometry is generated;

FIG. 3 is a perspective view of the prior art sandwich panel of FIG. 1 showing the prior art infill geometry contained between the first and second face sheets;

FIG. 4 is a perspective view of a further example of a prior art sandwich panel having an inner core of prior art infill geometry;

FIG. 5 is a magnified view of the portion of the sandwich panel identified by reference numeral 5 of FIG. 4, illustrating the irregular and inconsistent topology at the interfaces between the inner core and the face sheets;

FIG. 6 is a perspective view of an example of a presently-disclosed sandwich panel comprised of a panel infill structure between first and second face sheets, and showing a plurality of unit cell structures that make up the panel infill structure;

FIG. 7 is a magnified view of the portion of the sandwich panel identified by reference numeral 7 of FIG. 6, illustrating the consistent topology at the interfaces between the panel infill structure and the first and second face sheets;

FIG. 8 is a flowchart of operations included in the method of generating a panel infill geometry of a panel infill structure of a sandwich panel;

FIG. 16 shows an example of a 2×2×2 cube in isoparametric space;

FIG. 17 shows an example of the cube of FIG. 16 mapped onto the hexahedral element associated with the linear quadrilateral element of FIG. 15;

FIG. 33 is a perspective view of an example of a unit cell geometry configured as a honeycomb;

FIG. 34 is a perspective view of a reference unit cell mesh comprised of shell elements, and representing the reference unit cell geometry of FIG. 33;

FIG. 35 is a perspective view of a sandwich panel mesh (shown without the face sheet meshes) comprised of shell elements, and generated using the reference unit cell mesh of FIG. 34, mapped onto the hexahedral elements respectively associated with the quadrilateral elements of the driver mesh of FIG. 32;

FIG. 36 is a perspective view of a sandwich panel mesh comprised of solid elements, and generated using a solid meshed version (not shown) of the reference unit cell geometry of FIG. 33, mapped onto the hexahedral elements respectively associated with the quadrilateral elements of the driver mesh of FIG. 32;

FIG. 37 is a perspective view of an example of a reference unit cell mesh configured as a gyroid;

FIG. 38 is a perspective view of a reference unit cell mesh comprised of shell elements, and representing the reference unit cell geometry of FIG. 37;

FIG. 39 is a perspective view of a sandwich panel mesh (shown without the face sheet meshes) comprised of shell elements, and generated using the reference unit cell mesh of FIG. 38, mapped onto the hexahedral elements respectively associated with the quadrilateral elements of the driver mesh of FIG. 32;

FIG. 40 is a perspective view of a sandwich panel mesh comprised of solid elements, and generated using a solid meshed version of the reference unit cell geometry (see FIG. 13) of FIG. 37, mapped onto the hexahedral elements respectively associated with the quadrilateral elements of the driver mesh of FIG. 32;

FIG. 57 is a perspective view of an example of an unstructured driver mesh;

FIG. 58 is a perspective view of an example of a unit cell geometry in a Schwarz-P configuration;

FIG. 59 is a perspective view of an example of a sandwich panel mesh (shown without the panel face sheet meshes) comprised of shell elements, and generated using the reference unit cell mesh of FIG. 58, mapped onto the hexahedral elements respectively associated with the quadrilateral elements of the unstructured driver mesh of FIG. 57;

FIG. 63 is a perspective view of an example of a constant-thickness sandwich panel having a panel infill geometry based on a Schwarz-P configuration of the unit cell geometry;

FIG. 64 is a perspective view of an example of a variable-thickness sandwich panel having a panel infill geometry based on the Schwarz-P configuration of the unit cell geometry;

Figure 9:
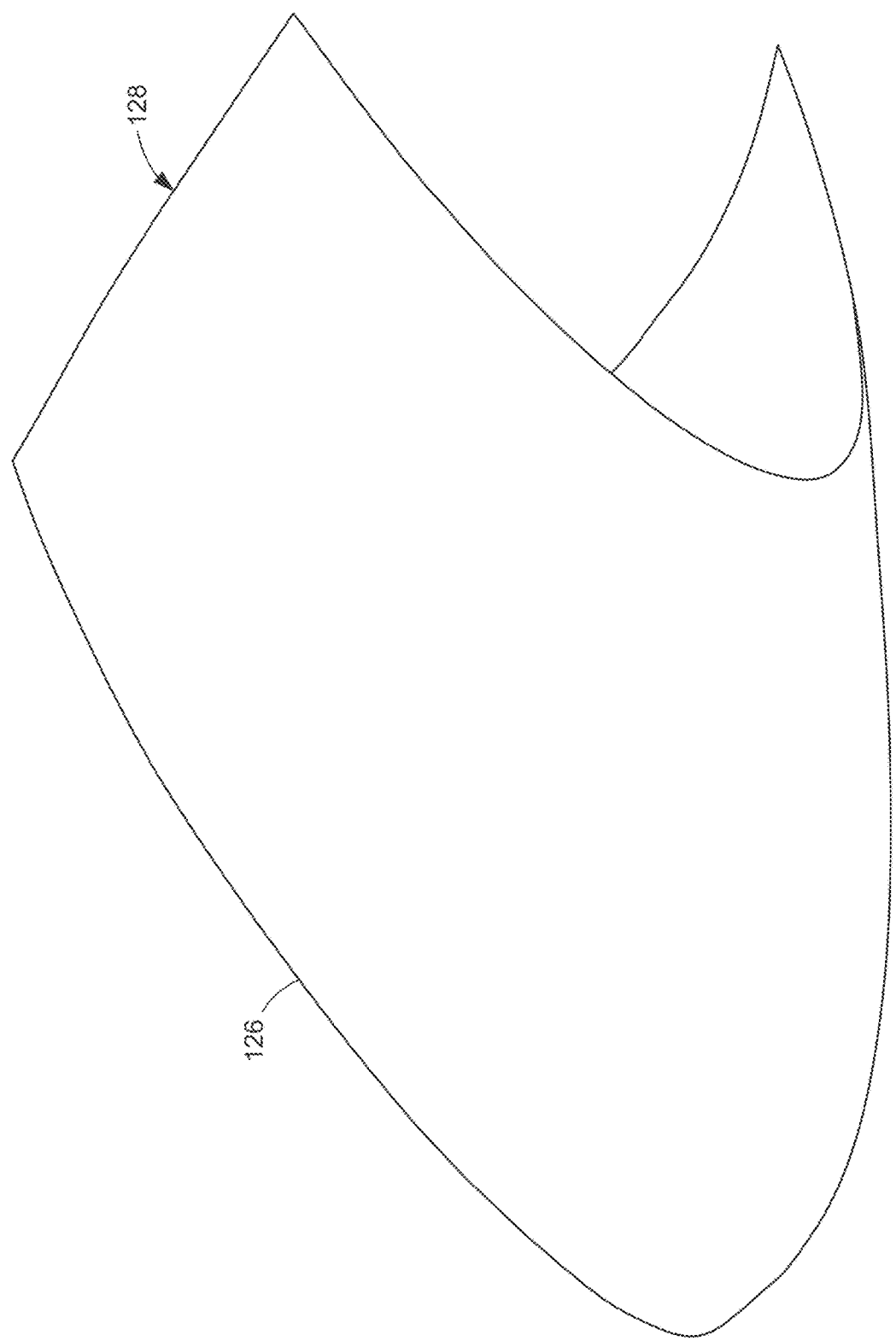
FIG. 9 is a perspective view of an example of a digital model (e.g., a 3D computer-aided-design (CAD) model) of a panel mid-surface between first and face sheets of a sandwich panel.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed examples are shown.

Indeed, several different examples or versions may be provided and should not be construed as limited to the examples set forth herein. Rather, these examples are provided so that this disclosure will be thorough and fully convey the scope of the disclosure to those skilled in the art.

This specification includes references to "some examples," "one example," or "an example." Instances of the phrases "some examples," "one example" or "an example" do not necessarily refer to the same example. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently included.

As used herein, an element or step recited in the singular and preceded by the word "a" or "an" should be understood as not necessarily excluding the plural of the elements or steps.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Referring now to the drawings, shown in FIG. 1 is an example of a prior art sandwich panel 100, which has a first face sheet 102, a second face sheet 104, and an inner core 106 (indicated as a cross-hatched region), as shown in FIG. 3. The inner core 106 has a prior art infill geometry 166, which has an orthogonally repeating structural pattern of uniform size and shape. In preparation for additively manufacturing the prior art sandwich panel 100, conventional software computes the portion of the structural pattern that lies between the boundaries of the first and second face sheets 102, 104. As shown in FIG. 3, this results in irregular shapes with inconsistent topology at the infill/face sheet interfaces 110 between the inner core 106 and the first and second face sheets 102, 104 of the additively manufactured prior art sandwich panel 100. As mentioned above, the shape of certain infill/face sheet interface 110 locations can result in localized stress concentrations. FIGS. 4-5 show another example of a prior art sandwich panel 100, and the irregular and inconsistent topology at the infill/face sheet interfaces 110 between the inner core 106 and the first and second face sheets 102, 104.

Referring now to FIGS. 6-7, shown is an example of a sandwich panel 120 fabricated using the presently disclosed system and method. The sandwich panel 120 of FIGS. 6-7 is comprised of a first face sheet 102, a second face sheet 104, and a panel infill structure 164 comprised of a plurality of unit cell structures 206. As described in greater detail below, the panel infill structure 164 has a panel infill geometry 166 in which each unit cell structure 206 has a main axis 212 that is locally normal to an imaginary mid-surface (not shown) midway between the first and second face sheets 102, 104. Advantageously, such an arrangement results in a consistent topology at the infill/face sheet interfaces 110 between the panel infill structure 164 and the first and second face sheets 102, 104, as shown in FIG. 7.

Figure 10:
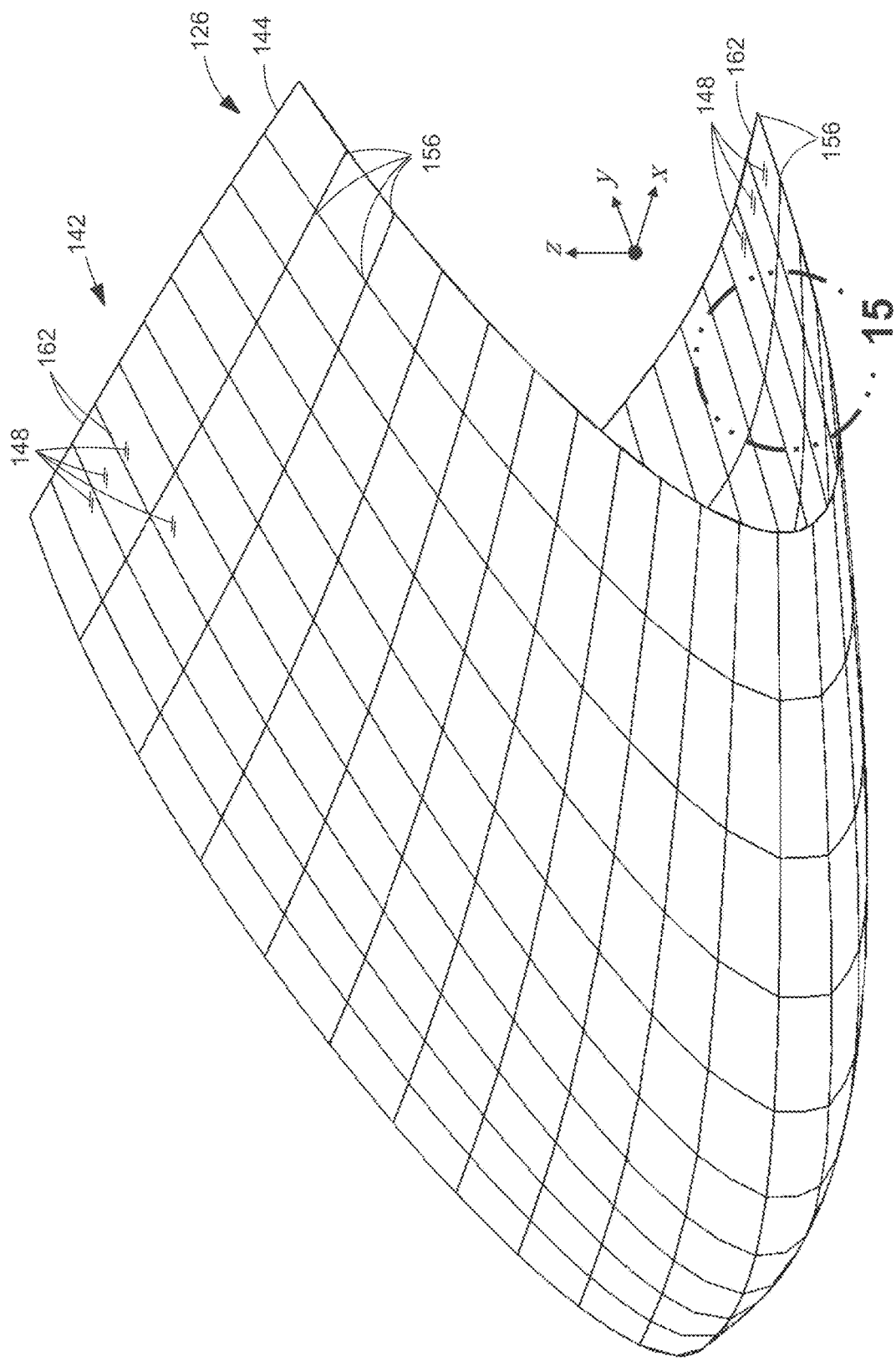
FIG. 10 is a perspective view of the panel mid-surface of FIG. 9 after the panel mid-surface has been meshed into a driver mesh comprised of a plurality of quadrilaterals elements.
Figure 28:
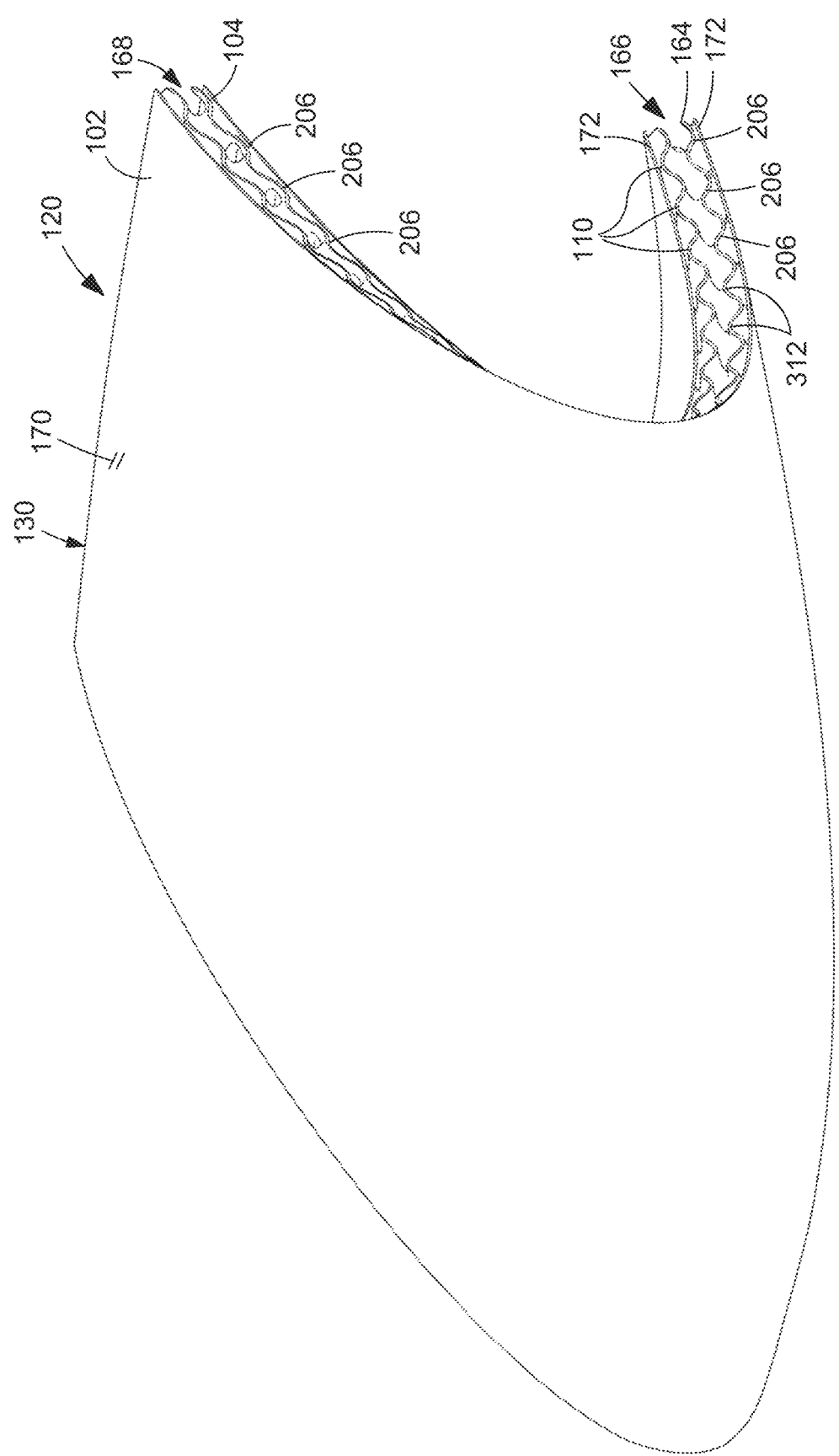
FIG. 28 is a perspective view of a sandwich panel having a panel infill geometry comprised of a plurality of unit cell meshes, mapped onto the hexahedral elements respectively associated with the quadrilateral elements of the driver mesh of FIG. 10.
Figure 29:
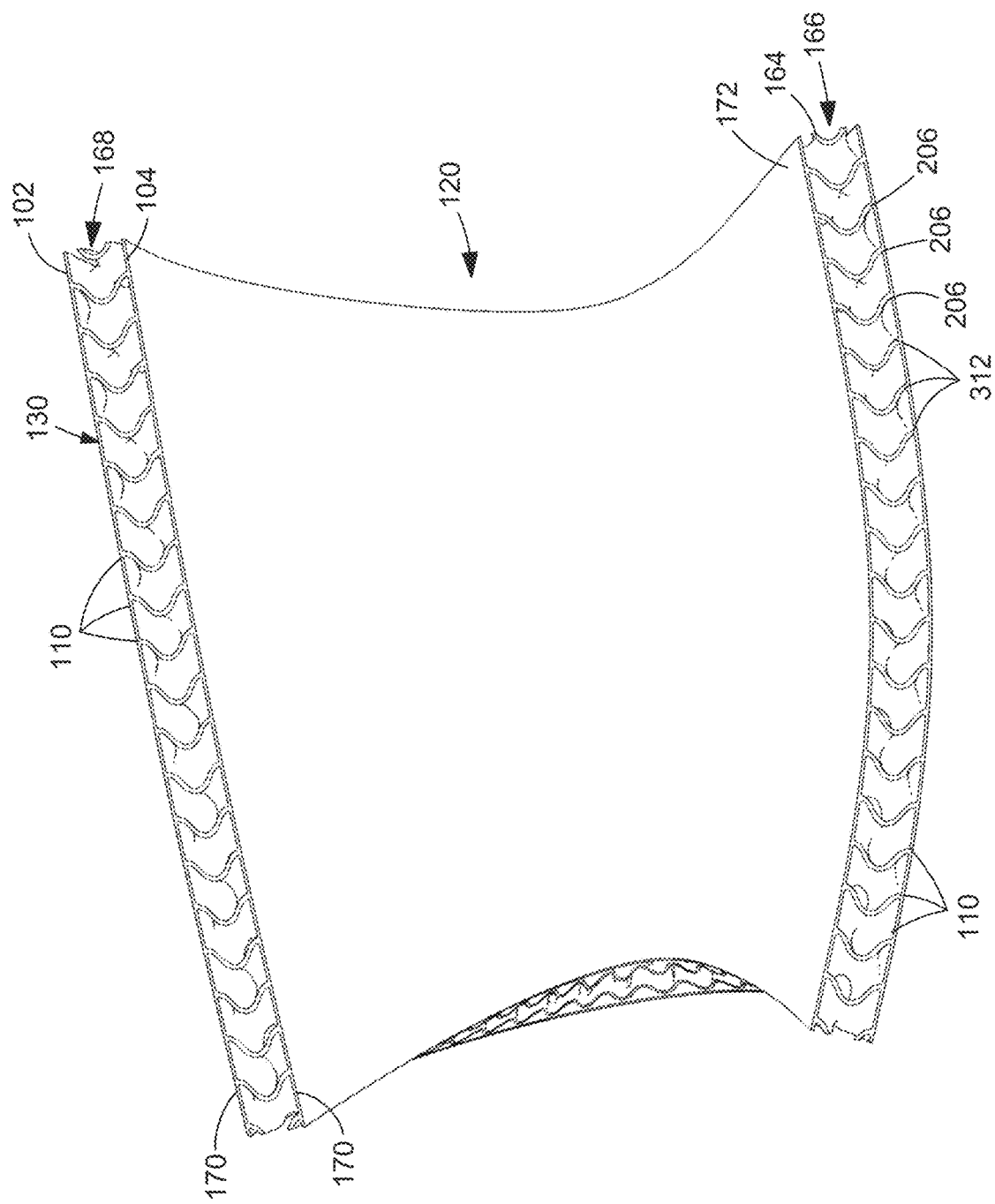
FIG. 29 is an alternative perspective view of the sandwich panel of FIG. 28, and illustrating the consistent topology at the interfaces between the panel infill geometry and the face sheets.
Figure 71:
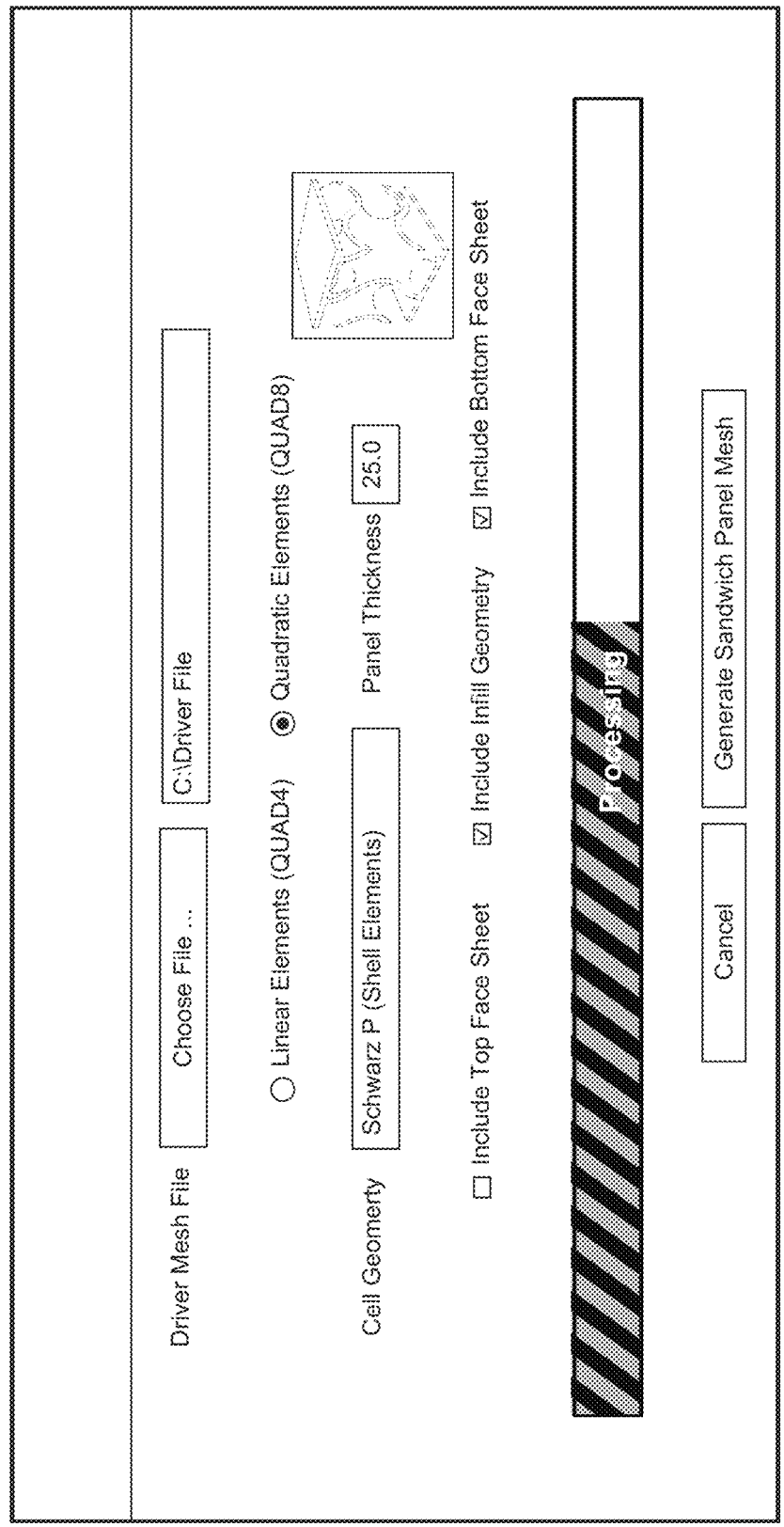
FIG. 71 shows an example of a user interface for the processor-based system of FIG. 70.

Referring to FIG. 8, with additional reference to FIGS. 9-71, shown in FIG. 8 is a flow chart of operations included in a method 700 of generating a panel infill geometry 166 for a sandwich panel 120, similar to the examples shown in FIGS. 28, 29, 36, 40, 44, 48, 52, 56, 59, 62-66, and 69. Step 702 of the method 700 comprises providing a driver mesh 142 (FIG. 10), which represents a panel mid-surface 126 (FIG. 9) midway between the first and second face sheets 102, 104 (FIGS. 28-29) of a sandwich panel 120 (FIGS. 28-29). The driver mesh 142 is made up of a plurality of quadrilateral elements 148. Each quadrilateral element 148 has driver mesh nodes 156 and edges 162. A driver mesh 142 can be constructed by meshing a driver digital model 128 (e.g., a computer-aided-design model or CAD model) of the panel mid-surface 126 of a sandwich panel 120 (FIGS. 28-29). FIG. 9 shows an example of a driver digital model 128 of a panel mid-surface 126 of a sandwich panel 120 to be additively manufactured. FIG. 10 shows an example of a driver mesh 142 generated by meshing the driver digital model 128 of FIG. 9.

Figure 60:
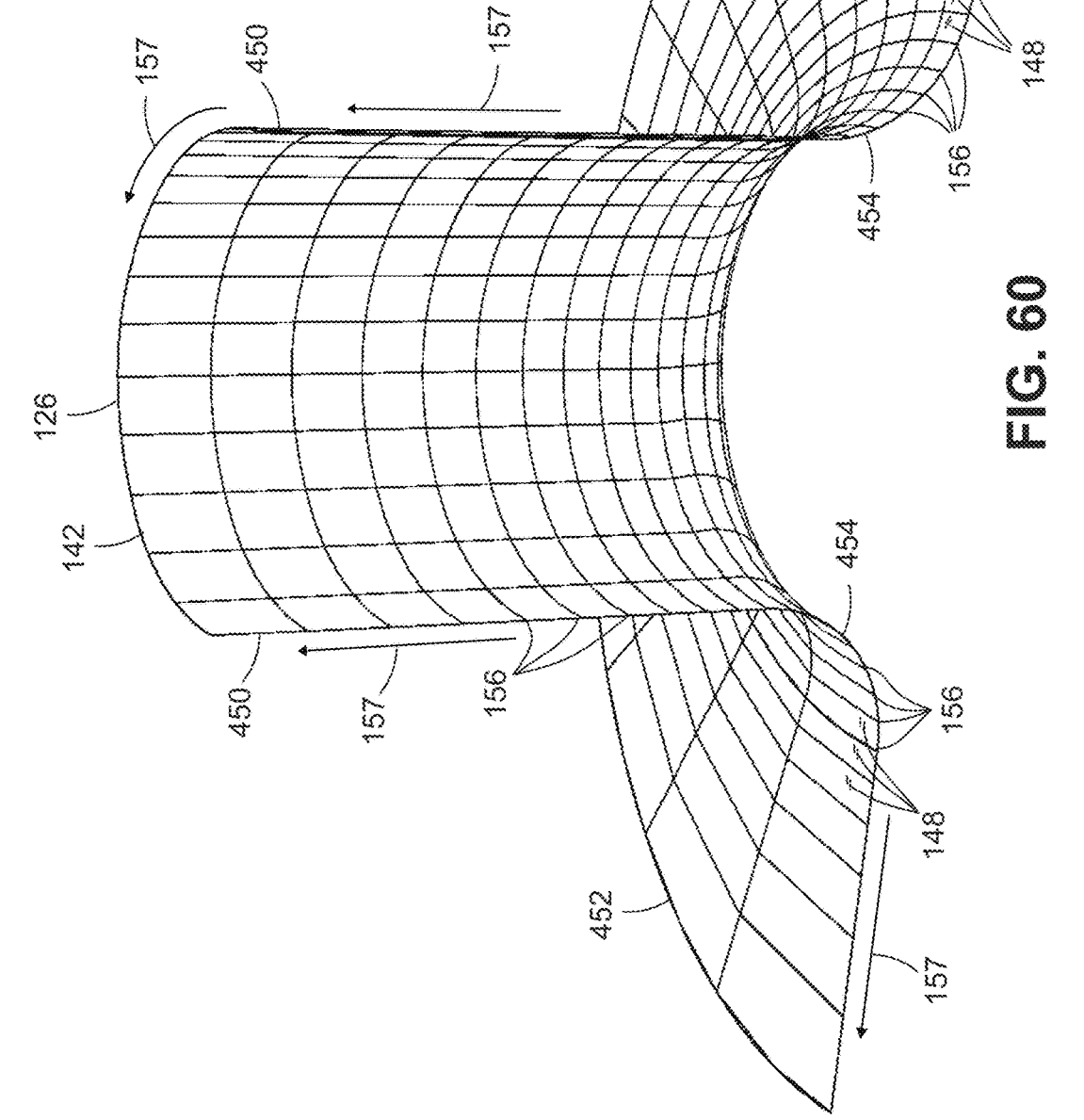
FIG. 60 is a perspective view of an example of a driver mesh that is spatially graded.

In some examples, step 702 comprises providing the driver mesh 142 as a structured driver mesh 144. A structured driver mesh 144 may be described as having a pattern of quadrilateral elements 148 which can be mapped into a square domain with uniform rows and columns (i.e., utilizing a transfinite interpolation method of mesh generation), as exemplified in FIG. 10. In other examples, step 702 comprises providing the driver mesh 142 as an unstructured driver mesh 146 (FIG. 57). In an unstructured driver mesh 146, the quadrilateral elements 148 are a general arrangement of quadrilateral elements 148 connected together at common driver mesh nodes 156, where there is no possible mapping into a square domain with uniform rows and columns. FIG. 57, described in greater detail below, shows an example of an unstructured driver mesh 146. In still other examples, step 702 comprises providing a driver mesh 142 (i.e., either structured or unstructured) that is spatially graded over at least one region of the panel mid-surface 126, as shown in the example of FIG. 60, and described in greater detail below.

Figure 15:
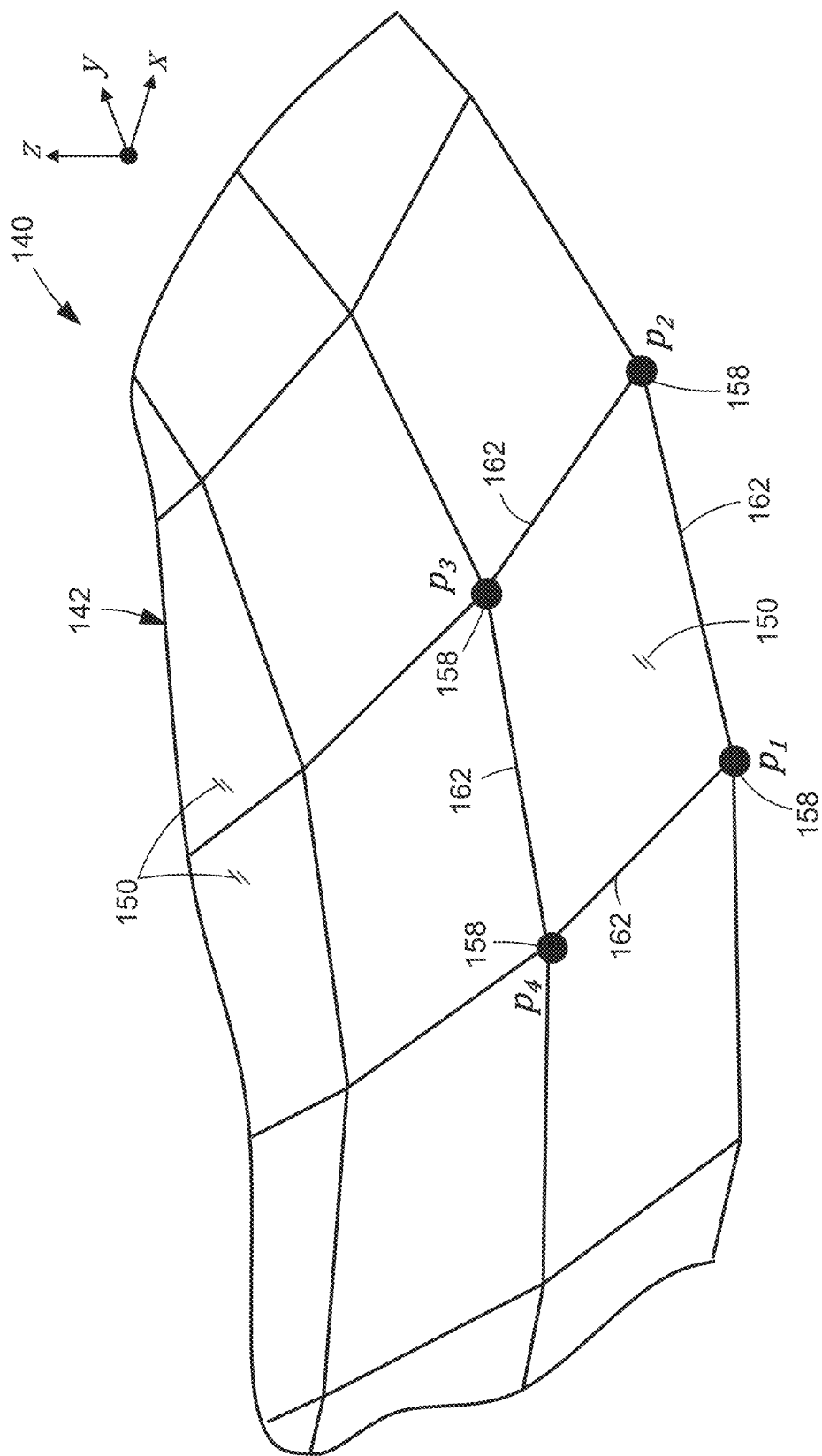
FIG. 15 is a magnified view of the portion of the driver mesh of FIG. 10, comprised of linear (i.e., 4-noded) quadrilateral elements, and illustrating the 4 corner nodes of one of the linear quadrilateral elements.
Figure 18A:
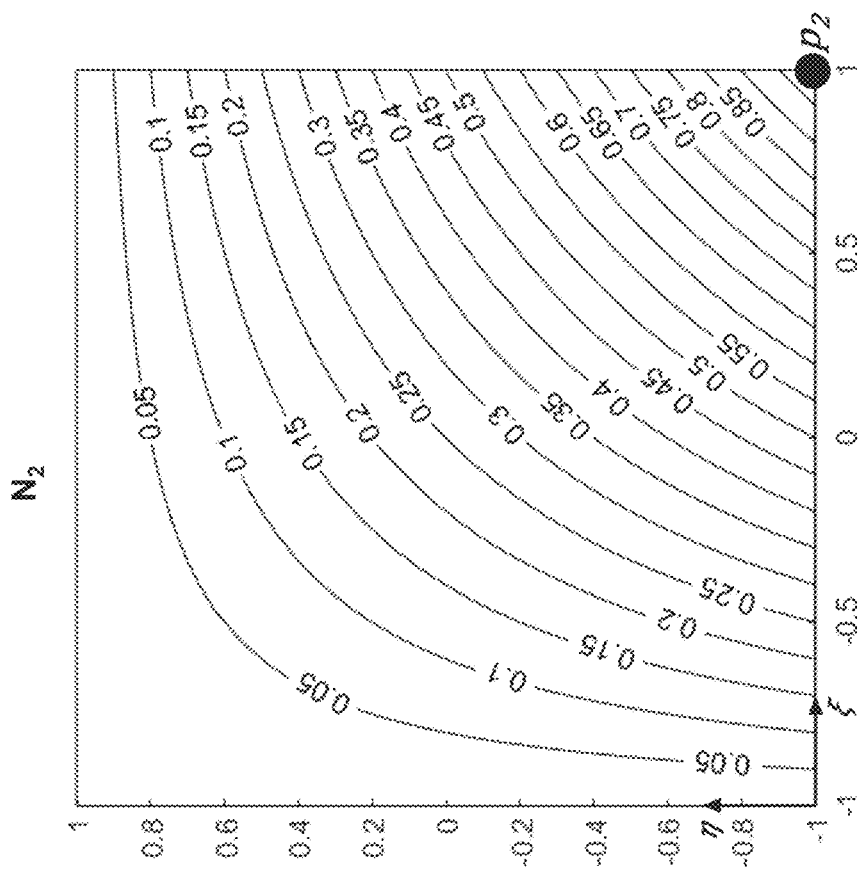
FIG. 18A shows a plurality of level set contours of a basis function defined on a first corner node of a 4-noded linear quadrilateral element.
Figure 18B:
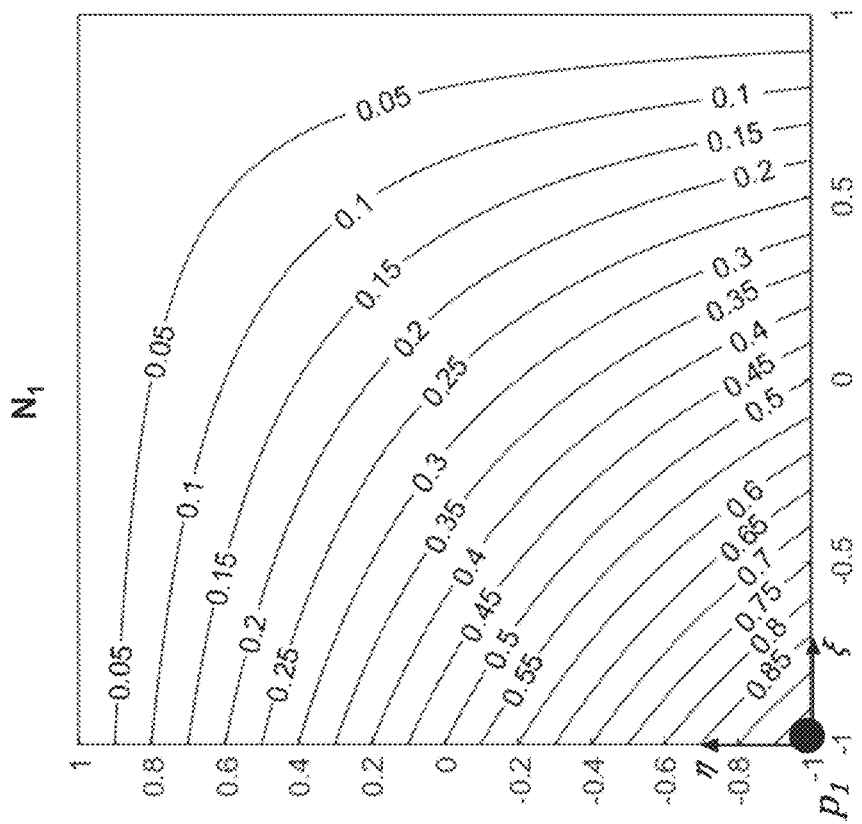
FIG. 18B shows a plurality of level set contours of a basis function defined on a second corner node of the 4-noded linear quadrilateral element.
Figure 18D:
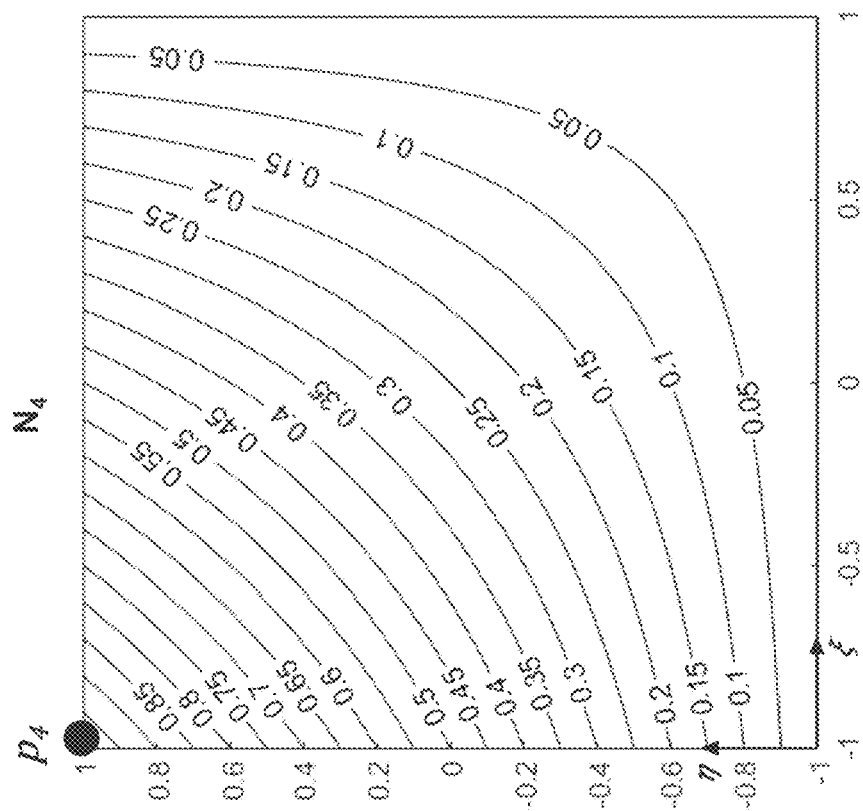
FIG. 18D shows a plurality of level set contours of a basis function defined on a fourth corner node of the 4-noded linear quadrilateral element.
Figure 18C:
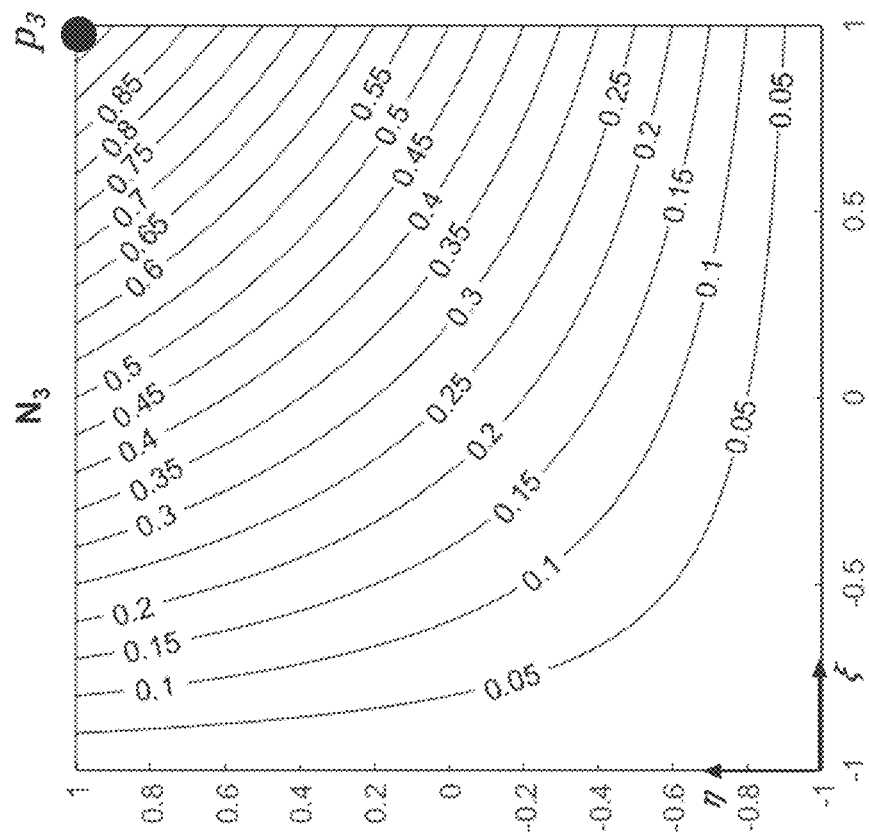
FIG. 18C shows a plurality of level set contours of a basis function defined on a third corner node of the 4-noded linear quadrilateral element.
Figure 22:
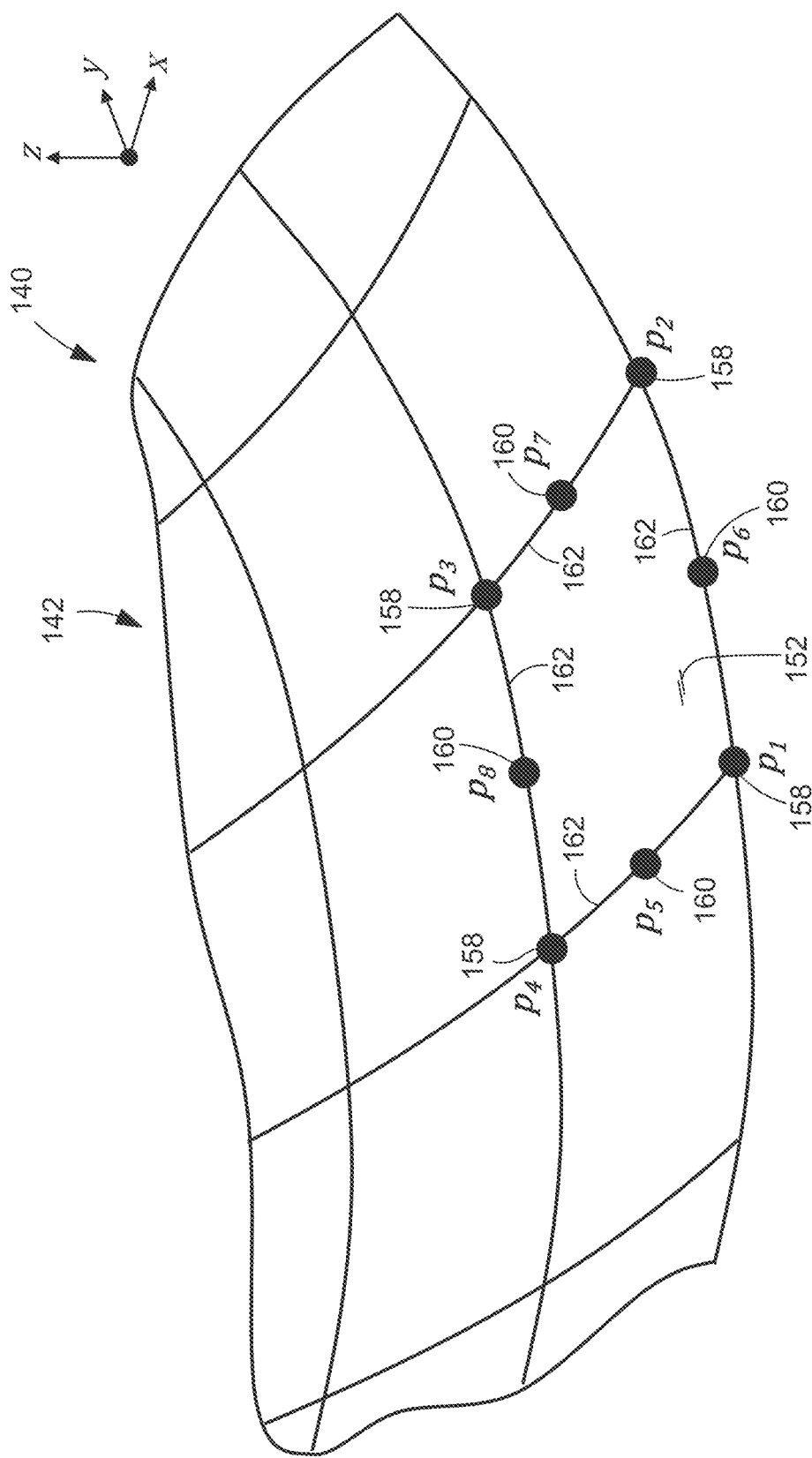
FIG. 22 is an example of the driver mesh of FIG. 10 comprised of quadratic quadrilateral elements, and illustrating the 4 corner nodes and 4 mid-side nodes of one of the quadratic quadrilateral elements.

A driver mesh 142 can be made up of linear quadrilateral elements 150 (e.g., FIG. 15). Each linear quadrilateral element 150 has 4 corner nodes 158, such that each edge 162 of each linear quadrilateral element 150 consists of 2 corner nodes 158, as shown in FIG. 15 and described in greater detail below. Alternatively, a driver mesh 142 can be made up of quadratic quadrilateral elements 152 (e.g., FIG. 22), which allows for curvature within each quadrilateral element 148. Each quadratic quadrilateral element 152 has 4 corner nodes 158 and 4 mid-side nodes 160, such that each edge 162 of each quadratic quadrilateral element 152 consists of 2 corner nodes 158 and 1 mid-side node 160, as shown in FIG. 22 and described in greater detail below.

Figure 12:
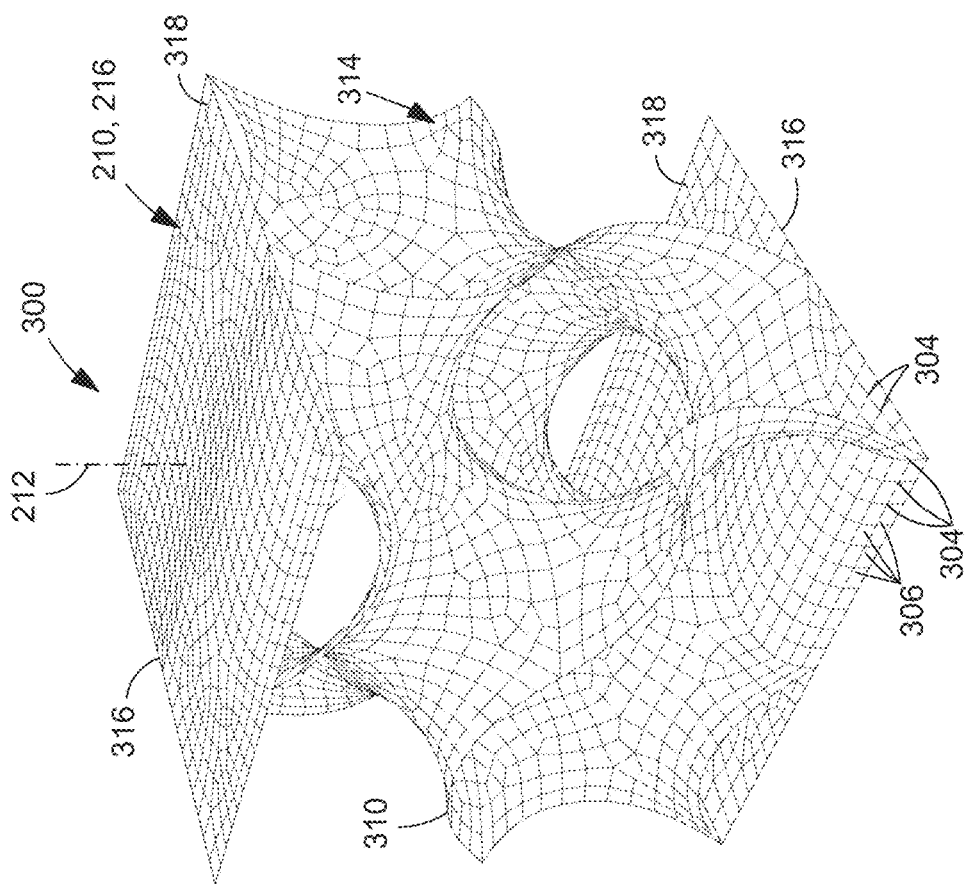
FIG. 12 is a perspective view of an example of a reference unit cell mesh configured to fit exactly within the cube of FIG. 11, and comprised of trimmed parametric surfaces that have been meshed.
Figure 11:
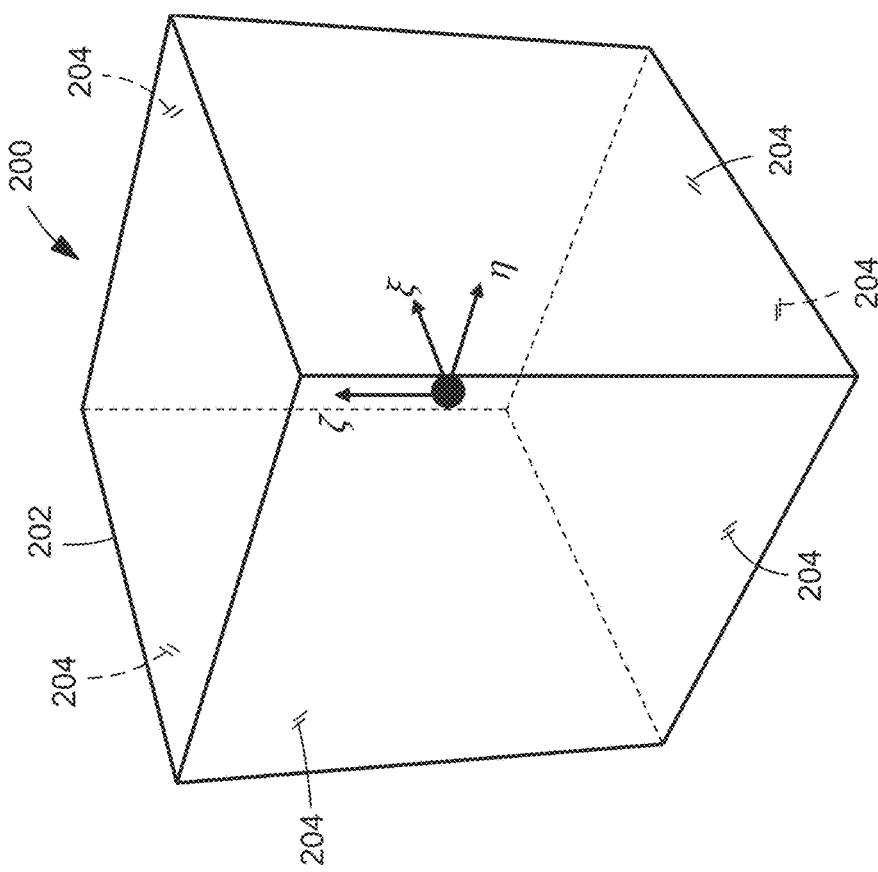
FIG. 11 is a perspective view of an example of a cube.
Figure 13:
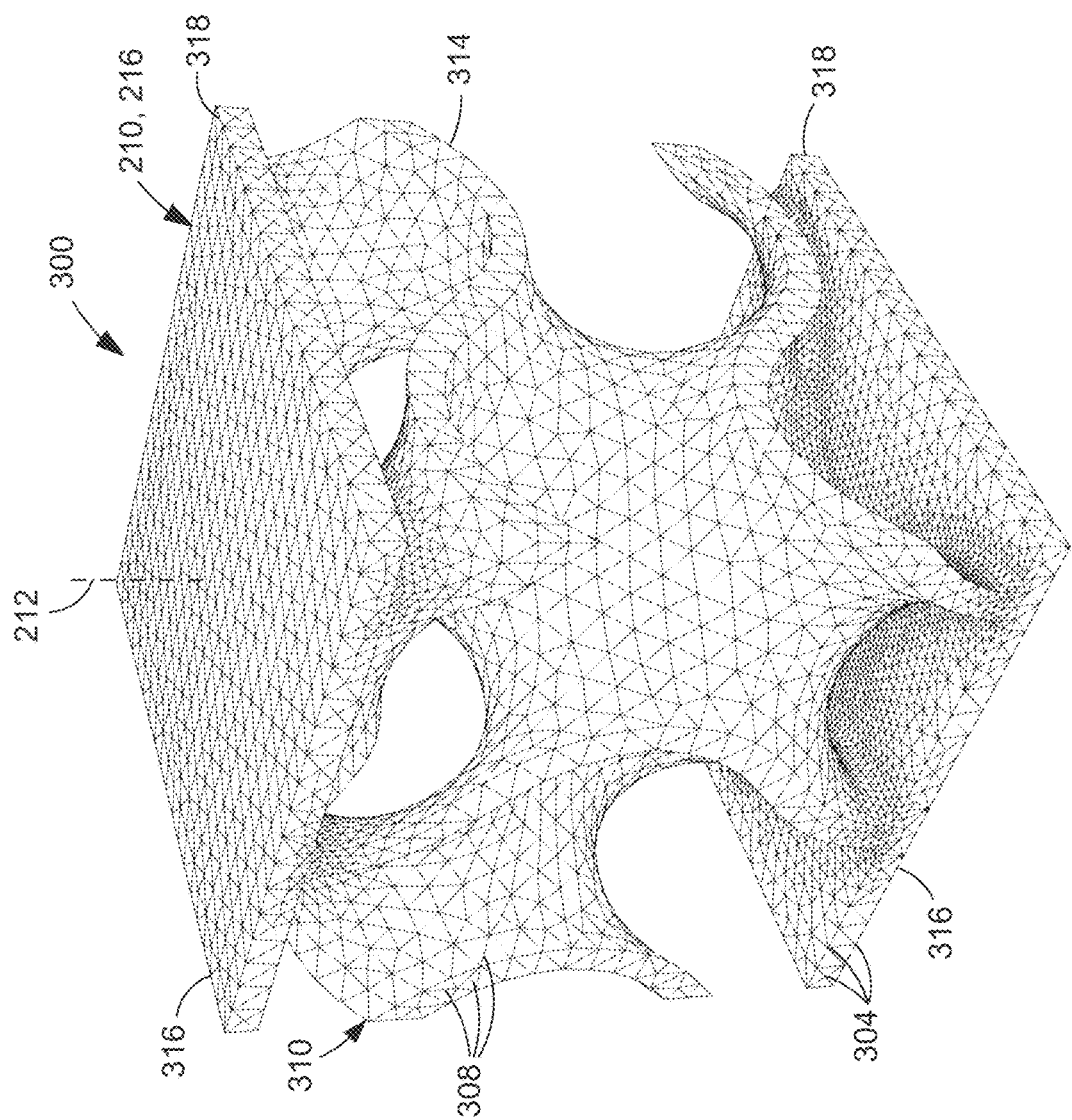
FIG. 13 shows a further example of a reference unit cell mesh configured to fit exactly within the cube of FIG. 11, and in which the reference unit cell mesh is comprised of trimmed parametric surfaces enclosing a volume, which has been meshed with solid elements (e.g., tetrahedral elements)

Referring to FIG. 11-13, step 704 of the method 700 comprises providing a reference unit cell mesh 300 (FIG. 12). The reference unit cell mesh 300 is configured to fit exactly within a 2×2×2 cube 202 (FIG. 11). The cube 202 has 6 square faces 204. The reference unit cell mesh 300 is described in isoparametric space 200 according to an orthonormal coordinate system having η, ξ, and ζ axes, and origin (0,0,0) at the center of the cube 202, as shown in FIG. 11. In addition, the reference unit cell mesh 300 has a main axis 212 that is coincident with the ζ axis. The reference unit cell mesh is comprised of a unit infill mesh 314 interconnecting a pair of unit face sheet meshes 318 on opposite ends of the unit infill mesh 314. Each of the unit face sheet meshes 318 is the same size and shape as the square face respectively defining the top and bottom of the cube.

In the example of FIG. 12, the reference unit cell mesh 300 is given as a surface representation comprised of shell elements 306. In the example of FIG. 13, the reference unit cell mesh 300 is given as a solid representation comprised of solid elements 308. In both FIGS. 12 and 13, these reference unit cell meshes 300 illustrate the example of a gyroid 216 configuration. Alternatively, in other examples, step 704 comprises providing the reference unit cell mesh 300 with a unit cell geometry 210 having one of the following configurations: Schwarz-P 214 (FIG. 41), body-centered-cubic lattice 218 (FIG. 49), honeycomb 220 (FIG. 33), or waffle 222 (FIG. 45), as shown in FIGS. 33-52 and described below.

Figure 53:
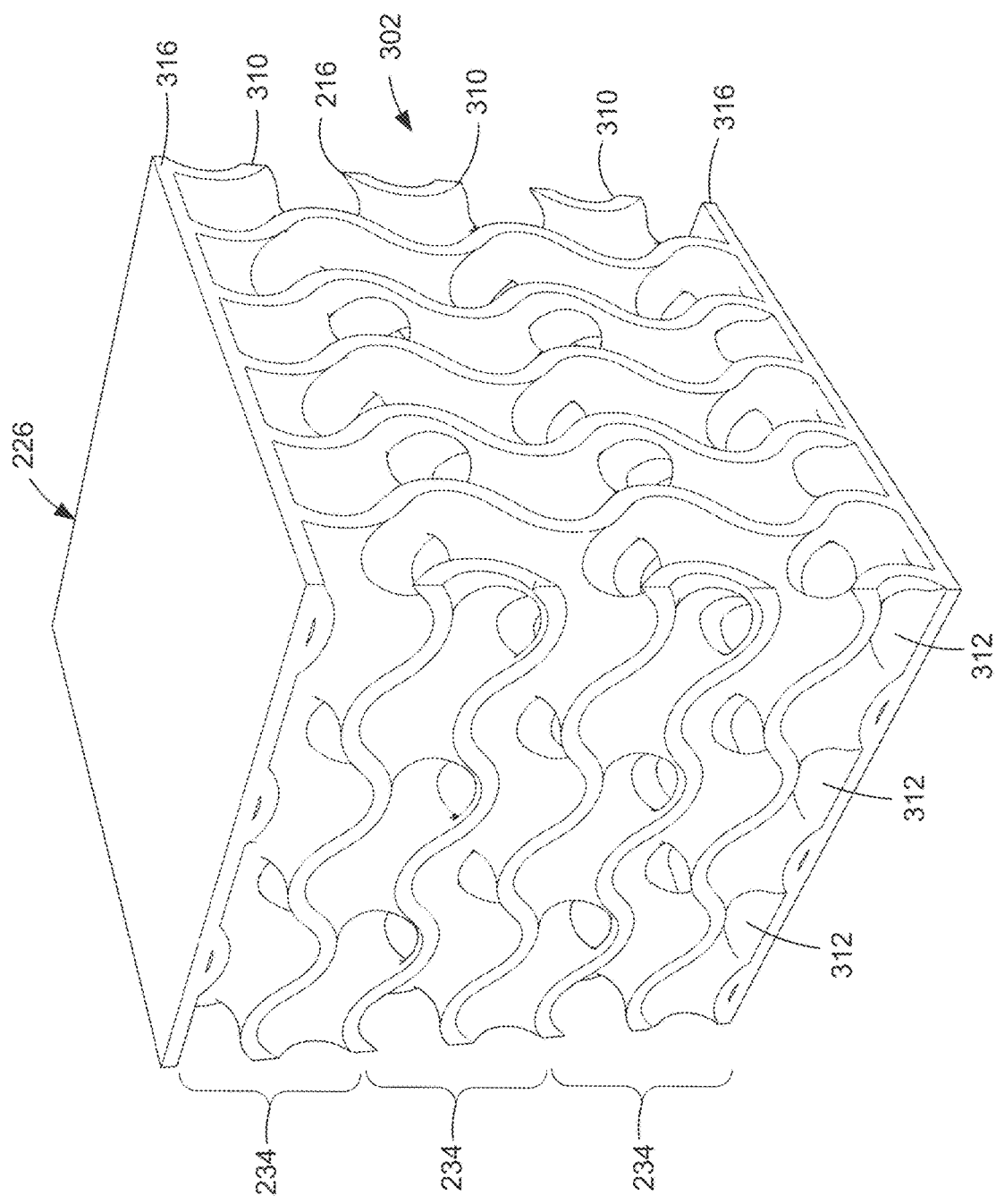
FIG. 53 is a perspective view of an example of a multi-layer unit cell geometry.
Figure 54:
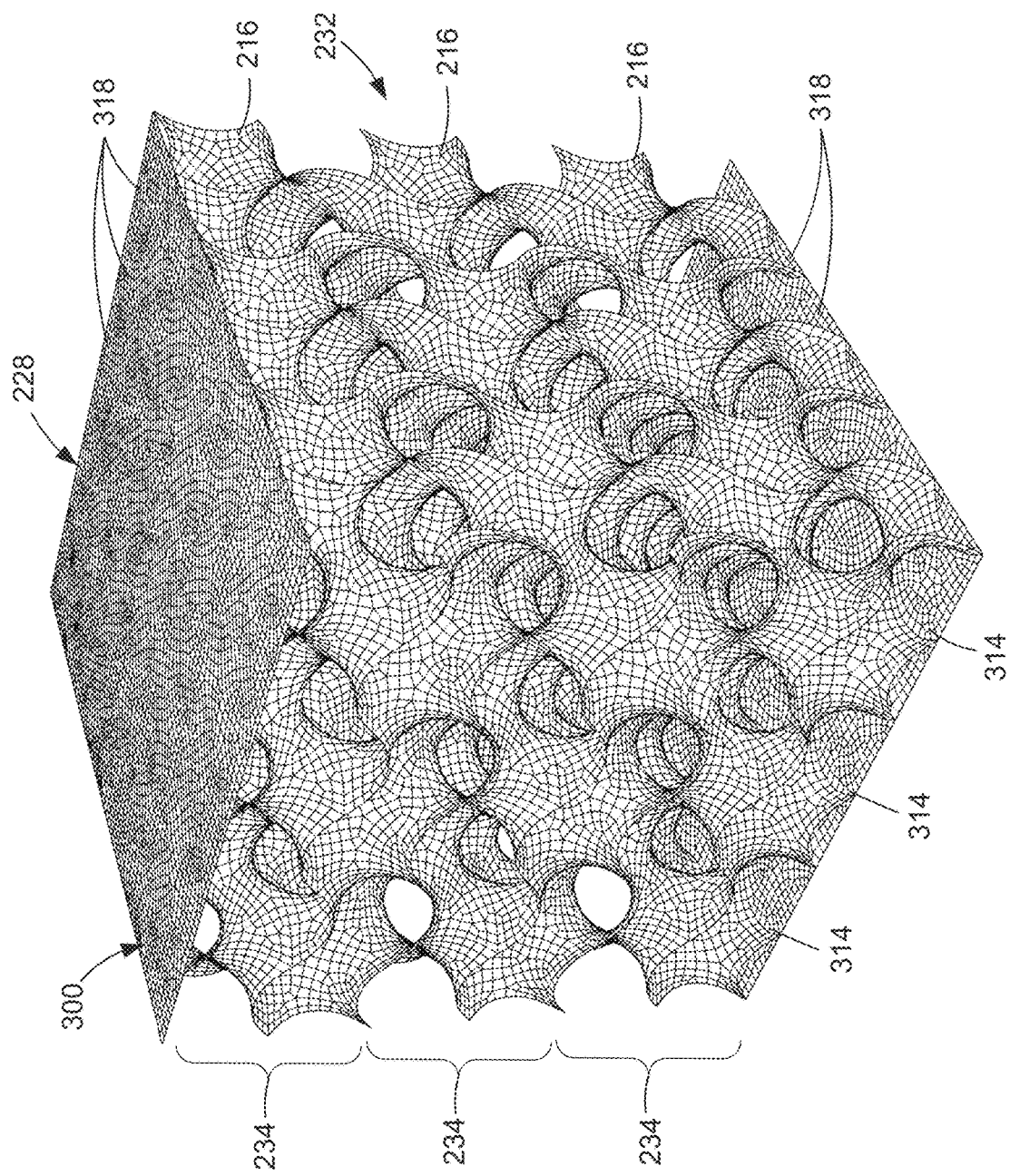
FIG. 54 is a perspective view of a reference unit cell mesh representing the multi-layer unit cell geometry of FIG. 53.

Referring briefly to FIGS. 53-54, a reference unit cell mesh 300 can be provided in a multi-layer unit cell geometry 226, represented by a multi-layer unit cell mesh 228. For example, FIG. 53 shows a multi-layer unit cell geometry 226 comprised of a multi-layer unit infill geometry 230 interconnecting a pair of unit face sheet geometries 316 respectively on the top and bottom of the multi-layer unit infill geometry 230. In the example shown, the multi-layer unit infill geometry 230 is comprised of 3 layers 234 of unit infill geometries 310 stacked on top of each other.

FIG. 54 shows a reference unit cell mesh 300 representing the multi-layer unit cell geometry 226 of FIG. 53. The reference unit cell mesh 300 is a multi-layer unit cell mesh 228 comprised of a multi-layer unit infill mesh 232 interconnecting a pair of unit face sheet meshes 318 respectively on the top and bottom of the multi-layer unit infill mesh 232. The multi-layer unit infill mesh 232 is comprised of 3 layers 234 of unit infill meshes 314. Each unit infill mesh 314 has a gyroid 216 configuration, which is triply periodic. Each layer 234 contains 3 rows of the unit infill meshes 314 in the $\eta$ direction, and each row contains 3 unit infill meshes 314 in the $\xi$ direction. The main axes 212 (FIG. 38) of the unit infill geometries 310 are aligned with each other. Each unit infill geometry 310 is periodic in the $\zeta$ direction of the cube (e.g., FIG. 11), allowing the unit infill geometries 310 to be interconnected.

A multi-layer unit cell geometry 226 can be provided in alternative configurations, and is not limited to the configuration shown in FIGS. 53-54. In this regard, a multi-layer unit cell geometry 226 can include 2 or more layers 234 of unit infill geometries 310 stacked on top of each other. Each layer 234 can include 1 or more rows of unit infill meshes 314 in the $\eta$ direction, and each row can include a corresponding number of unit infill meshes 314 in the $\xi$ direction.

A reference unit cell mesh 300 can be provided with other configurations not shown. In this regard, a reference unit cell mesh 300 can be custom-designed by first using a CAD software program to generate a unit infill geometry 310 comprised of trimmed parametric surfaces. After generating the unit infill geometry 310, the trimmed parametric surfaces can be meshed to generate a reference unit cell mesh 300.

A reference unit cell mesh 300 is made up of cell mesh elements having a plurality of cell mesh nodes 304. For example, the reference unit cell mesh 300 is comprised of either shell elements 306 (FIG. 12) or solid elements 308 (e.g., tetrahedral elements—e.g., FIG. 13). For a reference unit cell mesh 300 comprised of shell elements 306 as shown in FIG. 12, step 704 of providing the reference unit cell mesh 300 comprises: constructing the reference unit cell mesh 300 as one or more trimmed parametric surfaces, followed by meshing the one or more trimmed parametric surfaces, to thereby generate the reference unit cell mesh 300 comprised of shell elements 306. For a reference unit cell mesh 300 comprised of solid elements 308 as shown in FIG. 13, step 704 of providing the reference unit cell mesh 300 comprises: constructing the reference unit cell mesh 300 as a solid structure 208 (e.g., FIG. 37) represented by one or more trimmed parametric surfaces enclosing a volume, followed by meshing the volume, to thereby generate the reference unit cell mesh 300 comprised of solid elements 308.

In some examples, step 704 of providing the reference unit cell mesh 300 comprises providing or constructing the reference unit cell mesh 300 to be doubly periodic (i.e., cell mesh nodes 304 belonging to the reference unit cell meshes 300 are in the set $\mathbb{T}^2$) or, optionally, triply periodic (i.e., cell mesh nodes 304 belonging to the reference unit cell meshes 300 are in the set $\mathbb{T}^3$). In other words, for the doubly periodic case, the reference unit cell mesh 300 is periodic in the $\eta$ and $\xi$ directions, with the pattern of cell mesh nodes 304 on the square face 204 at $\Theta=1$ being the same as the pattern of cell mesh nodes 304 on the square face 204 at $\Theta=-1$, and the pattern of cell mesh nodes 304 on the square face 204 at $\xi=1$ being the same as the pattern of cell mesh nodes 304 on the square face 204 at $\xi=-1$. For the triply periodic case, the reference unit cell mesh 300 is periodic in the $\eta$, $\xi$ and $\zeta$ directions, with the pattern of cell mesh nodes 304 on the square face 204 at $\eta=1$ being the same as the pattern of cell mesh nodes 304 on the square face 204 at $\eta=-1$, and the pattern of cell mesh nodes 304 on the square face 204 at $\xi=1$ being the same as the pattern of cell mesh nodes 304 on the square face 204 at $\xi=1$, and the pattern of cell mesh nodes 304 on the square face 204 at $\zeta=1$ being the same as the pattern of cell mesh nodes 304 on the square face 204 at $\zeta=-1$. For example, the gyroid 216 configuration of the reference unit cell mesh 300 in FIGS. 12-13 is triply periodic, which means that the reference unit cell mesh 300 is periodic with respect to the $\eta$, $\xi$ and $\zeta$ directions (i.e., the principal directions) of the cube 202 of FIG. 11.

In some examples (e.g., FIGS. 41 and 49) described below, step 704 comprises constructing the reference unit cell mesh 300 with cell branches 224, each of which terminates at a square face 204 (FIG. 11) of the cube 202 (FIG. 11).

When reference unit cell meshes 300 are mapped onto a plurality of hexahedral elements 154 (e.g., FIG. 17) respectively associated with the plurality of quadrilateral elements 148 of a driver mesh 142 as described below, the periodic nature of the reference unit cell mesh 300 results in mapped unit cell meshes 302 (e.g., FIGS. 20 and 27) which can be stitched together to form a continuous stitched mesh 130 (i.e., a sandwich panel mesh 132—e.g., FIG. 28-29).

Step 706 of the method 700 comprises mapping a plurality of the reference unit cell meshes 300 respectively onto a plurality of hexahedral elements 154 (e.g., FIG. 17) respectively associated with the plurality of quadrilateral elements 148 of the driver mesh 142 (e.g., FIG. 10), through the use of basis functions defined on each of the plurality of quadrilateral elements 148. As described in greater detail below, the process of mapping via basis functions is performed in a manner causing adjustment of the size and shape of the plurality of reference unit cell meshes 300 (e.g., FIG. 19) to conform respectively to the size and shape of the plurality of hexahedral elements 154 (e.g., FIG. 20), and resulting in a plurality of mapped unit cell meshes 302 that fit respectively within the plurality of hexahedral elements 154 associated with each of the plurality of quadrilateral elements 148 of the driver mesh 142. As mentioned above, the reference unit cell mesh 300 is described in isoparametric space 200 according to an orthonormal coordinate system (e.g., having η, ξ, ζ axes) as shown in the example of FIG. 16. The driver mesh 142 is described in real space 140 according to a real space coordinate system (e.g., having x, y, z axes) as shown in the example of FIG. 17. After mapping is complete, the result is a panel infill geometry 166 comprised of a plurality of mapped unit infill meshes 314 interconnecting the first face sheet 102 to the second face sheet 104 (e.g., FIGS. 28-29). Advantageously, the presently-disclosed mapping process results in consistent footprint (i.e., having the same topology) at the infill/face sheet interfaces 110 (FIGS. 28-29) between the panel infill geometry 166 and the first and second face sheets 102, 104.

Figure 14:
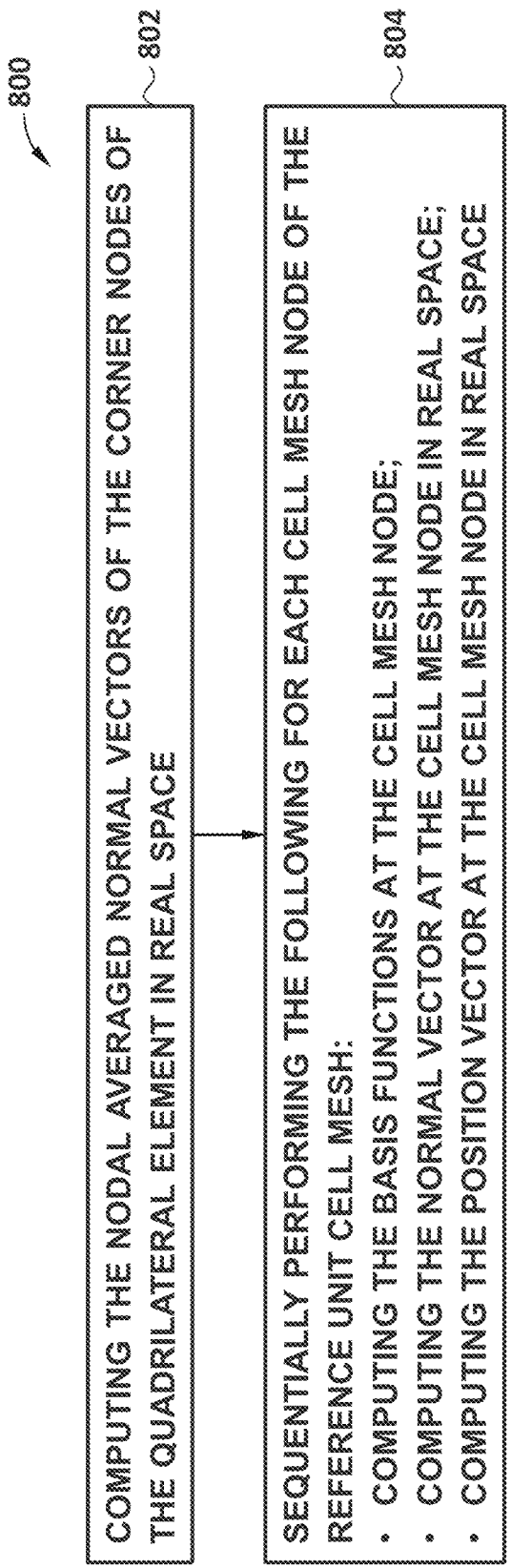
FIG. 14 is a flowchart of operations included in a method of mapping a reference unit cell mesh onto a hexahedral element associated with a linear quadrilateral element of a driver mesh.

Referring particularly now to FIGS. 14-20, step 706 of mapping a reference unit cell mesh 300 is described below with regard to the method 800 of FIG. 14, which is directed toward mapping a reference unit cell mesh 300 onto the hexahedral elements 154 associated with the linear quadrilateral elements 150 of a driver mesh 142. FIG. 15 shows a portion of a driver mesh 142 comprised of linear quadrilateral elements 150. As mentioned above, each linear quadrilateral element 150 has 4 corner nodes 158, which are identified as $p_1 \ldots p_4$, in real space 140. FIG. 16 shows a cube 202 in isoparametric space 200, and the corresponding location of the nodes $p_1 \ldots p_4$ on the cube 202. FIG. 17 shows a hexahedral element 154 associated with the linear quadrilateral element 150 of FIG. 15. The height or thickness of the hexahedral element 154 (e.g., at each corner node $p_1 \ldots p_4$) is the local panel thickness t for the sandwich panel 120, which is specified prior to initiating the mapping process. In one example, the sandwich panel 120 is a constant-thickness sandwich panel 122 (e.g., FIGS. 63 and 65). Alternatively, the sandwich panel 120 is a variable-thickness sandwich panel 124 (e.g., FIGS. 64 and 66), in which case the local panel thickness t is different in at least two locations on at least one of the quadrilateral elements 148 contained within the driver mesh 142, as described below.

Figure 19:
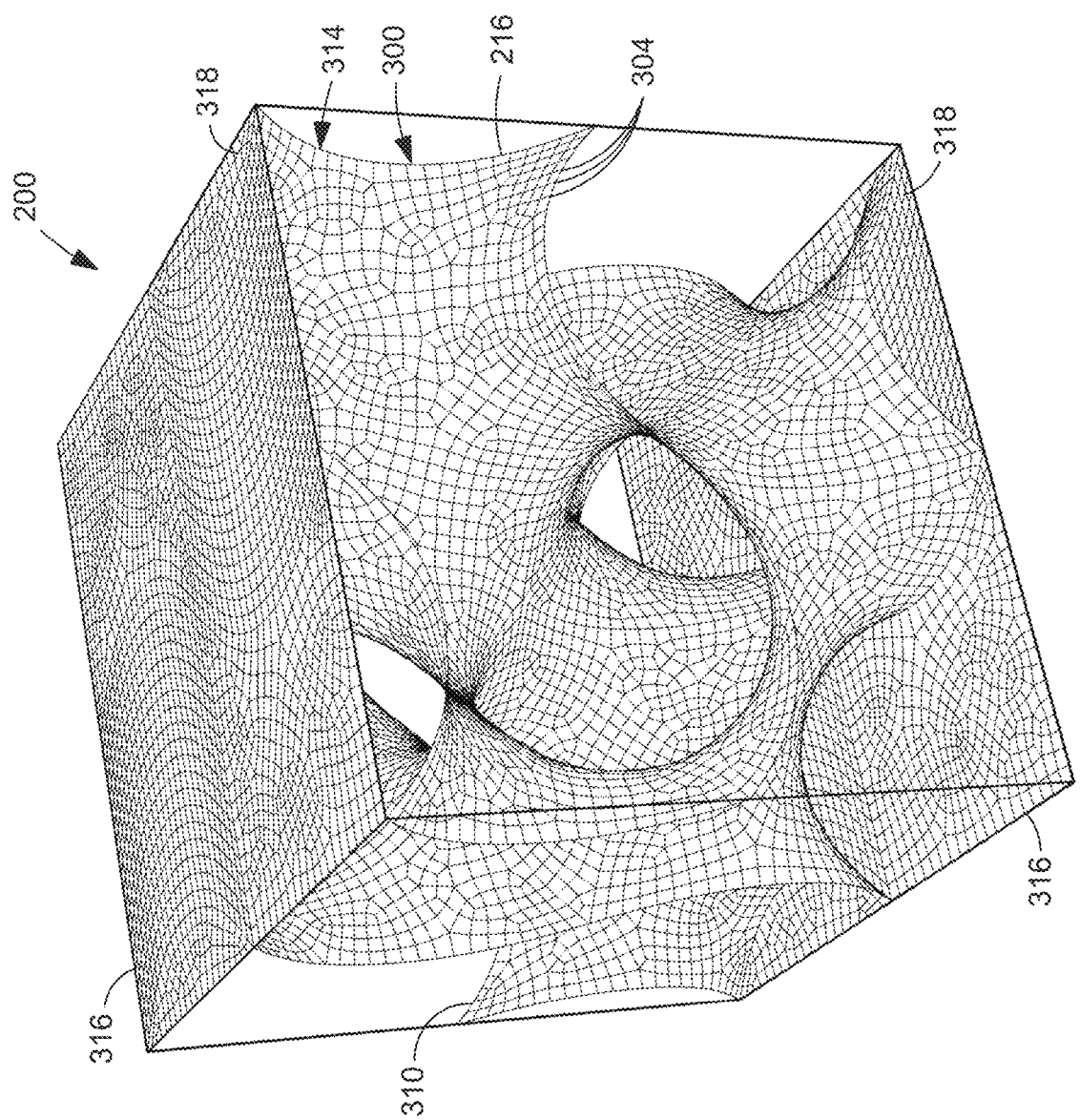
FIG. 19 is an example of a reference unit cell mesh fitting exactly within the cube of FIG. 16.
Figure 20:
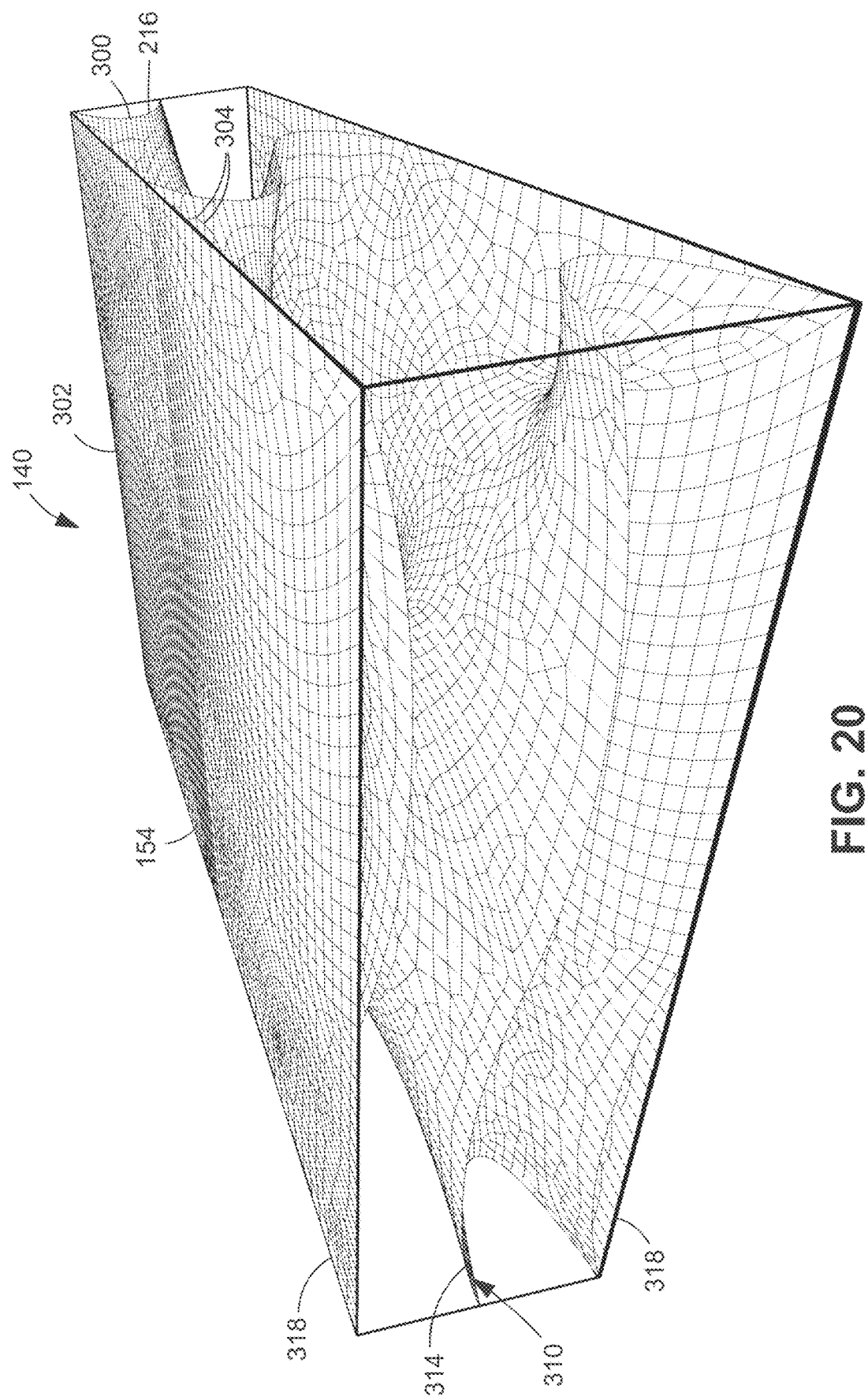
FIG. 20 shows the reference unit cell mesh of FIG. 19 mapped onto the hexahedral element of FIG. 17.

The mapping of a reference unit cell mesh 300 onto a plurality of hexahedral elements 154 respectively associated with the plurality of linear quadrilateral elements 150 (FIG. 15) of a driver mesh 142 (FIG. 15) is performed through the use of linear basis functions defined on the linear quadrilateral element 150. Linear basis functions describe the value of a point of interest within a region, using a weighted combination of values at points around the point of interest. FIG. 18 shows 4 groups of level set contours respectively belonging to the 4 linear basis functions $N_1 \ldots N_4$ defined on a 4-noded linear quadrilateral element 150. The level set contours indicate the weight of a given corner node 158 across the 4-noded linear quadrilateral element 150. FIG. 19 shows an example of a reference unit cell mesh 300 having a gyroid 216 configuration. FIG. 20 shows the reference unit cell mesh 300 of FIG. 19 after being mapped onto the hexahedral element 154 (e.g., FIG. 17) associated with the linear quadrilateral element 150 of the driver mesh 142.

In FIG. 14, the method 800 of mapping the reference unit cell mesh 300 onto each of the plurality of hexahedral elements respectively associated with the plurality of linear quadrilateral elements 150 in a driver mesh 142 comprises sequentially performing the below-described steps 802 and 804 for each linear quadrilateral element 150 of the driver mesh 142. Step 802 comprises computing the nodal averaged normal vectors $n_1 \ldots n_4$ (FIG. 17) of the corner nodes 158 $p_1 \ldots p_4$ of the linear quadrilateral element 150 in real space 140, using the following equations:

$n_x = \sum_{i=1}^{k} A_i n_{i_x}$ (Equation 602)

$n_y = \sum_{i=1}^{k} A_i n_{i_y}$ (Equation 604)

$n_z = \sum_{i=1}^{k} A_i n_{i_z}$ (Equation 606)

wherein:
k is the number of elements (i.e., linear quadrilateral elements 150) connected to a given corner node 158;
$A_i$ is either the area of the $i^{th}$ connecting element (for area weighted averaged normals) or 1 (for uniformly weighted averaged normals);
$n_{i_x}$, $n_{i_y}$ and $n_{i_z}$ are the x, y and z components of the $i^{th}$ connecting element normal respectively; and
$n_x$, $n_y$ and $n_z$ are the x, y and z components of the nodal averaged normal vector respectively.

Step 804 comprises sequentially performing the following computations for each cell mesh node 304 of the reference unit cell mesh 300. Initially, step 804 includes computing the linear basis functions $N_1 \ldots N_4$ of the cell mesh node 304, using the following equations:

$$N_1 = \frac{1}{4}(1-\xi)(1-\eta)$$ (Equation 608)

$$N_2 = \frac{1}{4}(1+\xi)(1-\eta)$$ (Equation 610)

$$N_3 = \frac{1}{4}(1+\xi)(1+\eta)$$ (Equation 612)

$$N_4 = \frac{1}{4}(1-\xi)(1+\eta)$$ (Equation 614)

wherein η and ξ (e.g., see FIG. 16) are the coordinates of the cell mesh node 304 in isoparametric space 200.

After computing the linear basis functions $N_1 \ldots N_4$, step 804 comprises computing the normal vector $n=(n_x, n_y, n_z)^T$ of the panel mid-surface 126 at the position of the cell mesh node 304 in real space 140, using the following equations:

$n_x = \sum_{i=1}^{4} N_i n_{i_x}$ (Equation 616)

$n_y = \sum_{i=1}^{4} N_i n_{i_y}$ (Equation 618)

$n_z = \sum_{i=1}^{4} N_i n_{i_z}$ (Equation 620)

wherein $n_{i_x}$, $n_{i_y}$, and $n_{i_z}$ are respectively the x, y, and z components (in the real coordinate system—e.g., FIG. 17) of the nodal averaged normal vectors $n_1 \ldots n_4$ at the nodes $p_1 \ldots p_4$ respectively.

After computing $n_{i_x}$, $n_{i_y}$, and $n_{i_z}$, step 804 comprises computing the position vector $p=(p_x, p_y, p_z)^T$ of the cell mesh node 304 in real space 140, using the following equations:

$$p_x = \sum_{i=1}^{4} N_i p_{i_x} + \frac{1}{2}\zeta n_x t$$ (Equation 622)

$$p_y = \sum_{i=1}^{4} N_i p_{i_y} + \frac{1}{2}\zeta n_y t$$ (Equation 624)

$$p_z = \sum_{i=1}^{4} N_i p_{i_z} + \frac{1}{2}\zeta n_z t$$ (Equation 626)

wherein:
ζ is the third of the three coordinates (e.g., η, ξ, and ζ—FIG. 16) defining the location of the cell mesh node 304 in isoparametric space 200 in the direction of the main axis 212;
$p_{i_x}$, $p_{i_y}$, and $p_{i_z}$ are respectively the x, y, and z components (in the real coordinate system) of the position vectors $p_1 \ldots p_4$;
t is the local panel thickness of the sandwich panel 120.

Figure 21:
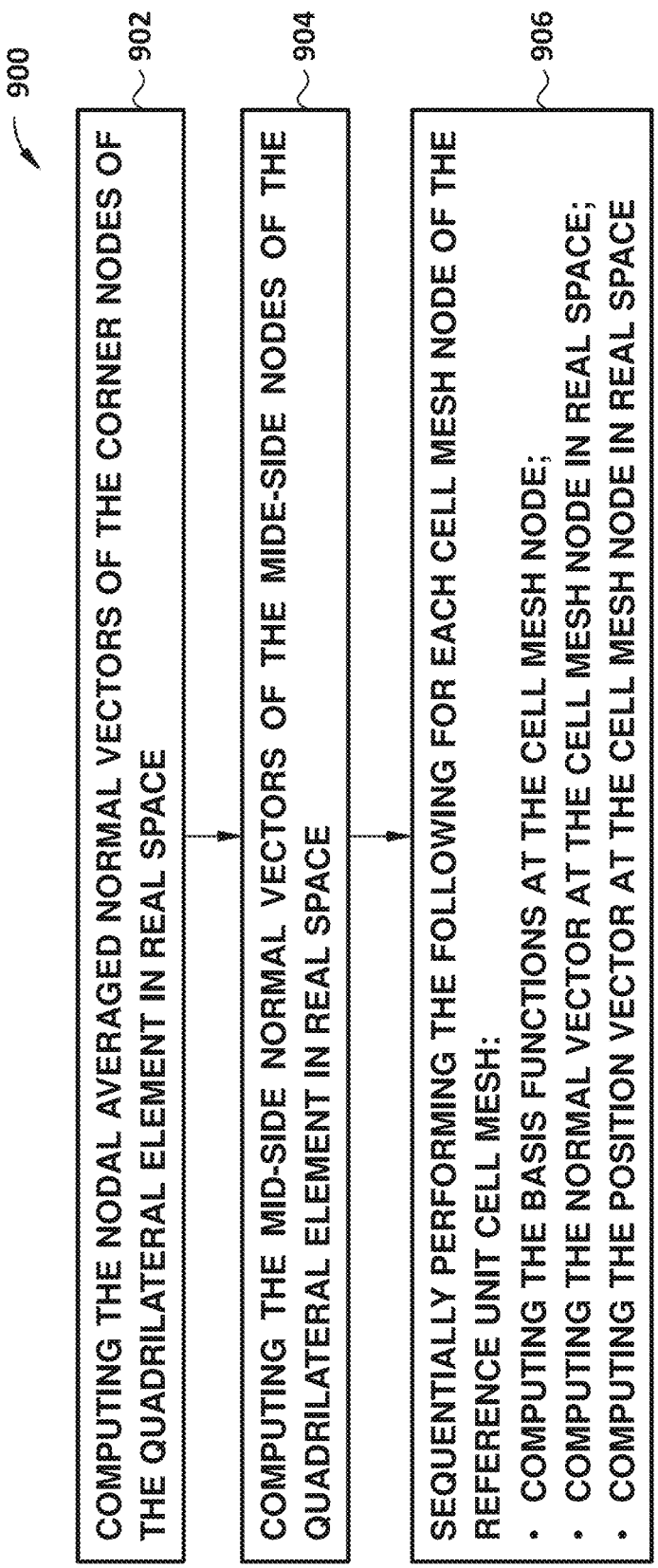
FIG. 21 is a flowchart of operations included in a method of mapping a reference unit cell mesh onto a hexahedral element associated with an 8-noded quadratic quadrilateral element.
Figure 23:
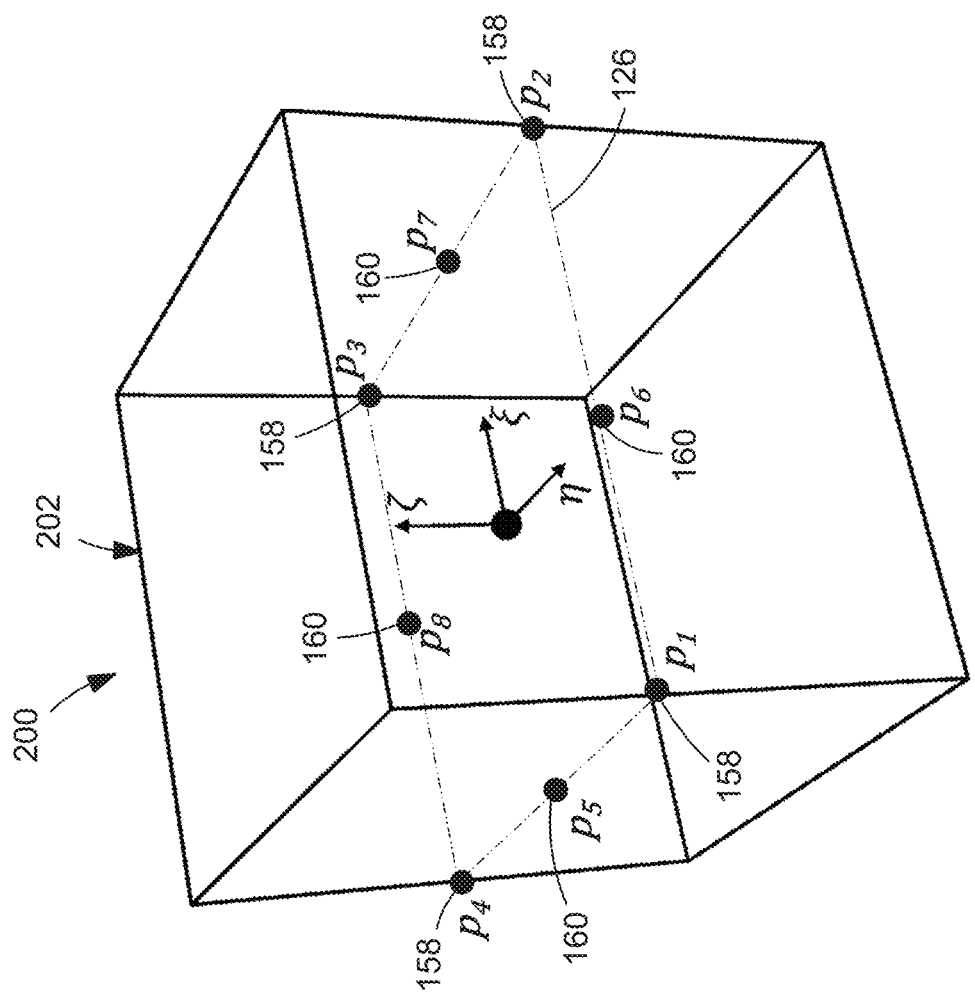
FIG. 23 is an example of a cube in isoparametric space.
Figure 24:
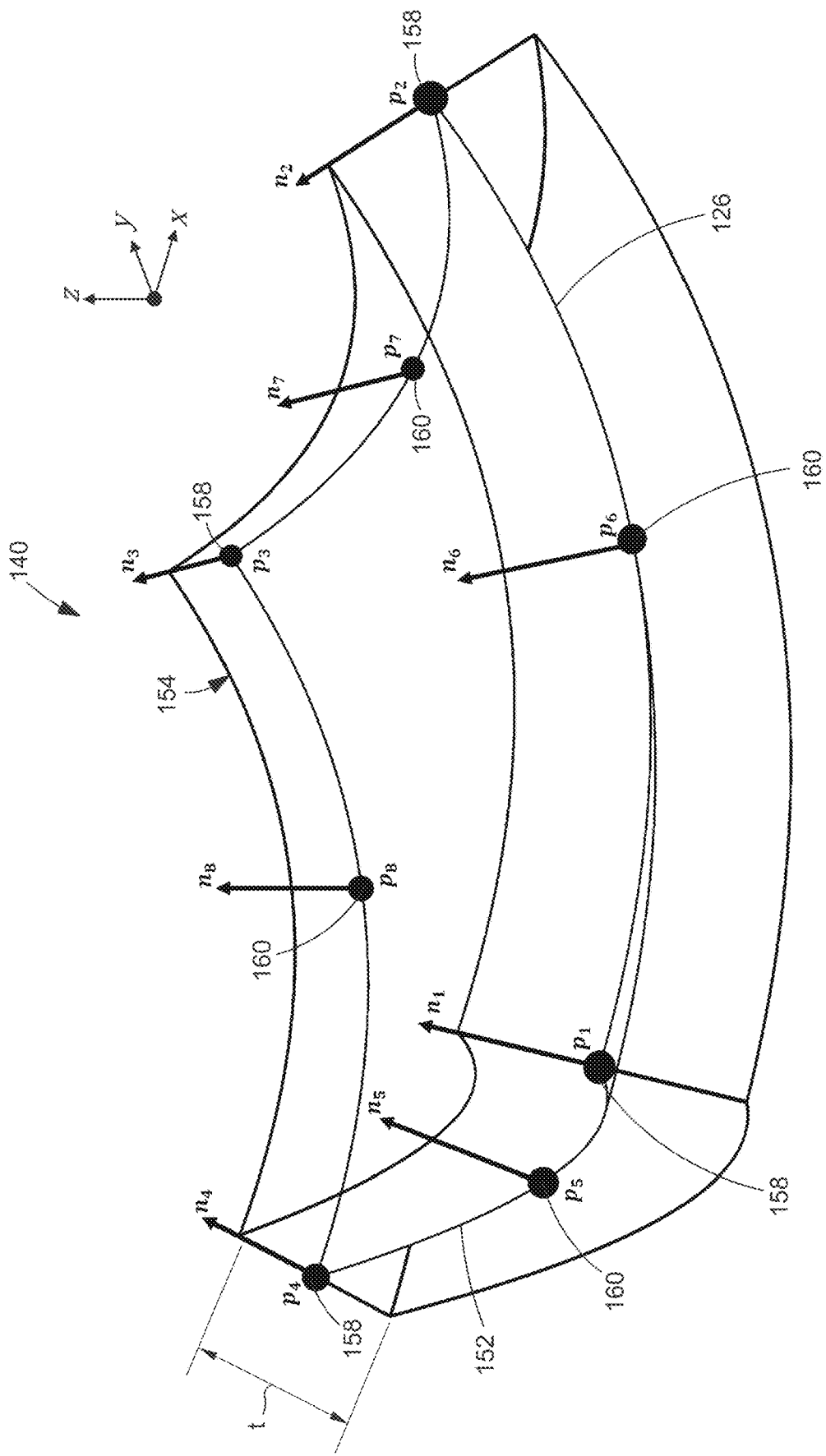
FIG. 24 shows an example of the cube of FIG. 23 mapped onto a hexahedral element associated with the quadratic quadrilateral element of FIG. 22.
Figure 25B:
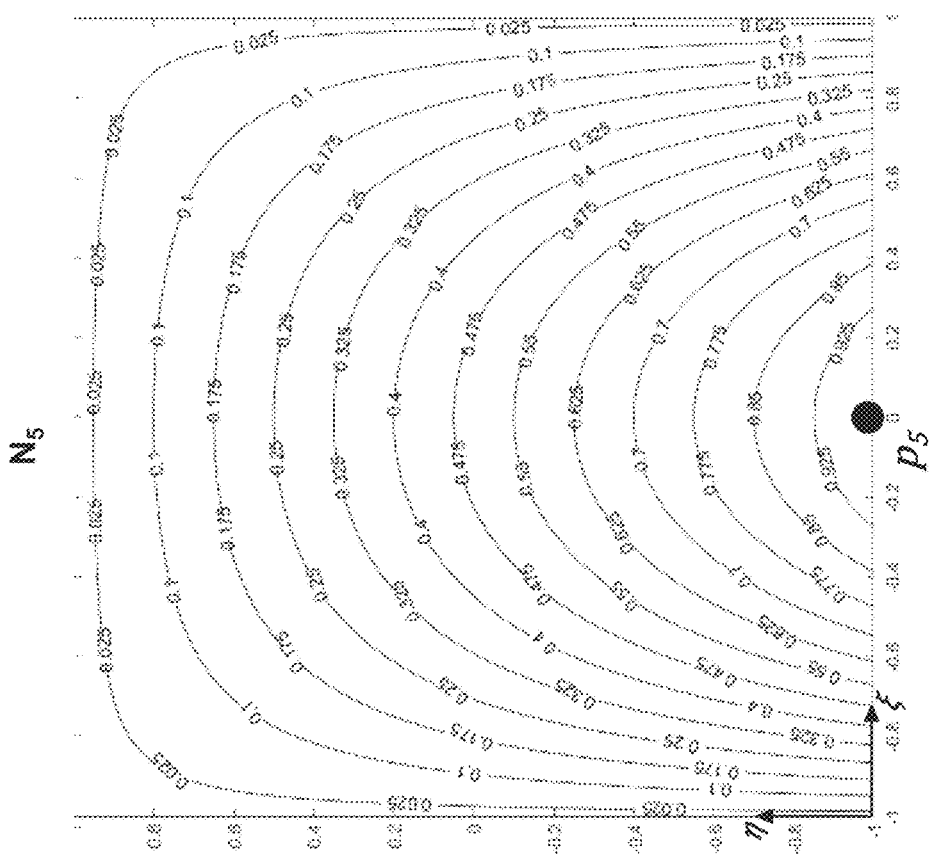
FIG. 25B shows a plurality of level set contours of a basis function defined on a first mid-side node of the 8-noded quadratic quadrilateral element.
Figure 25A:
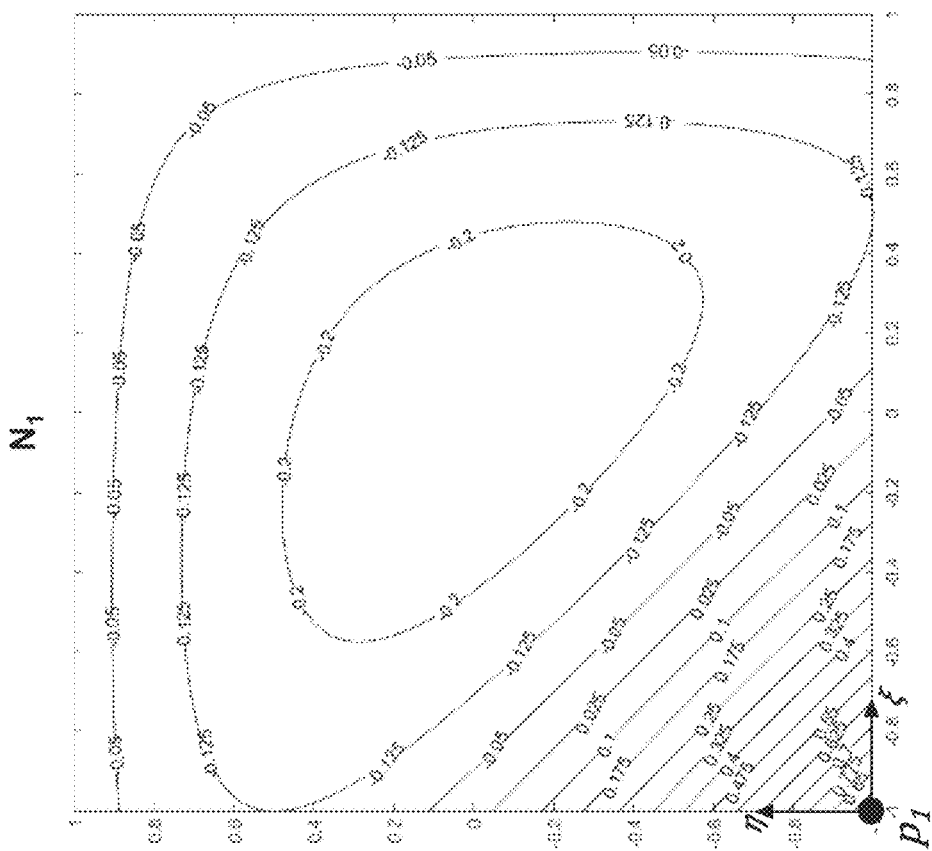
FIG. 25A shows a plurality of level set contours of a basis function defined on a first corner node of an 8-noded quadratic quadrilateral element.
Figure 25D:
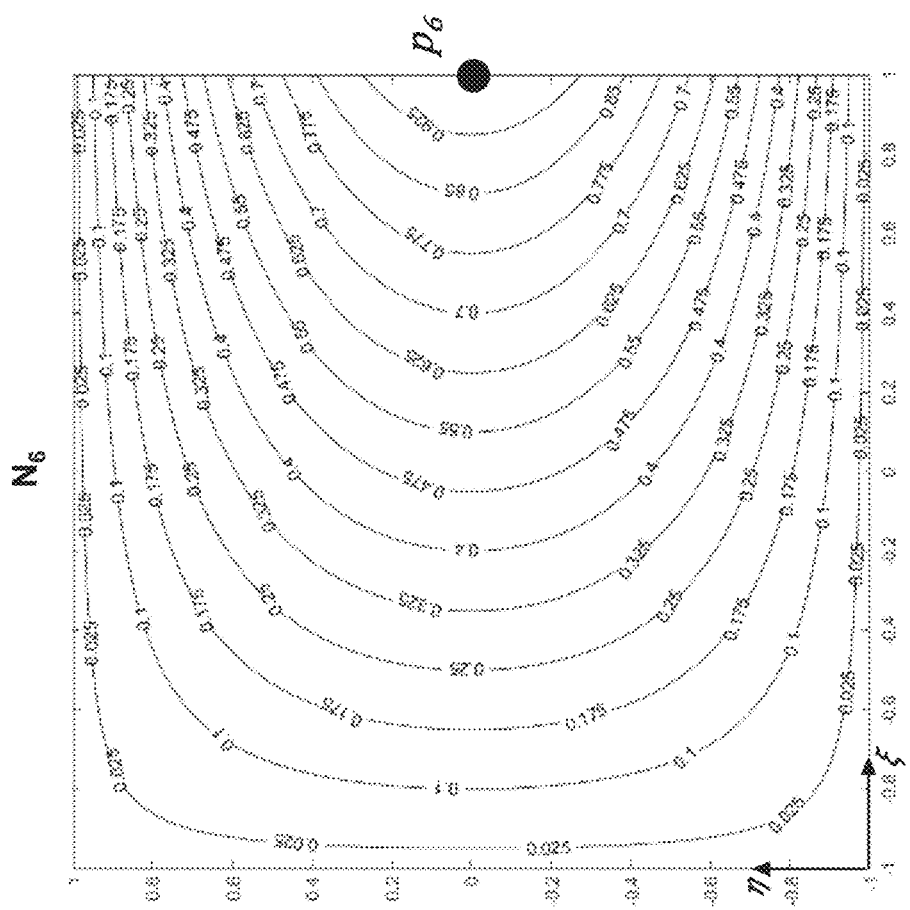
FIG. 25D shows a plurality of level set contours of a basis function defined on a second mid-side node of the 8-noded quadratic quadrilateral element.
Figure 25C:
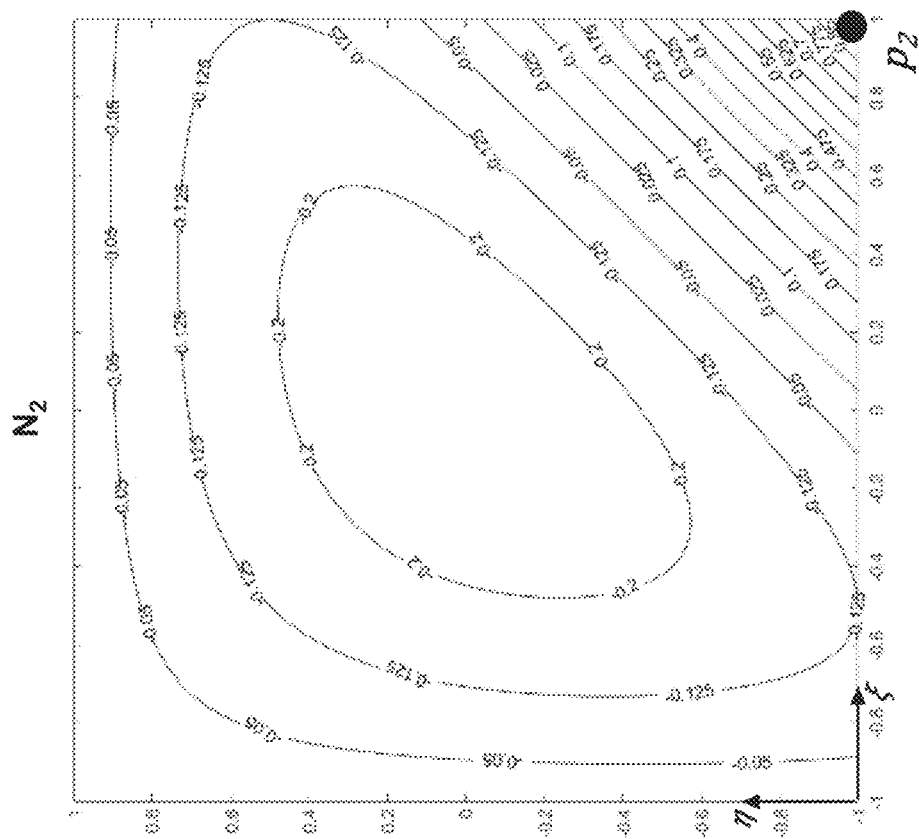
FIG. 25C shows a plurality of level set contours of a basis function defined on a second corner node of the 8-noded quadratic quadrilateral element.
Figure 25F:
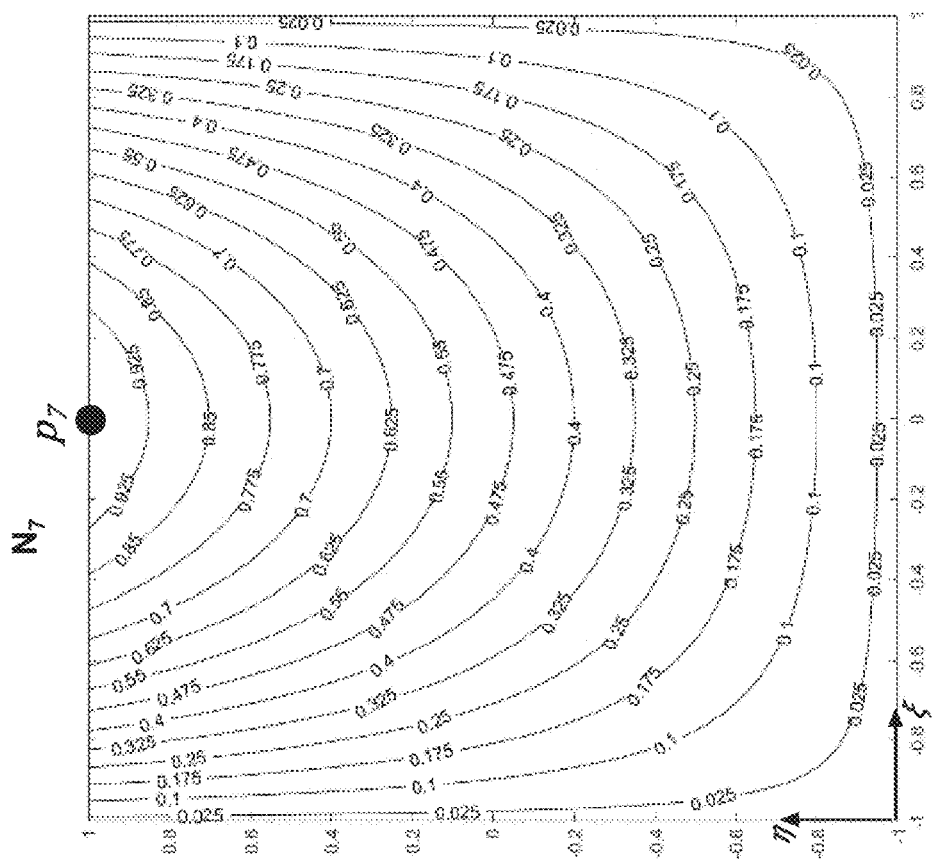
FIG. 25F shows a plurality of level set contours of a basis function defined on a third mid-side of the 8-noded quadratic quadrilateral element.
Figure 25E:
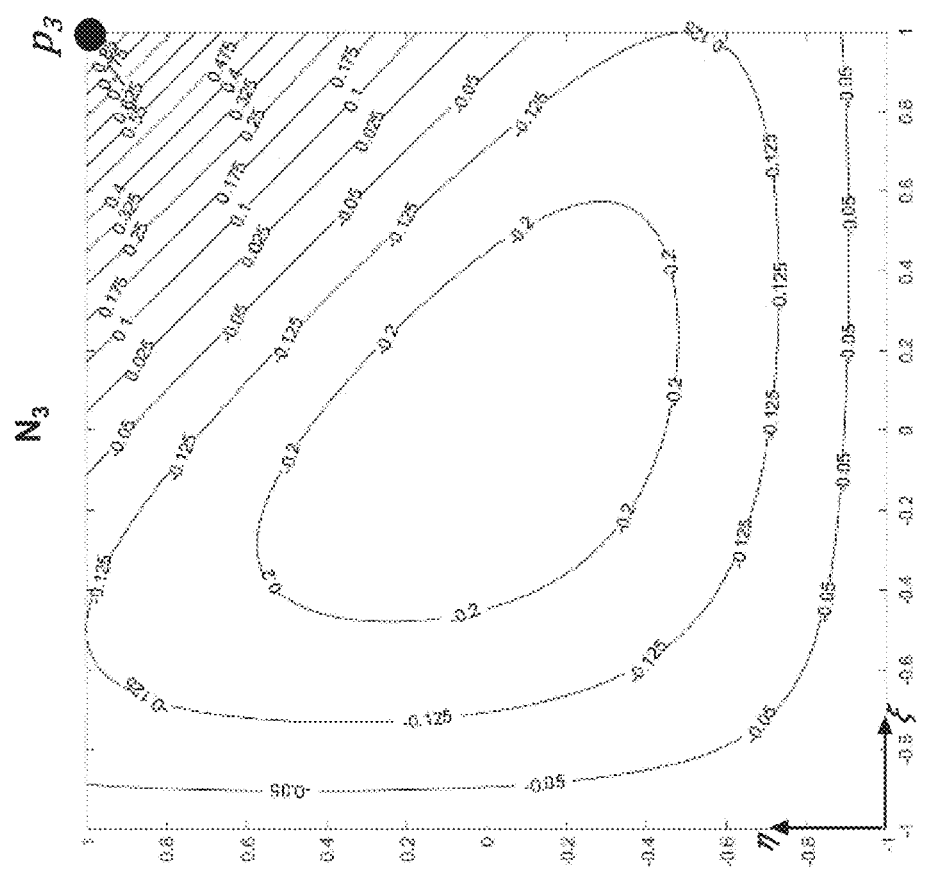
FIG. 25E shows a plurality of level set contours of a basis function defined on a third corner node of the 8-noded quadratic quadrilateral element.
Figure 25H:
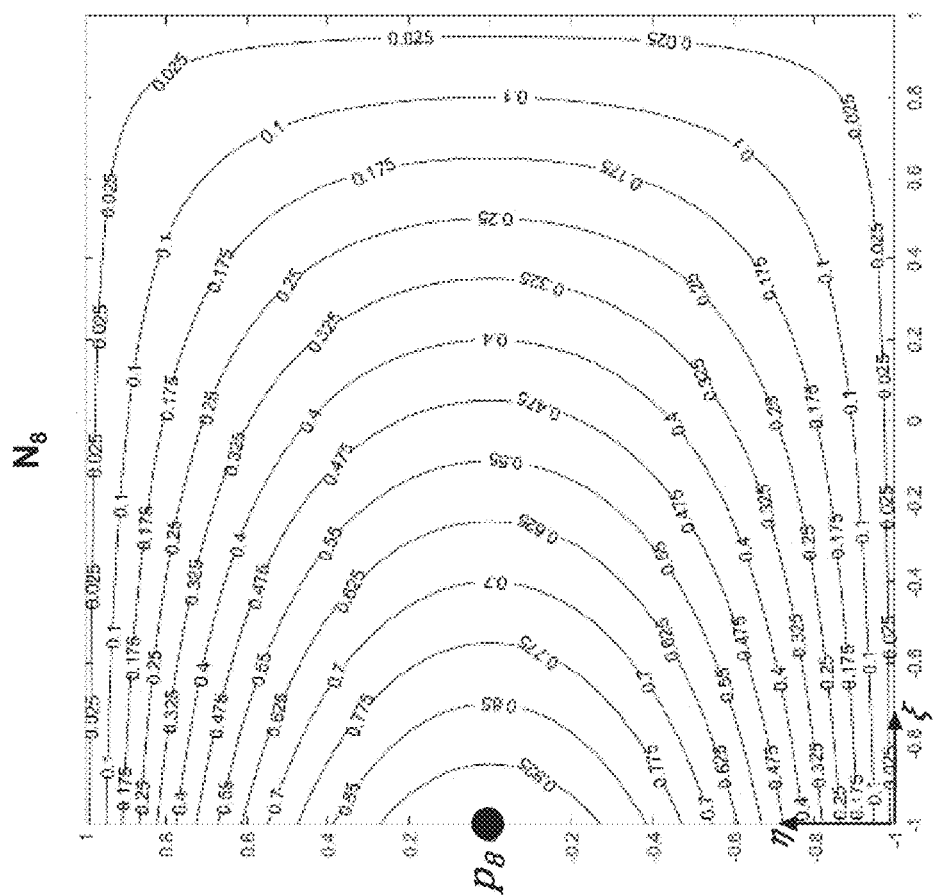
FIG. 25H shows a plurality of level set contours of a basis function defined on a fourth mid-side node of the 8-noded quadratic quadrilateral element.
Figure 25G:
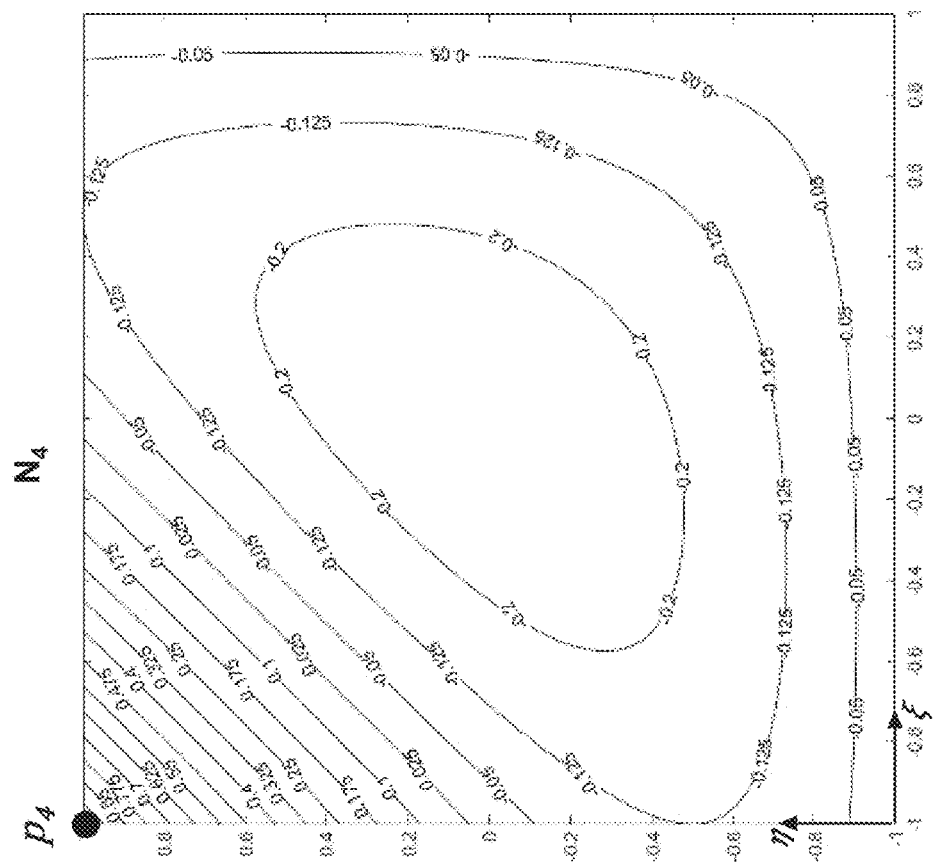
FIG. 25G shows a plurality of level set contours of a basis function defined on a fourth corner node of the 8-noded quadratic quadrilateral element.
Figure 26:
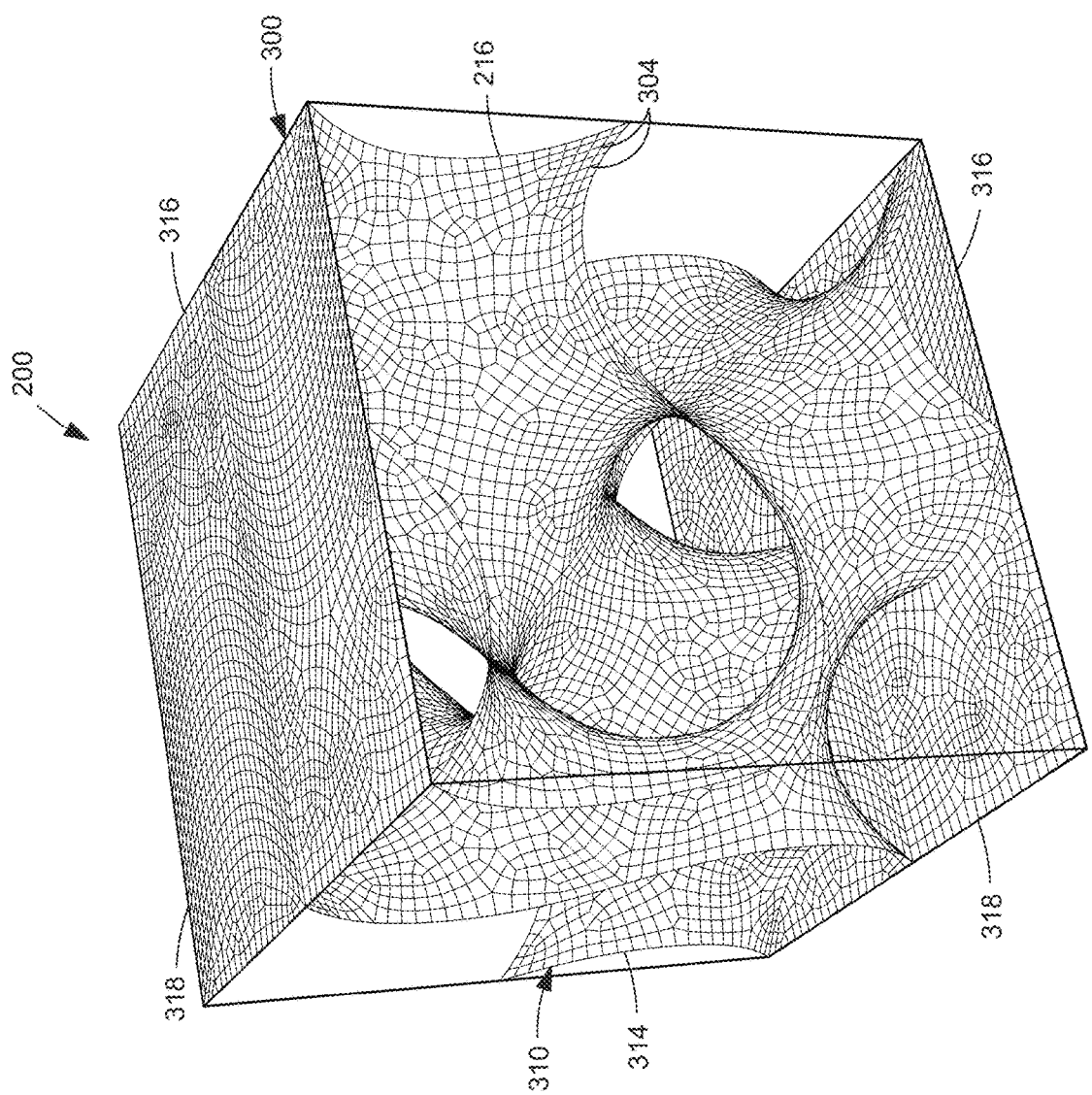
FIG. 26 is an example of a reference unit cell mesh fitting exactly within the cube of FIG. 23.

Referring to FIGS. 21-27, step 706 of mapping reference unit cell meshes 300 is now described with regard to the method 900 of FIG. 21, which is directed toward mapping the reference unit cell meshes 300 onto a plurality of hexahedral elements 154 respectively associated with quadratic quadrilateral elements 152 of a driver mesh 142. FIG. 22 shows an example of a portion of a driver mesh 142 comprised of quadratic quadrilateral elements 152. As mentioned above, each quadratic quadrilateral element 152 has 4 corner nodes 158 ($p_1 \ldots p_4$) and 4 mid-side nodes 160 ($p_5 \ldots p_8$) in real space 140. FIG. 23 shows a cube 202 in isoparametric space 200, and the corresponding location of the nodes $p_1 \ldots p_8$ on the cube 202. FIG. 24 shows an example of a hexahedral element 154 associated with the quadratic quadrilateral element 152 of FIG. 22.

Figure 27:
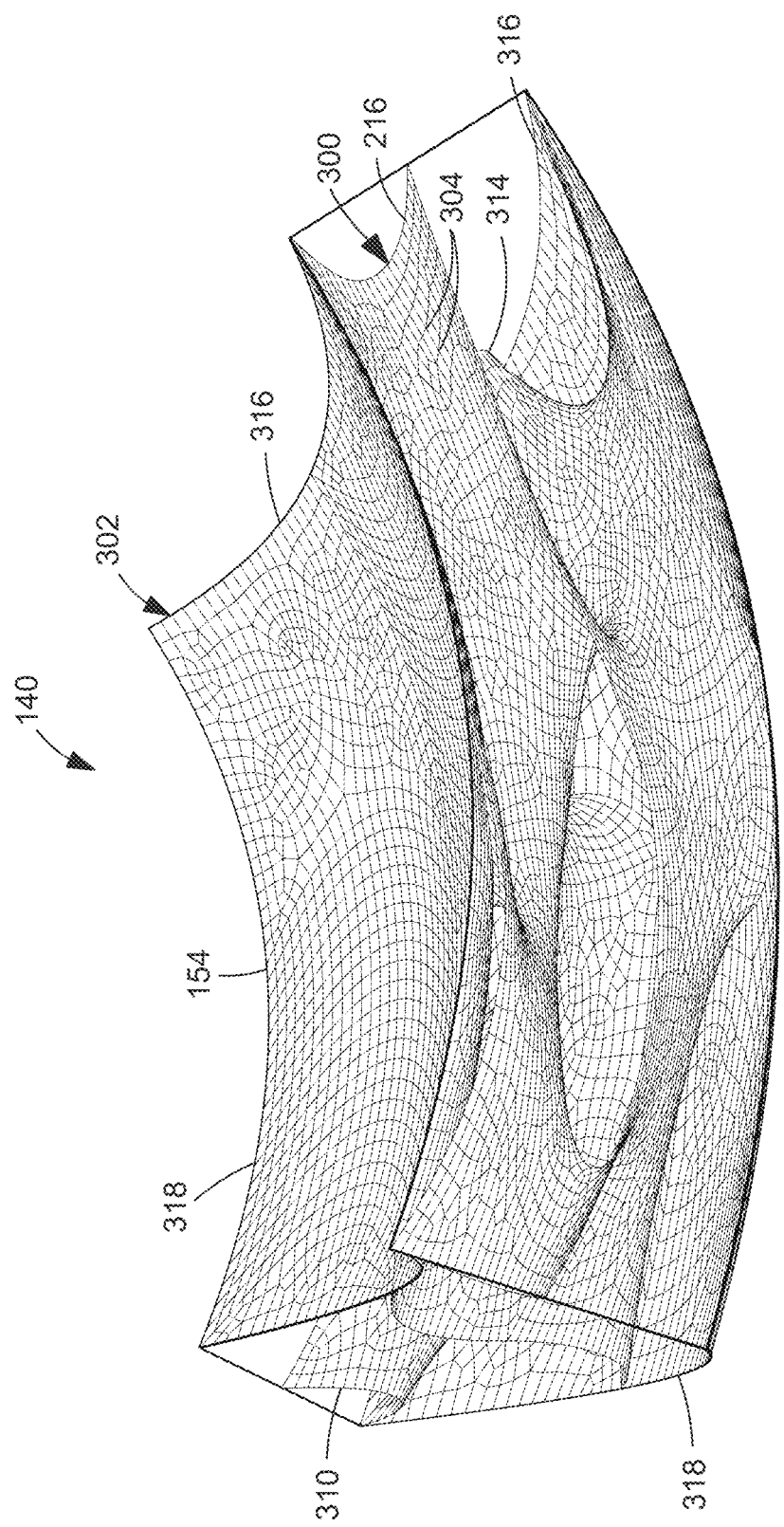
FIG. 27 shows the reference unit cell mesh of FIG. 26 mapped onto the hexahedral element of FIG. 24.

Similar to the above-described process of mapping a reference unit cell mesh 300 onto a hexahedral element 154 associated with a linear quadrilateral element 150 through the use of linear basis functions, the method 900 of FIG. 21 describes the process of mapping a reference unit cell mesh 300 onto a hexahedral element 154 associated with a quadratic quadrilateral element 152 through the use of quadratic basis functions. FIG. 25 shows 8 groups of level set contours respectively associated with the 8 quadratic basis functions $N_1 \ldots N_8$ defined on an 8-noded quadratic quadrilateral element 152. The level set contours indicate the weight of a given corner node 158 across the 8-noded quadratic quadrilateral element 152. FIG. 27 shows the reference unit cell mesh 300 of FIG. 26 after being mapped onto the hexahedral element 154 (e.g., FIG. 24), associated with the quadratic quadrilateral 152 (FIG. 22), belonging to the driver mesh 142.

Referring to FIGS. 23-27, the method 900 of mapping the reference unit cell mesh 300 onto a hexahedral element 154 associated with a quadratic quadrilateral element 152 of a driver mesh 142 comprises sequentially performing steps 902, 904, and 906 for each quadratic quadrilateral element 152 of a driver mesh 142. Step 902 comprises computing the nodal averaged normal vectors $n_1 \ldots n_4$ (FIG. 24) of the corner nodes 158 ($p_1 \ldots p_4$) of the quadratic quadrilateral element 152 in real space 140, as described above.

After computing the nodal averaged normal vectors $n_1 \ldots n_4$, step 904 comprises computing the mid-side normal vectors ($n_5 \ldots n_8$) of the quadratic quadrilateral element 152 by taking, for each mid-side normal vector, the average of the normal vectors at the corner nodes 158 on opposite ends of the edge 162 upon which the mid-side node 160 lies, using the following equations:

$$n_x = \frac{1}{2}(n_{A_x} + n_{B_x}) \quad \text{(Equation 628)}$$

$$n_y = \frac{1}{2}(n_{A_y} + n_{B_y}) \quad \text{(Equation 630)}$$

$$n_z = \frac{1}{2}(n_{A_z} + n_{B_z}) \quad \text{(Equation 632)}$$

wherein:

$n_{A_x}$, $n_{A_y}$ and $n_{A_z}$ are the x, y and z component respectively of the nodal averaged normal vector of the first corner node 158 of the edge 162 on which the mid-side node 160 lies;

$n_{B_x}$, $n_{B_y}$ and $n_{B_z}$ are the x, y and z components respectively of the second corner node 158 of the edge 162 on which the mid-side node 160 lies; and $n_x$, $n_y$ and $n_z$ are the x, y and z components respectively of the mid-side nodal averaged normal vector.

Step 906 comprises sequentially performing the following computations for each cell mesh node 304 of the reference unit cell mesh 300. Initially, step 906 includes computing the quadratic basis functions $N_1 \ldots N_8$ of the cell mesh node 304, using the following equations:

$$N_1 = \frac{1}{4}(1-\xi)(1-\eta)(-\xi-\eta-1) \quad \text{(Equation 634)}$$

$$N_2 = \frac{1}{4}(1+\xi)(1-\eta)(\xi-\eta-1) \quad \text{(Equation 636)}$$

$$N_3 = \frac{1}{4}(1+\xi)(1+\eta)(\xi+\eta-1) \quad \text{(Equation 638)}$$

$$N_4 = \frac{1}{4}(1-\xi)(1+\eta)(-\xi+\eta-1) \quad \text{(Equation 640)}$$

$$N_5 = \frac{1}{2}(1-\eta)(1+\xi)(1-\xi) \quad \text{(Equation 642)}$$

$$N_6 = \frac{1}{2}(1+\eta)(1+\xi)(1-\eta) \quad \text{(Equation 644)}$$

$$N_7 = \frac{1}{2}(1+\eta)(1+\xi)(1-\xi) \quad \text{(Equation 646)}$$

$$N_8 = \frac{1}{2}(1+\eta)(1-\xi)(1-\eta) \quad \text{(Equation 648)}$$

wherein $\eta$ and $\xi$ (e.g., see FIG. 23) are the coordinates of the cell mesh node 304 in isoparametric space 200.

After computing the quadratic basis functions $N_1 \ldots N_8$, step 906 comprises computing the normal vector $\eta=(n_x, n_y, n_z)$ of the panel mid-surface 126 at the position of the cell mesh node 304 in real space 140, using the following equations:

$$n_x = \Sigma_{i=1}^{8} N_i n_{i_x} \quad \text{(Equation 650)}$$

$$n_y = \Sigma_{i=1}^{8} N_i n_{i_y} \quad \text{(Equation 652)}$$

$$n_z = \Sigma_{i=1}^{8} N_i n_{i_z} \quad \text{(Equation 654)}$$

wherein $n_{i_x}$, $n_{i_y}$, and $n_{i_z}$ are respectively the x, y, and z components (in the real coordinate system—e.g., FIG. 24) of the nodal averaged normal vectors $n_1 \ldots n_8$.

After computing $n_{i_x}$, $n_{i_y}$, and $n_{i_z}$, step 906 comprises computing the position vector $p=(p_x, p_y, p_z)^T$ of the cell mesh node 304 in real space 140, using the following equations:

$$p_x = \sum_{i=1}^{8} N_i p_{i_x} + \frac{1}{2}\zeta n_x t \quad \text{(Equation 656)}$$

$$p_y = \sum_{i=1}^{8} N_i p_{i_y} + \frac{1}{2}\zeta n_y t \quad \text{(Equation 658)}$$

$$p_z = \sum_{i=1}^{8} N_i p_{i_z} + \frac{1}{2}\zeta n_z t \quad \text{(Equation 660)}$$

wherein:

$n_{i_x}$, $n_{i_y}$, and $n_{i_z}$ are respectively the x, y, and z components (relative to the real coordinate system) of the nodal averaged normal vectors $n_1 \ldots n_8$ at the nodes $p_1 \ldots p_8$ respectively;

$p_{i_x}$, $p_{i_y}$, and $p_{i_z}$ are respectively the x, y, and z components (relative to the real coordinate system) of the position vectors $p_1 \ldots p_8$;

t is the local panel thickness of the sandwich panel 120. Here, thickness t refers to the total thickness of the sandwich panel 120, including the two face sheets 102, 104 and the panel infill geometry 166.

After the mapping step 706 is complete, the method 700 includes step 708 of stitching together the mapped unit cell meshes 302 to form a stitched mesh 130 (e.g., FIGS. 28-29). The stitching process initially includes checking pairs of cell mesh nodes 304 for duplicates that share a common set of coordinates in real space 140. Duplicate cell mesh nodes 304 will occur along the edges of adjacent (e.g., abutting) mapped unit cell meshes 302. Upon identifying the duplicates, step 708 further includes deleting one of the duplicates, and updating the cell information to refer to the cell mesh node 304 that is retained.

Referring to FIGS. 28-29, shown is an example of a panel digital representation (e.g., a stitched mesh 130) of a sandwich panel 120 having a panel geometry comprised of the panel infill geometry 166, and both of the panel face sheet geometries 170 of the first and second face sheets 102, 104, as generated using the above-described method 700. The panel geometry is comprised of a plurality of mapped unit cell meshes 302, stitched together into a single mesh of the sandwich panel 120, and is the result of mapping the reference unit cell meshes 300 onto the hexahedral elements 154 associated with the quadrilateral elements 148 of the driver mesh 142 of FIG. 10. The panel face sheet geometries 170 of the panel digital representation are integrated into the unit cell geometry 210 (e.g., FIG. 26), and are therefore automatically generated upon mapping and stitching.

Figure 30:
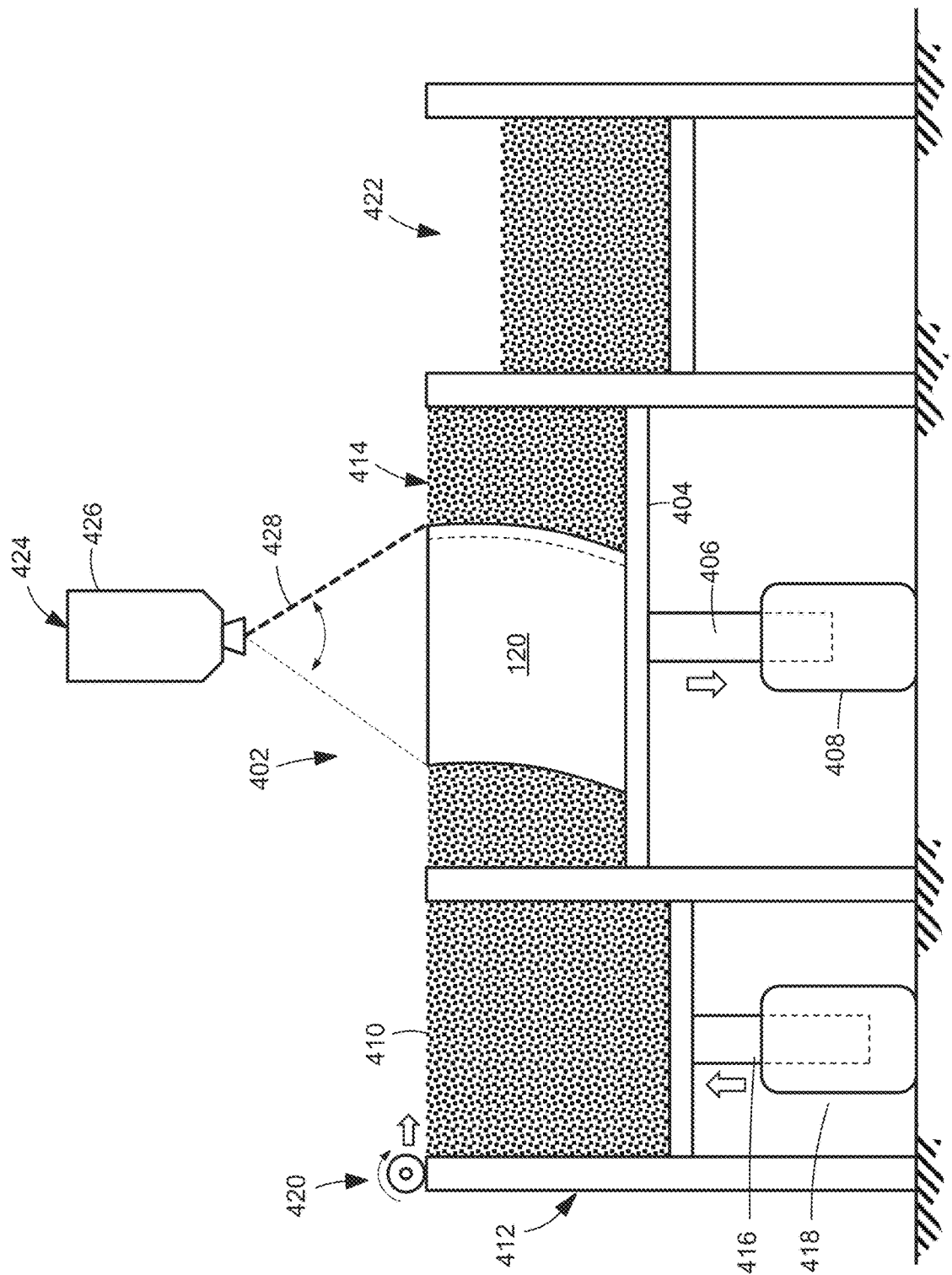
FIG. 30 is a side view of an example of an additive manufacturing apparatus for fabricating a sandwich panel having a panel infill geometry generated using the presently-disclosed system and method.
Figure 31:
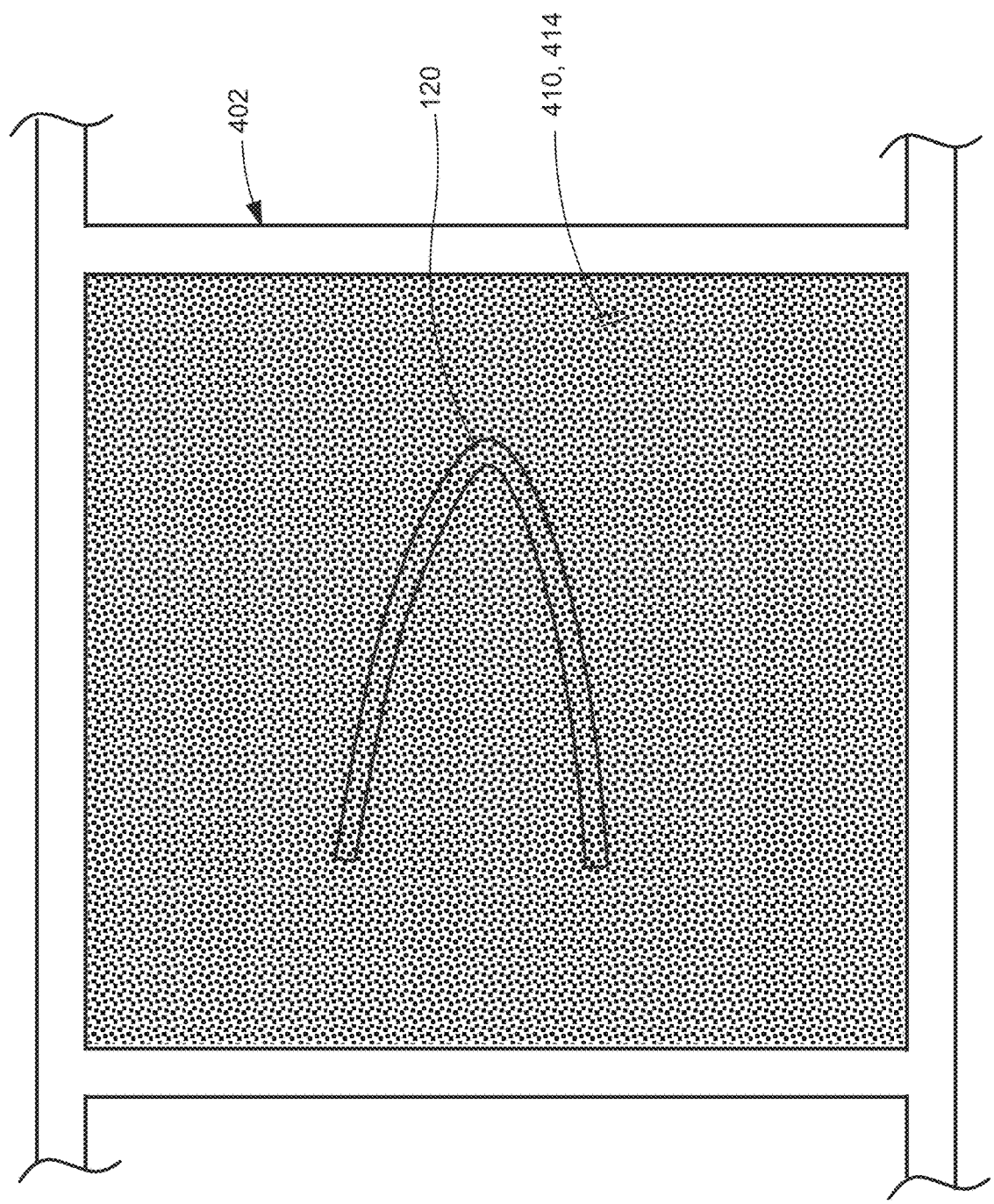
FIG. 31 is a section view of the additive manufacturing apparatus of FIG. 30.
Figure 70:
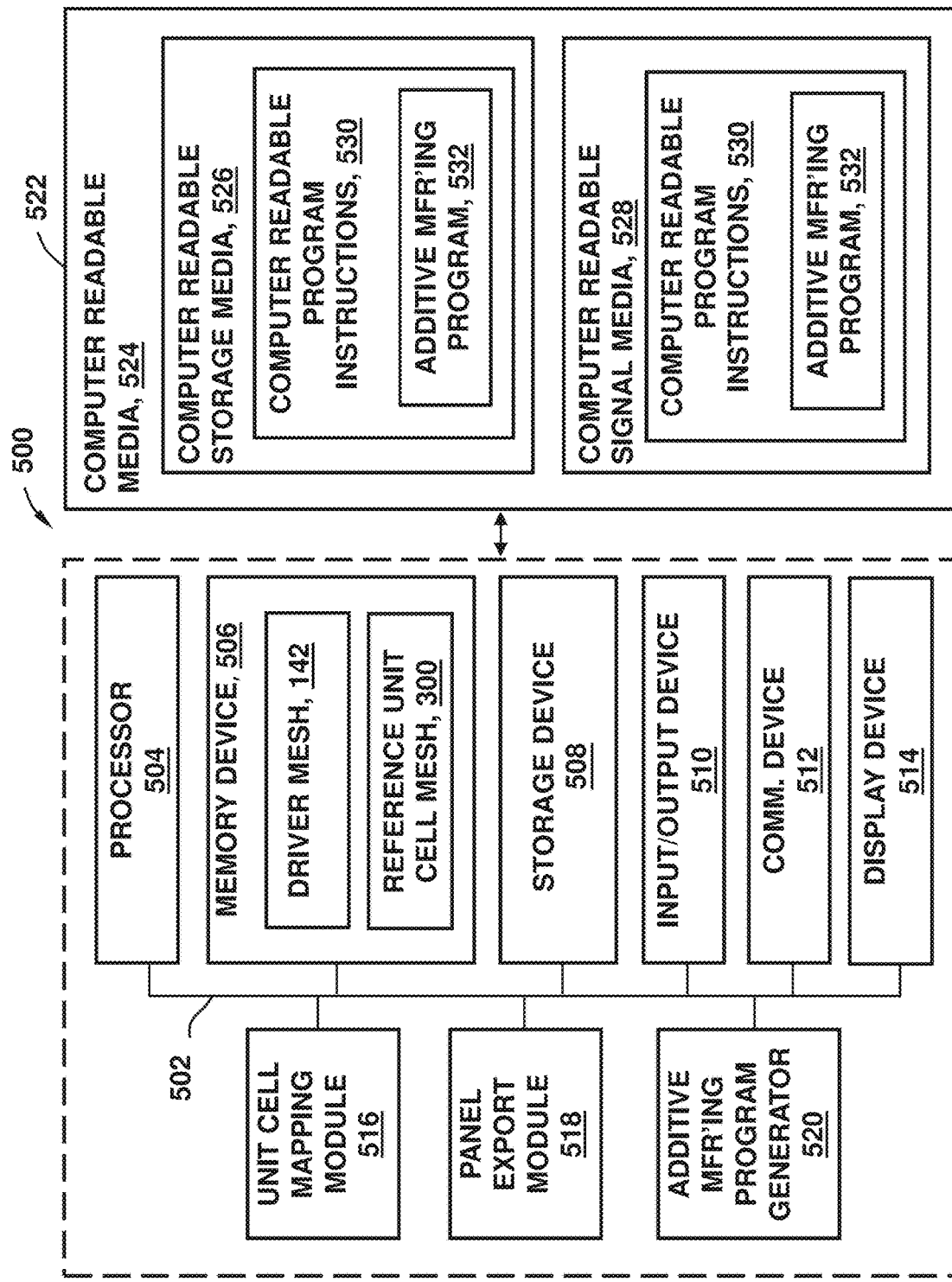
FIG. 70 is a block diagram of an example of a processor-based system for implementing the presently-disclosed method for generating a panel infill geometry of a sandwich panel.

Referring to FIGS. 30-31, the method 700, in some examples, includes using the panel digital representation to develop an additive manufacturing program 532 (i.e., a software program—see FIG. 70). The additive manufacturing program 532 can be used by an additive manufacturing apparatus 400 to fabricate the sandwich panel 120. FIGS. 30-31 show an example of an additive manufacturing apparatus 400 for fabricating the sandwich panel 120 of FIGS. 28-29. As mentioned above, additive manufacturing involves the successive application and solidification of layers of material on top of each other.

In the example of FIGS. 30-31, the additive manufacturing apparatus 400 is configured as a powder bed fusion machine that uses selective laser melting for additive manufacturing. The additive manufacturing apparatus 400 includes a powder supply chamber 412 containing a powder 410. The powder 410 may be a polymeric powder, a ceramic powder, a metal powder, or any combination thereof. The powder supply chamber 412 is vertically movable via a powder supply piston 416, which is actuated by a powder supply actuator 418.

The additive manufacturing apparatus 400 includes a powder leveling apparatus 420 (e.g., a roller) and a build chamber 402. The build chamber 402 includes a build platform 404 that supports a powder bed 414. The build platform 404 is vertically movable in a stepwise manner via a build platform piston 406, which is actuated by a build platform actuator 408. The additive manufacturing apparatus 400 further includes an energy source 424 or heat source, such as a laser device 426 configured to emit a laser beam 428. During additive manufacturing of the sandwich panel 120, the powder leveling apparatus 420 periodically moves across the powder 410 contained within the powder supply chamber 412 and onto the powder bed 414, to thereby distribute a thin layer of powder 410 onto the powder bed 414. The excess powder 410 falls into the powder overflow chamber 422.

The laser beam 428 is moved in a manner to form the cross-sectional shape of a slice of the panel digital representation of the sandwich panel 120, as shown in FIG. 31. The laser beam 428 melts and fuses the powder 410 particles into a solid layer in the shape of the slice. The build platform 404 is moved incrementally downwardly, via the build platform piston 406 after which the powder leveling apparatus 420 distributes a new layer of powder 410 on the existing powder 410 in the powder bed 414 of the build chamber 402. The process is repeated layer by layer until the manufacturing of the sandwich panel 120 is complete. Although the additive manufacturing apparatus 400 is shown and described as a selective laser melting system (e.g., a laser-based powder bed fusion system), any one of a variety of alternative types of additive manufacturing technologies (e.g., electron beam melting, direct energy deposition, supersonic particle deposition, binder jetting, etc.) may be implemented for manufacturing sandwich panels 120 using the presently-disclosed method.

Figure 32:
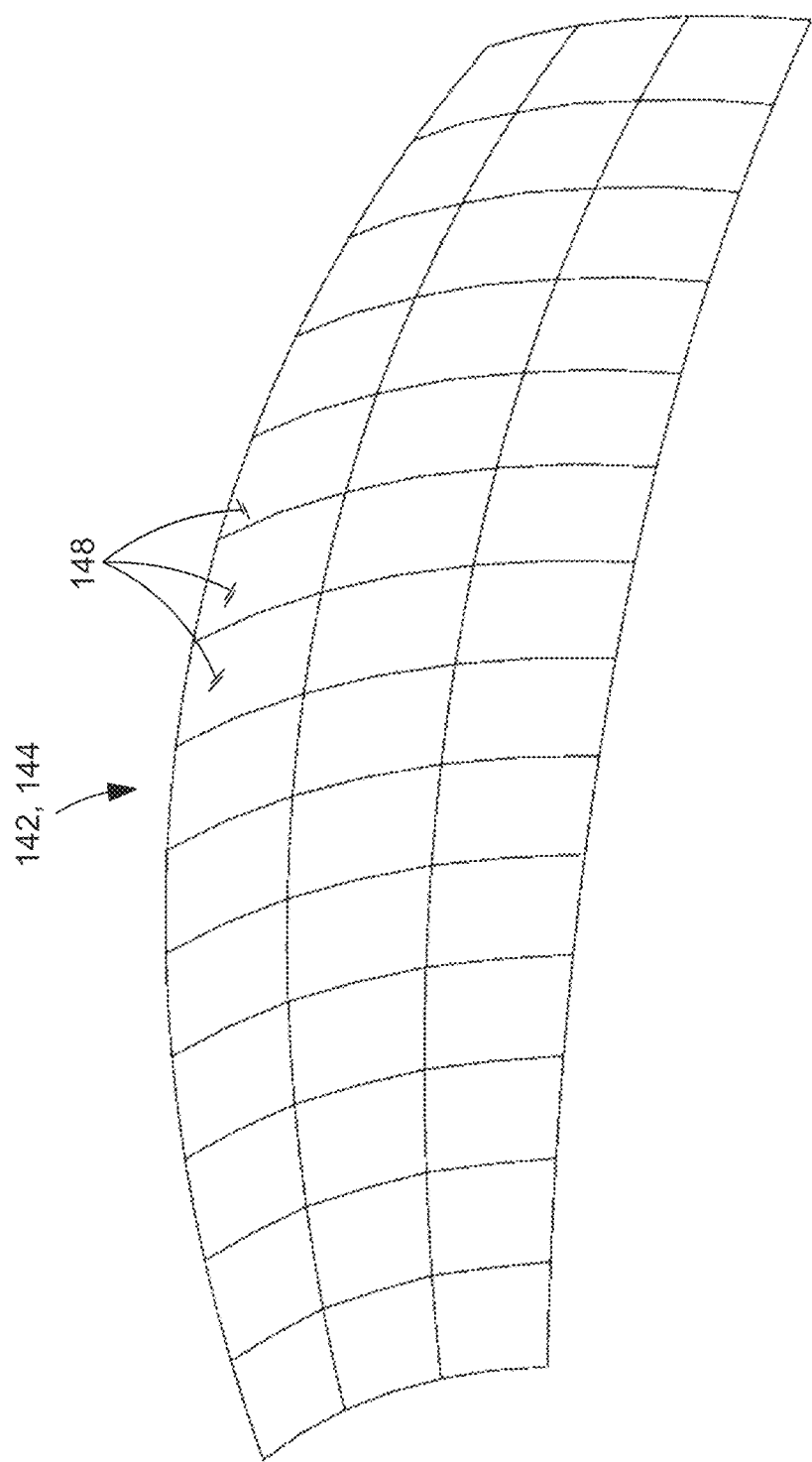
FIG. 32 is a perspective view of an example of a driver mesh.

Referring to FIG. 32, shown is an example of a driver mesh 142. FIGS. 33-56 show non-exclusive examples of different configurations of the unit cell geometry 210. Also shown is the panel infill geometry 166 that results from mapping each of the different unit cell geometries 210 onto the driver mesh 142 of FIG. 32, using the above-described step 706. As mentioned above, the driver mesh 142 of FIG. 32 is an example of a structured driver mesh 144, which may be described as a pattern of quadrilateral elements 148 that can be mapped into a square domain with uniform rows and columns.

FIG. 33 shows a unit cell geometry 210 having a unit infill geometry 310 configured as a hexagonal honeycomb 220, and having a unit face sheet geometry 316 on both the top and bottom ends of the hexagonal honeycomb 220. FIG. 34 shows a reference unit cell mesh 300 representing the unit cell geometry 210 of FIG. 33. The reference unit cell mesh 300 includes a unit infill mesh 314, and a pair of unit face sheet meshes 318 on the top and bottom ends of the unit infill mesh 314. In the example shown, the reference unit cell mesh 300 is comprised of shell elements 306 (e.g., quadrilateral elements). FIG. 35 shows an example of a surface-based sandwich panel 120 produced by mapping the reference unit cell mesh 300 of FIG. 34 onto a plurality of hexahedral elements 154 (not shown) respectively associated with the plurality of quadrilateral elements 148 contained in the driver mesh 142 of FIG. 32, and resulting in a plurality of mapped unit cell meshes 302 collectively forming a panel infill mesh 168 having a panel infill geometry 166. In FIG. 35, the panel face sheet meshes 172 representing the first and second face sheets 102, 104 have been omitted for clarity.

FIG. 36 shows an example of solid-based sandwich panel 120 produced by mapping a reference unit cell mesh 300 comprised of solid elements 308 (e.g., tetrahedral elements) onto a plurality of hexahedral elements 154 (not shown) respectively associated with the plurality of quadrilateral elements 148 of the driver mesh 142 of FIG. 32. The sandwich panel 120 of FIG. 36 includes the panel infill geometry 166, and the panel face sheet geometry 170 of the first and second face sheets 102, 104.

The sandwich panel 120 of FIG. 36 includes a first face sheet 102, a second face sheet 104, and the panel infill structure 164. The panel infill structure 164 of the sandwich panel 120 comprises an array of unit infill structures 312 arranged in a single layer connecting the first face sheet 102 to the second face sheet 104. As described above, each unit cell structure 206 is configured to fit exactly within a hexahedral element 154 (FIG. 17). In addition, in isoparametric space 200, each unit cell structure 206 can be described as being periodic with respect to at least the η and ξ directions of the isoparametric cube 202 (e.g., FIGS. 16, 23). Furthermore, each unit cell structure 206 has an orthonormal coordinate system having a main axis 212 that, after mapping, is locally normal to the panel mid-surface 126 between the first face sheet 102 and the second face sheet 104. In isoparametric space 200, the main axis 212 is aligned with the ζ direction of an isoparametric cube 202 (FIGS. 16, 23). After mapping and stitching is complete, each unit cell structure 206 is connected to one or more adjacent unit cell structures 206 due to the periodic nature of the hexagonal honeycomb 220.

As shown in FIG. 36, the first face sheet 102 and the second face sheet 104 each have a surface contour that is non-planar. More specifically, the first face sheet 102 and the second face sheet 104 each have non-zero principal curvatures. The first face sheet 102 and the second face sheet 104 do not have the same principal curvatures. Correspondingly, at the infill/face sheet interfaces 110 with the first face sheet 102, the unit infill structures 312 have a larger cross-sectional size or footprint than the footprint of the unit infill structures 312 at the infill/face sheet interfaces 110 with the second face sheet 104. While these footprints are different, the topology of the footprints is the same. Although FIGS. 33-36 show the unit infill geometry 310 having a honeycomb 220 configuration that has flat hexagonal walls, the unit infill geometry 310 may be provided in different configurations. As an example, the hexagonally-arranged walls may be provided with a pattern of holes to facilitate removal of material, such as excess powder following the completion of an additive manufacturing build process.

FIG. 37 shows a unit cell geometry 210 having a unit infill geometry 310 in a gyroid 216 configuration. The unit cell geometry 210 also has a unit face sheet geometry 316 located on each of the top and bottom ends of the gyroid 216. FIG. 38 shows a reference unit cell mesh 300 representing the unit cell geometry 210 of FIG. 37. As mentioned above, the reference unit cell mesh 300 includes a unit infill mesh 314, and a pair of unit face sheet meshes 318 on opposite ends of the unit infill mesh 314. In the example shown, the reference unit cell mesh 300 is comprised of shell elements 306. Alternatively, the reference unit cell mesh 300 can be provided as a solid unit cell comprised of solid elements 308 (e.g., tetrahedral elements), as shown in above-described FIG. 13. FIG. 39 shows an example of a surface-based sandwich panel 120 produced by mapping the reference unit cell mesh 300 of FIG. 38 onto a plurality of hexahedral elements 154 (not shown) respectively associated with the plurality of quadrilateral elements 148 contained in the driver mesh 142 of FIG. 32, and resulting in a plurality of mapped unit cell meshes 302 collectively forming a panel infill mesh 168 having a panel infill geometry 166. In FIG. 39, the panel face sheet meshes 172 representing the first and second face sheets 102, 104 have been omitted for clarity.

FIG. 40 shows an example of a solid-based sandwich panel 120 produced by mapping a reference unit cell mesh 300 comprised of solid elements 308 (FIG. 13) onto a plurality of hexahedral elements 154 (not shown) respectively associated with the plurality of quadrilateral elements 148 of the driver mesh 142 of FIG. 32. The sandwich panel 120 of FIG. 40 includes the panel infill geometry 166 (i.e., the panel infill structure 164), and the panel face sheet geometry 170 of the first and second face sheets 102, 104. After mapping and stitching is complete, each unit cell structure 206 is connected to one or more adjacent unit cell structures 206 due to the periodic nature of the gyroid 216.

Figure 41:
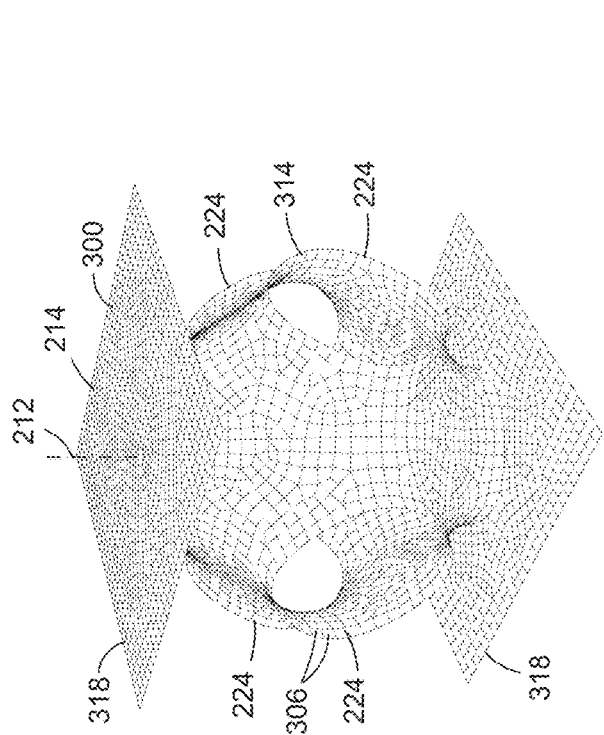
FIG. 41 is a perspective view of an example of a reference unit cell mesh in a Schwarz-P configuration.
Figure 43:
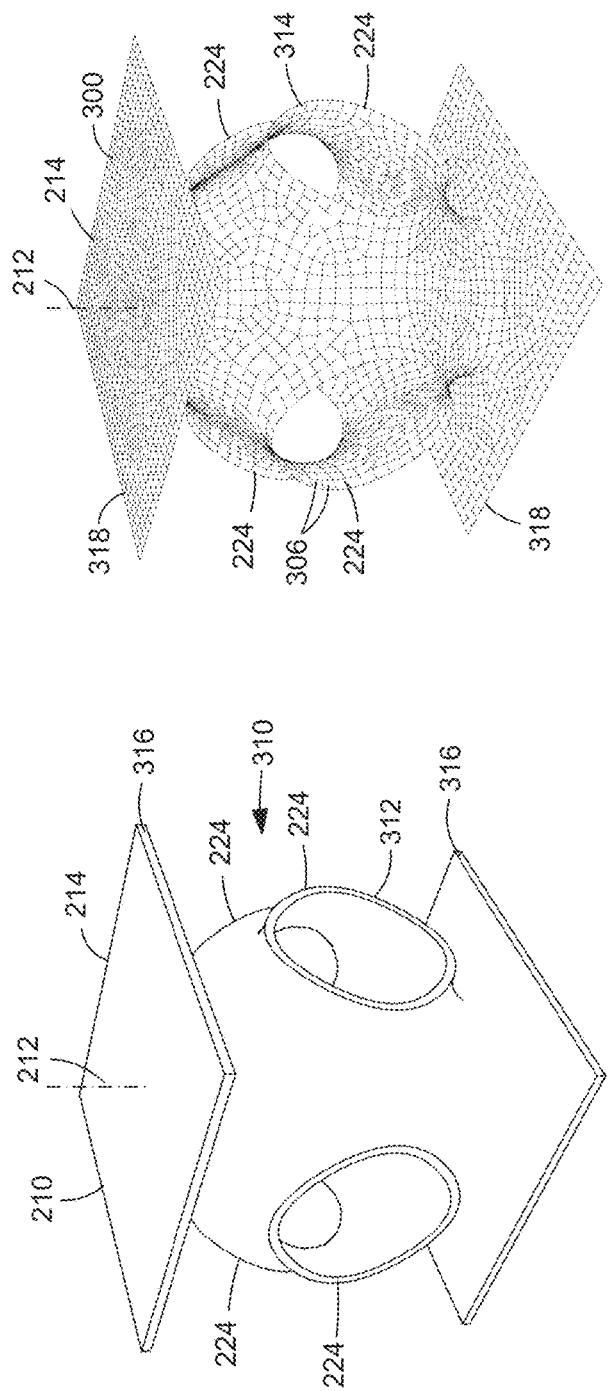
FIG. 43 is a perspective view of a sandwich panel mesh (shown without the face sheet meshes) comprised of shell elements, and generated using the reference unit cell mesh of FIG. 42, mapped onto the hexahedral elements respectively associated with the quadrilateral elements of the driver mesh of FIG. 32.
Figure 42:
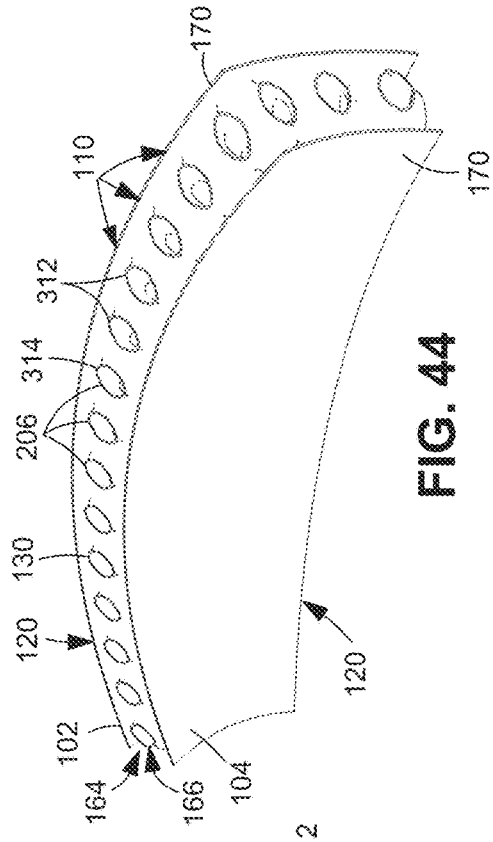
FIG. 42 is a perspective view of a reference unit cell mesh comprised of shell elements, and representing the reference unit cell geometry of FIG. 41.

FIG. 41 shows a unit cell geometry 210 having a unit infill geometry 310 in a Schwarz-P 214 configuration, and having a unit face sheet geometry 316 on both the top and bottom ends of the Schwarz-P 214 configuration. In the example shown, the Schwarz-P 214 configuration has 4 cell branches 224 that are orthogonal to the main axis 212. Each cell branch 224 terminates at one of the faces of the hexahedral element 154 (e.g., FIG. 17). FIG. 42 shows a reference unit cell mesh 300 representing the Schwarz-P 214 configuration of the unit cell geometry 210 of FIG. 41. The reference unit cell mesh 300 includes a unit infill mesh 314, and a pair of unit face sheet meshes 318 respectively on the top and bottom of the unit infill mesh 314. In the example shown, the reference unit cell mesh 300 is comprised of shell elements 306. FIG. 43 shows an example of a surface-based sandwich panel 120 produced by mapping the reference unit cell mesh 300 of FIG. 42 onto a plurality of hexahedral elements 154 (not shown) respectively associated with the plurality of quadrilateral elements 148 contained in the driver mesh 142 of FIG. 32, and resulting in a plurality of mapped unit cell meshes 302 collectively forming a panel infill mesh 168 having a panel infill geometry 166. In FIG. 43, the panel face sheet meshes 172 representing the first and second face sheets 102, 104 have been omitted for clarity.

Figure 44:
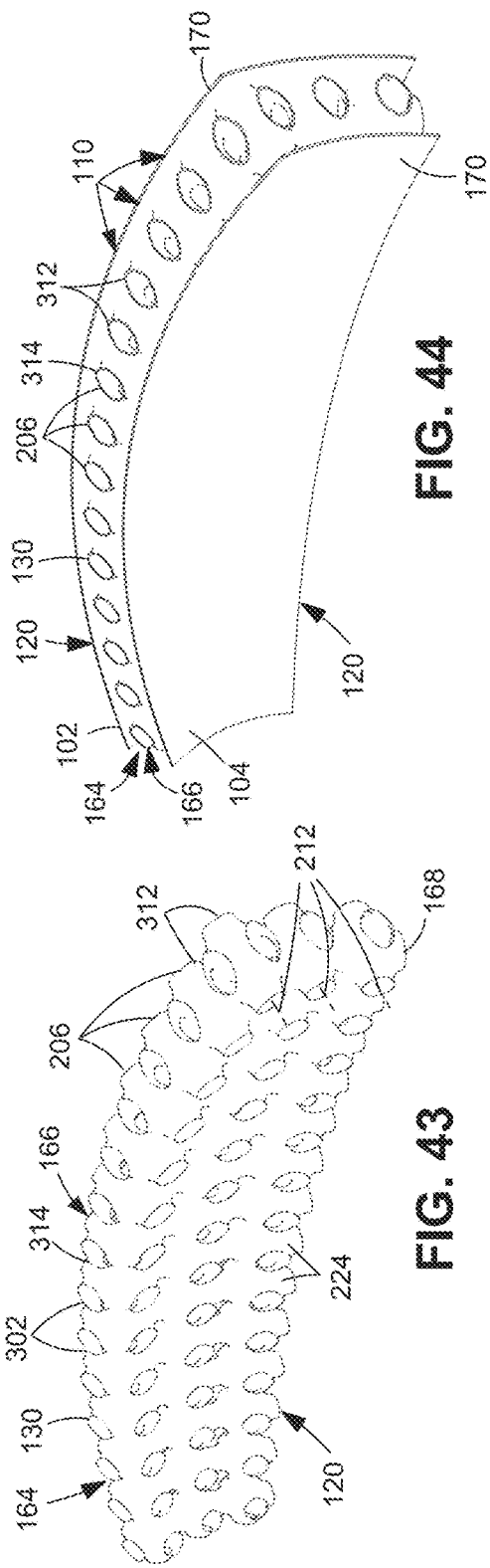
FIG. 44 is a perspective view of a sandwich panel mesh comprised of solid elements, and generated using a solid meshed version (not shown) of the reference unit cell geometry of FIG. 41, mapped onto the hexahedral elements respectively associated with the quadrilateral elements of the driver mesh of FIG. 32.

FIG. 44 shows an example of a sandwich panel 120 produced by mapping a solid-based reference unit cell mesh 300 (not shown) onto a plurality of hexahedral elements 154 (not shown) respectively associated with the plurality of quadrilateral elements 148 of the driver mesh 142 of FIG. 32. Through the above-described process of stitching to remove duplicate cell mesh nodes 304, the unit cell structures 206 of FIGS. 43-44 are interconnected to each other at the cell branches 224 due to the periodic nature of the Schwarz-P 214 configuration. Although not shown the Schwarz-P configuration may be provided with holes to facilitate powder removal following the completion of an additive manufacturing build process.

Figure 46:
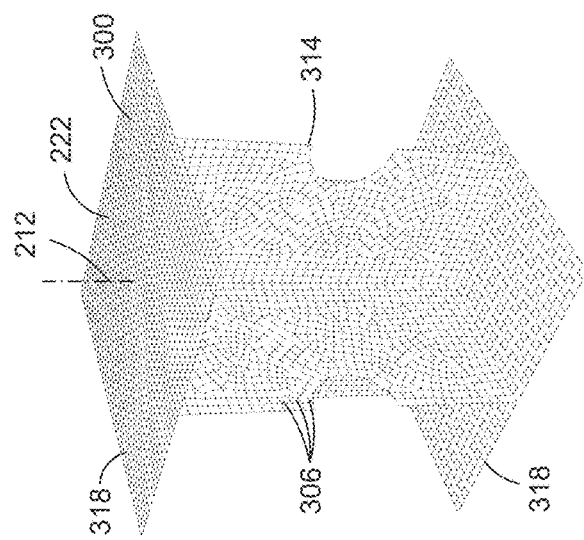
FIG. 46 is a perspective view of a reference unit cell mesh comprised of shell elements, and representing the reference unit cell geometry of FIG. 45.
Figure 45:
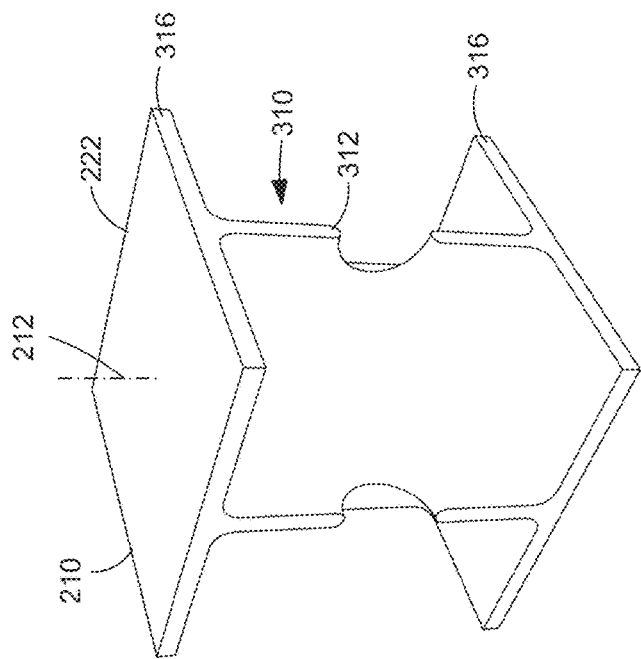
FIG. 45 is a perspective view of an example of a reference unit cell mesh in a waffle configuration.
Figure 47:
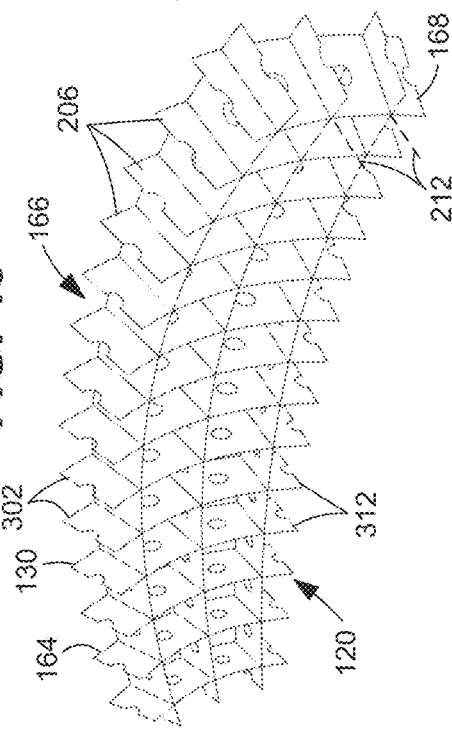
FIG. 47 is a perspective view of a sandwich panel mesh (shown without the face sheet meshes) comprised of shell elements, and generated using the reference unit cell mesh of FIG. 46, mapped onto the hexahedral elements respectively associated with the quadrilateral elements of the driver mesh of FIG. 32.

FIG. 45 shows a unit cell geometry 210 having a unit infill geometry 310 in a waffle 222 configuration. The waffle 222 configuration has waffle walls with a circular hole to facilitate powder removal following an additive manufacturing process. FIG. 46 shows a reference unit cell mesh 300 made up of shell elements 306, and representing the unit cell geometry 210 of FIG. 45. As mentioned above, the reference unit cell mesh 300 of FIG. 46 includes a unit infill mesh 314, and a pair of unit face sheet meshes 318 on the top and bottom of the unit infill mesh 314. FIG. 47 shows an example of a surface-based sandwich panel 120 produced by mapping the reference unit cell mesh 300 of FIG. 46 onto a plurality of hexahedral elements 154 (not shown) respectively associated with the plurality of quadrilateral elements 148 contained in the driver mesh 142 of FIG. 32, and resulting in a plurality of mapped unit cell meshes 302 collectively forming a panel infill mesh 168 having a panel infill geometry 166. In FIG. 47, the panel face sheet meshes 172 representing the first and second face sheets 102, 104 have been omitted for clarity.

Figure 48:
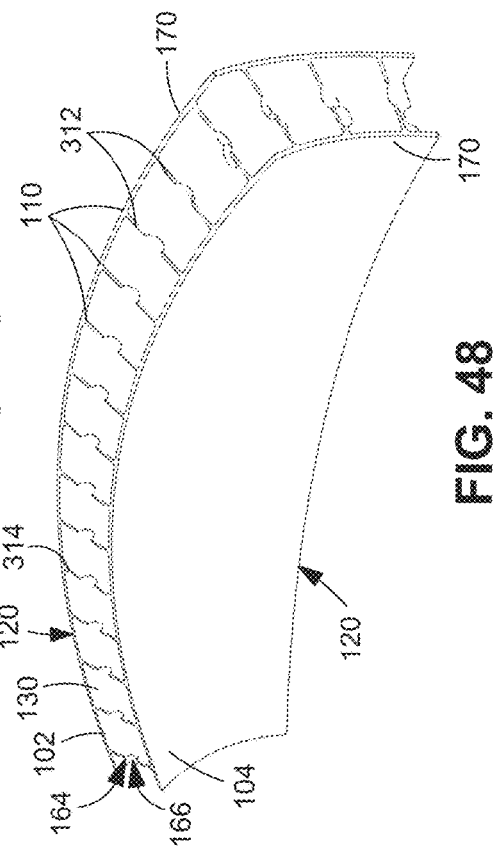
FIG. 48 is a perspective view of a sandwich panel mesh comprised of solid elements, and generated using a solid meshed version (not shown) of the reference unit cell geometry of FIG. 45, mapped onto the hexahedral elements respectively associated with the quadrilateral elements of the driver mesh of FIG. 32.

FIG. 48 shows an example of solid-based sandwich panel 120 produced by mapping a reference unit cell mesh 300 comprised of solid elements 308 (not shown) onto a plurality of hexahedral elements 154 (not shown) respectively associated with the plurality of quadrilateral elements 148 of the driver mesh 142 of FIG. 32. The sandwich panel 120 of FIG. 48 includes the panel infill geometry 166, and the panel face sheet geometry 170 of the first and second face sheets 102, 104. After completion of the above-described stitching process, the unit cell structures 206 of FIGS. 47-48 are interconnected due to their periodic nature. Although not shown here, the waffle 222 configuration can be provided without holes in the waffle walls or, alternatively, the waffle 222 configuration can be provided with one or more holes in an arrangement different to what is shown.

Figure 49:
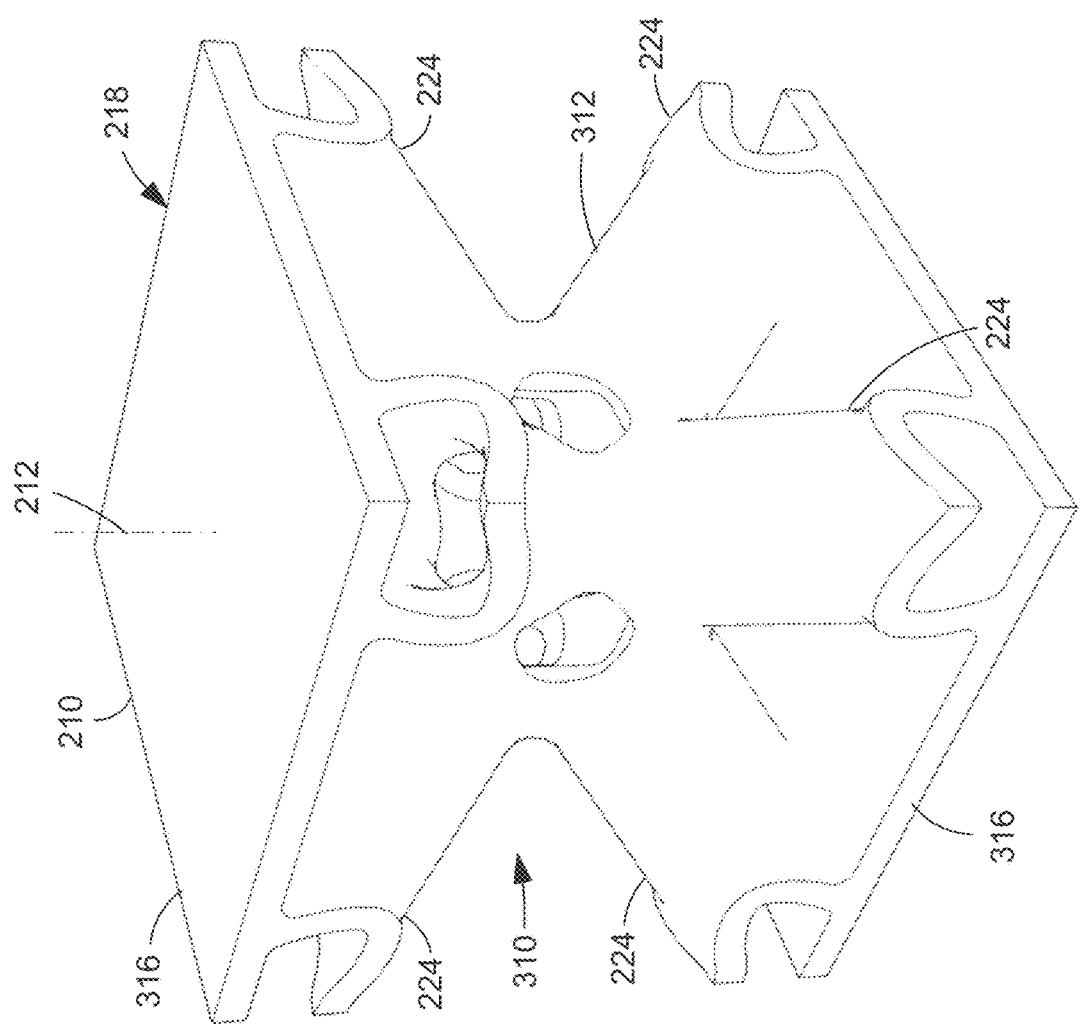
FIG. 49 is a perspective view of an example of a reference unit cell mesh in a body-centered-cubic lattice configuration.
Figure 50:
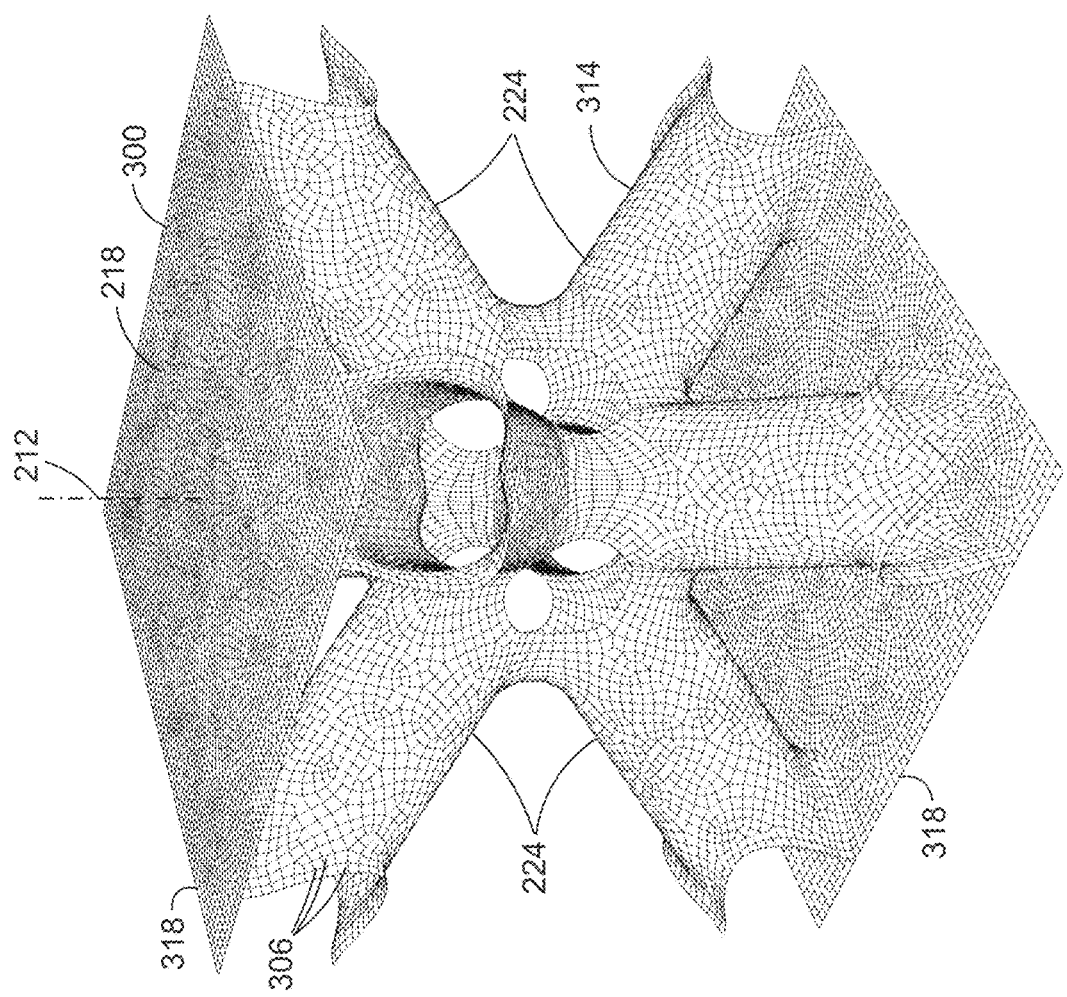
FIG. 50 is a perspective view of a reference unit cell mesh comprised of shell elements, and representing the reference unit cell geometry of FIG. 49.
Figure 51:
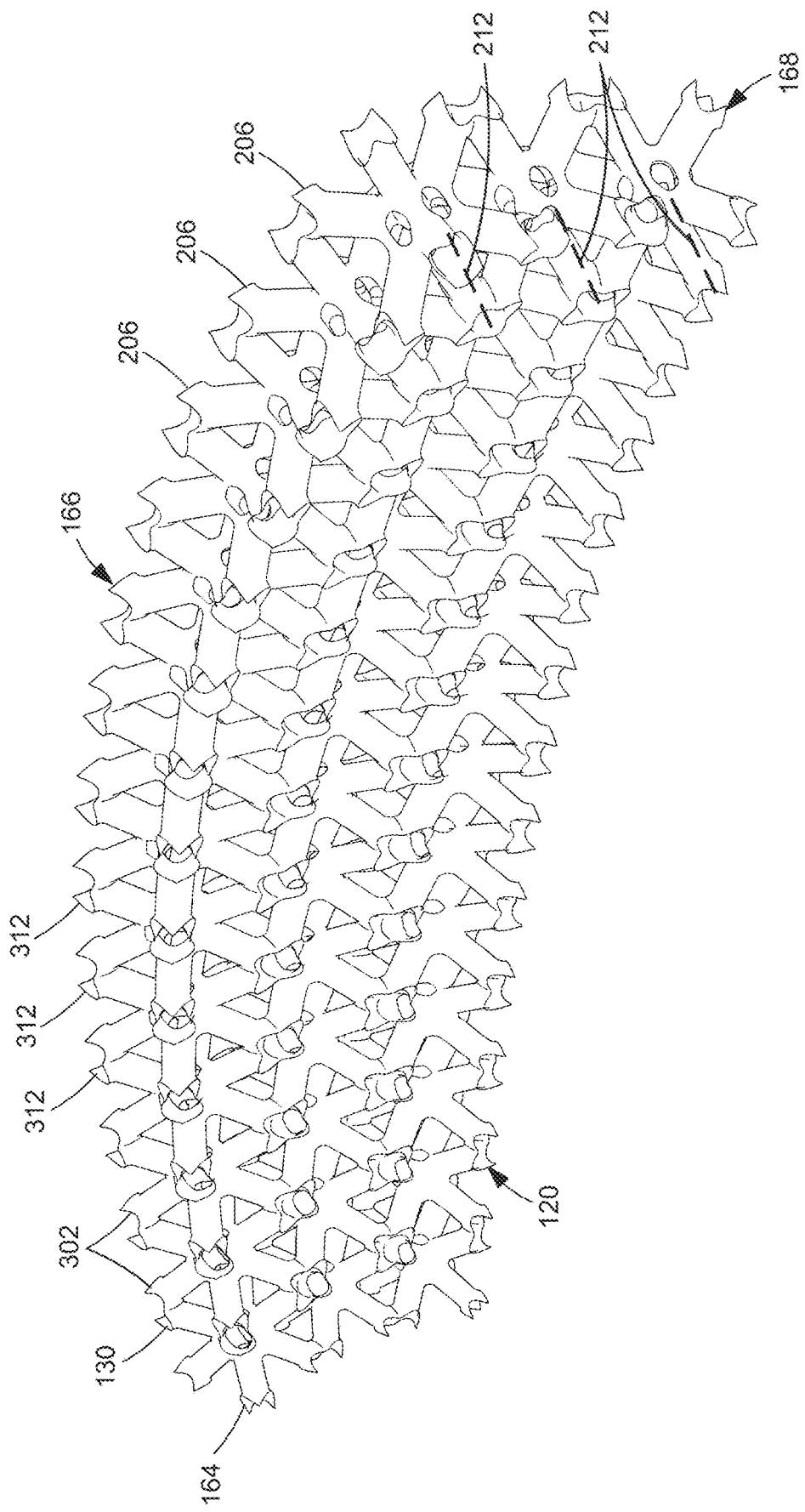
FIG. 51 is a perspective view of a sandwich panel mesh (shown without the face sheet meshes) comprised of shell elements, and generated using the reference unit cell mesh of FIG. 50, mapped onto the hexahedral elements respectively associated with the quadrilateral elements of the driver mesh of FIG. 32.

FIG. 49 shows a unit cell geometry 210 having a unit infill geometry 310 configured as a body-centered-cubic lattice 218, and having a unit face sheet geometry 316 on both the top and bottom ends of the body-centered-cubic lattice 218. FIG. 50 shows a surface-based reference unit cell mesh 300 representing the unit cell geometry 210 of FIG. 49. The reference unit cell mesh 300 includes a unit infill mesh 314, and a pair of unit face sheet meshes 318 on the top and bottom of the unit infill mesh 314. FIG. 51 shows an example of a surface-based sandwich panel 120 produced by mapping the reference unit cell mesh 300 of FIG. 50 onto a plurality of hexahedral elements 154 (not shown) respectively associated with the plurality of quadrilateral elements 148 contained in the driver mesh 142 of FIG. 32, and resulting in a plurality of mapped unit cell meshes 302 collectively forming a panel infill mesh 168 having a panel infill geometry 166. In FIG. 51, the panel face sheet meshes 172 representing the first and second face sheets 102, 104 have been omitted for clarity.

Figure 52:
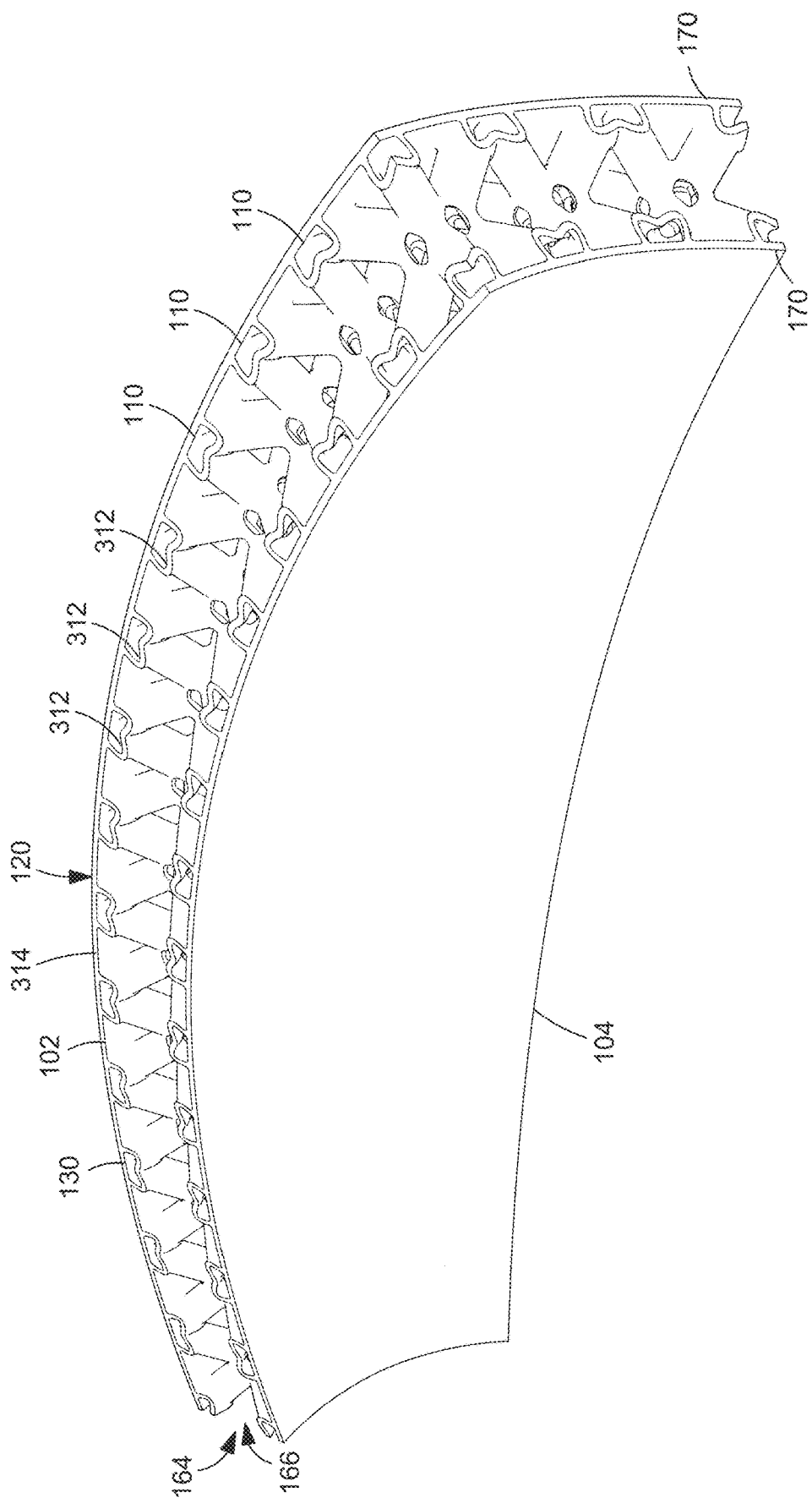
FIG. 52 is a perspective view of a sandwich panel mesh comprised of solid elements, and generated using a solid meshed version (not shown) of the reference unit cell geometry of FIG. 49, mapped onto the hexahedral elements respectively associated with the quadrilateral elements of the driver mesh of FIG. 32.

FIG. 52 shows an example of a solid-based sandwich panel 120 produced by mapping a reference unit cell mesh 300 comprised of solid elements 308 (not shown) onto a plurality of hexahedral elements 154 (not shown) respectively associated with the plurality of quadrilateral elements 148 of the driver mesh 142 of FIG. 32. The sandwich panel 120 of FIG. 52 includes the panel infill geometry 166, and the panel face sheet geometry 170 of the first and second face sheets 102, 104. After completion of the stitching process to remove duplicate cell mesh nodes, the unit cell structures 206 in FIGS. 51-52 are interconnected due to the periodic nature of the body-centered-cubic lattice 218. Although shown with holes in FIGS. 49-52, the body-centered-cubic lattice 218 may be provided without holes or, alternatively, the body-centered-cubic lattice 218 may be provided with one or more holes in an arrangement different to what is shown.

Referring to FIGS. 53-56, shown in FIG. 53 is an example of the above-described multi-layer unit cell geometry 226, in which the multi-layer unit infill geometry 230 includes 2 or more side-by-side stacks of unit infill structures 312. More specifically, the multi-layer unit infill geometry 230 of FIG. 53 is a 3×3×3 arrangement having 3 layers of unit infill structures 312 stacked on top of each other, and each layer has a 3×3 arrangement of unit infill structures 312, for a total of 27 unit infill structures 312 included in the multi-layer unit infill geometry 230. As mentioned above, each unit infill structure 312 is a gyroid 216 configuration, which is triply periodic (i.e., periodic in the η, ξ and ζ directions). The multi-layer unit cell geometry 226 of FIG. 53 has a unit face sheet geometry 316 on both the top and bottom of the multi-layer unit infill geometry 230. FIG. 54 shows the above-described multi-layer unit cell mesh 228 representing the multi-layer unit cell geometry 226 of FIG. 53. In the example shown, the reference unit cell mesh 300 is comprised of shell elements 306 (e.g., quadrilateral elements). The multi-layer unit cell mesh 228 includes the multi-layer unit infill mesh 232, and a pair of unit face sheet meshes 318 respectively on the top and bottom of the multi-layer unit infill mesh 232.

Figure 55:
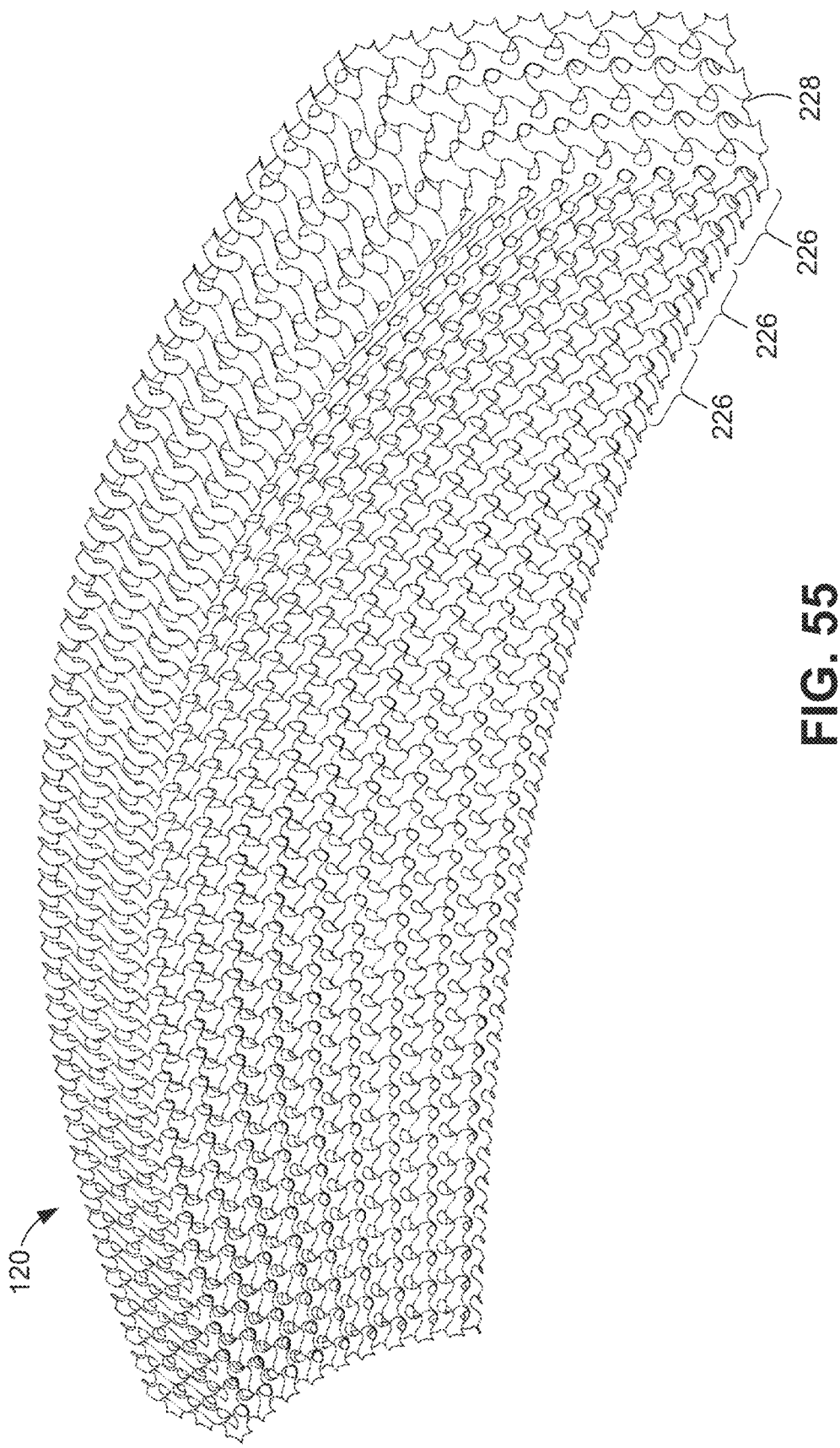
FIG. 55 is a perspective view of a sandwich panel mesh (shown without the face sheet meshes) comprised of shell elements, and generated using the reference unit cell mesh of FIG. 54, mapped onto the hexahedral elements respectively associated with the quadrilateral elements of the driver mesh of FIG. 32.
Figure 56:
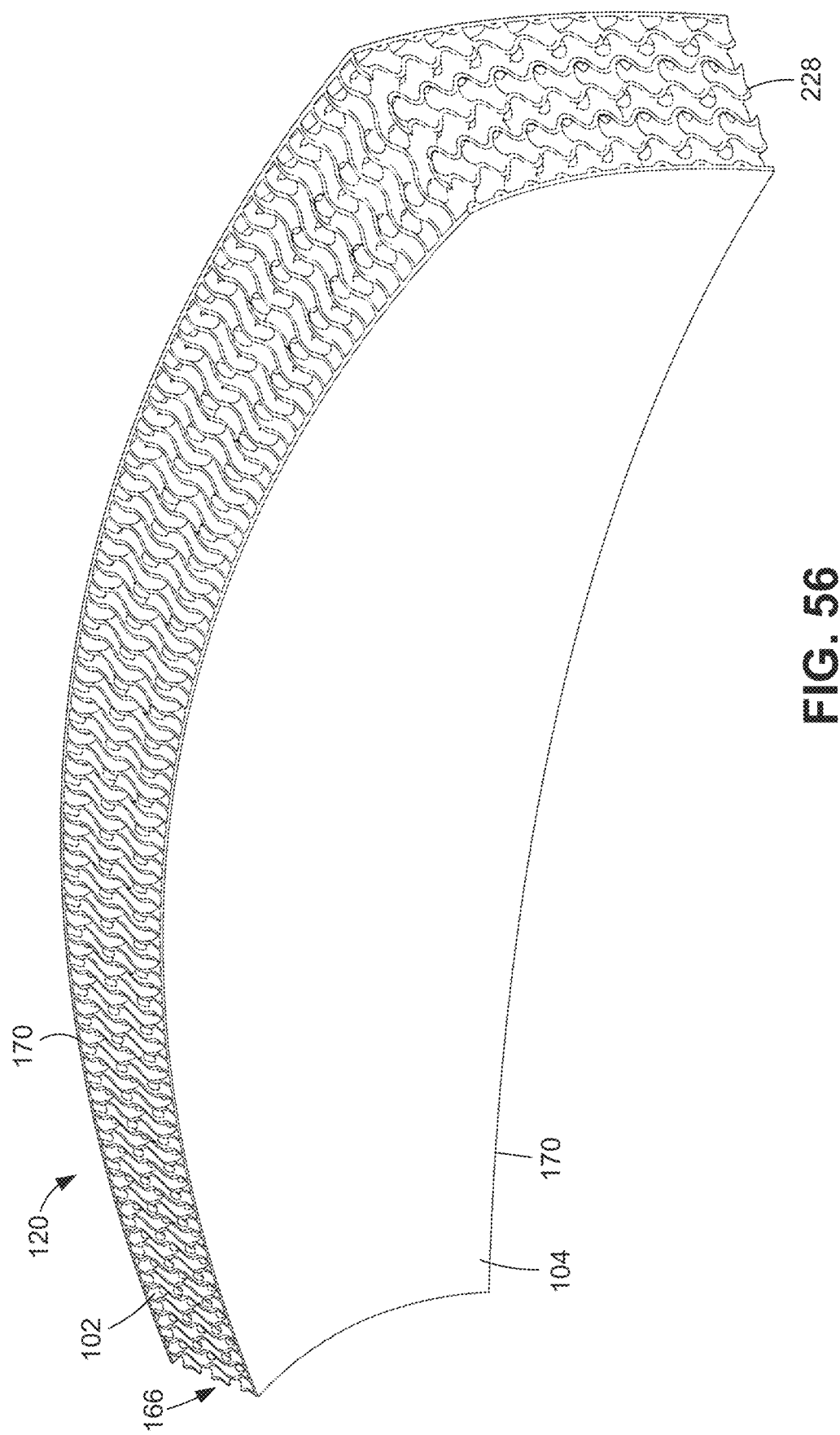
FIG. 56 is a perspective view of a sandwich panel mesh comprised of solid elements, and generated using a solid meshed version of the reference unit cell geometry of FIG. 53, mapped onto the hexahedral elements respectively associated with the quadrilateral elements of the driver mesh of FIG. 32.

FIG. 55 shows an example of a surface-based sandwich panel 120 produced by mapping the multi-layer unit cell mesh 228 of FIG. 54 onto a plurality of hexahedral elements 154 (not shown) respectively associated with the plurality of quadrilateral elements 148 contained in the driver mesh 142 of FIG. 32. In FIG. 55, the first and second face sheets 102, 104 have been omitted for clarity. FIG. 56 shows an example of a solid-based sandwich panel 120 produced by mapping a multi-layer unit cell mesh 228 comprised of solid elements (not shown) onto a plurality of hexahedral elements 154 (not shown) respectively associated with the plurality of quadrilateral elements 148 of the driver mesh 142 of FIG. 32. The sandwich panel 120 of FIG. 56 includes the panel infill geometry 166, and the panel face sheet geometry 170 of the first and second face sheets 102, 104. After completion of the stitching process to remove duplicate cell mesh nodes 304, the multi-layer unit cell meshes 228 in FIGS. 55-56 are interconnected due to their periodic nature.

Referring to FIGS. 57-59, shown in FIG. 57 is an example of a driver mesh 142 configured as an unstructured driver mesh 146. As mentioned above, the quadrilateral elements 148 of an unstructured driver mesh 146 are arranged in a pattern which cannot be mapped back into a square domain with rows and columns. In the example of FIG. 57, an unstructured driver mesh 146 is a convenient way of constructing a mesh on a panel mid-surface 126 containing a round hole. FIG. 58 shows an example of a Schwarz-P 214 configuration of a unit cell geometry 210. FIG. 59 shows a panel infill geometry 166 generated by mapping the unit cell geometry 210 of FIG. 58, as represented by the reference unit cell mesh 300 shown in FIG. 42, onto the unstructured driver mesh 146 of FIG. 57. For an unstructured driver mesh 146, the reference unit cell mesh 300 is limited to a unit cell geometry 210 in which the pattern of cell mesh nodes 304 on the 4 square faces 204 respectively at $\eta=1$, $\eta=-1$, $\xi=1$ and $\xi=-1$ are identical. Examples of this include a Schwarz-P 214 configuration (e.g., FIG. 38), the body-centered-cubic lattice 218 configuration (e.g., FIG. 50), and a waffle 222 configuration (e.g., FIG. 46).

Figure 61:
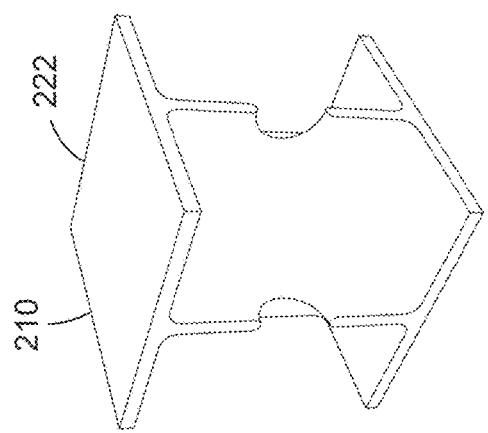
FIG. 61 is a perspective view of an example of a unit cell geometry configured as a waffle with center holes.
Figure 62:
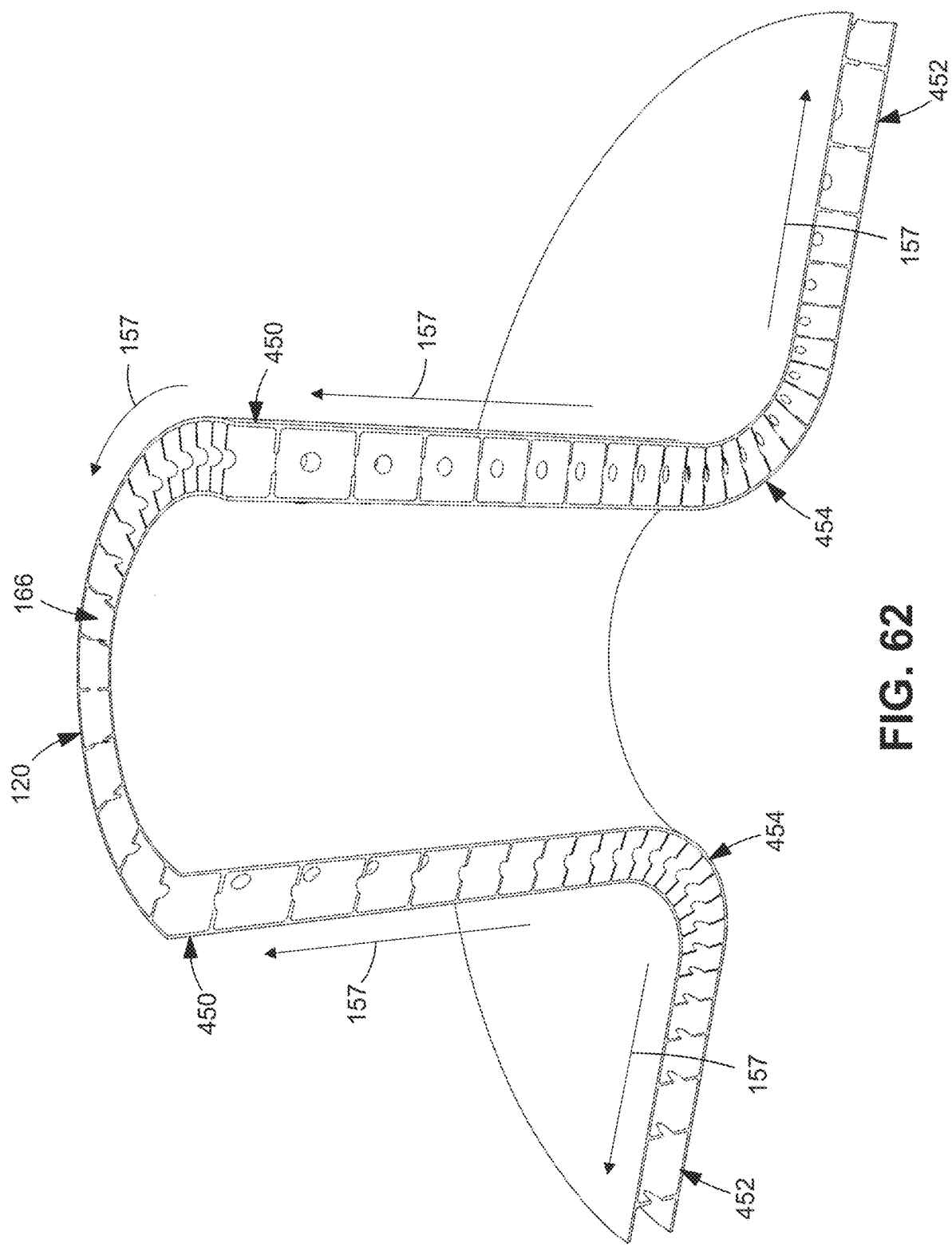
FIG. 62 is a perspective view of an example of a sandwich panel mesh comprised of solid elements, and generated using a solid meshed version (not shown) of the unit cell geometry of FIG. 61, mapped onto the hexahedral elements respectively associated with the quadrilateral elements of the spatially-graded driver mesh of FIG. 60.

Referring to FIGS. 60-62, shown in FIG. 60 is an example of a driver mesh 142 that is spatially graded. In a spatially-graded driver mesh 142, the density of the driver mesh nodes 156 is spatially graded over certain regions of the driver mesh 142. Increasing the node density locally, will locally reduce the size of the quadrilateral elements 148, while decreasing the node density locally, will locally increase the size of the quadrilateral elements 148. Increasing the node density may be desirable in regions that are subjected to high loads, and will result in a panel infill geometry 166 having a higher density of unit cell structures 206 in such regions. However, the node density may be locally adjusted (e.g., increased or decreased) based on any one of a variety of physical quantities (e.g., heat, electrical current, etc.) to which the sandwich panel 120 may be subjected.

In FIG. 60, the driver mesh 142 represents the panel mid-surface 126 of a sandwich panel 120 (FIG. 62) having a cylindrical portion 450 protruding upwardly from a circular flange 452 (i.e., base). However, in the example shown, only half of the driver mesh 142 and sandwich panel 120 are shown for clarity. The cylindrical portion 450 and the flange 452 are connected by a radius portion 454. The density of the driver mesh nodes 156 is higher in the radius portion 454 than in the cylindrical portion 450 or the flange 452. In FIG. 60, the node density gradually decreases in the direction of the arrows 157. For example, the node density gradually decreases in the direction toward the free end of the cylindrical portion 450. Likewise, the node density gradually decreases in the direction toward the outer perimeter of the circular flange 452. In addition, the node density on the right-hand side of the cylindrical portion 450 is higher than the node density on the left-hand side of the cylindrical portion 450.

FIG. 61 shows a unit cell geometry 210 having a unit infill geometry 310 configured as a waffle 222 with center holes. FIG. 62 is a cut-away view of a sandwich panel 120 having a panel infill geometry 166 generated by mapping the unit cell geometry 210 of FIG. 61 onto a plurality of hexahedral elements 154 (not shown) respectively associated with the plurality of quadrilateral elements 148 contained in the spatially-graded driver mesh 142 of FIG. 60. The increased node density in the radius portion 454 of the driver mesh 142 results in an increased density of unit cell structures 206 at that location in the sandwich panel 120. The locally increased density of unit cell structures 206 allows the radius portion 454 to handle higher loads at that location. Conversely, the decreasing node density of the driver mesh 142 (FIG. 60—along the direction of the arrows 157) in the cylindrical portion 450 and in the flange 452 results in a gradually decreasing density of unit cell structures 206 along the direction of the arrows 157 in FIG. 62. In addition, the higher node density on the right-hand side of the cylindrical portion 450 in FIG. 62 results in a higher density of unit cell structures 206 at that location than on the left-hand side of the cylindrical portion 450 in FIG. 62. That is to say, the density of unit cell structures 206 decreases in a circumferentially-counterclockwise direction, along the direction of the arrow 157. As shown in FIG. 62, despite the spatial grading, the sandwich panel 120 has a consistent topology at the infill/face sheet interfaces 110 between the panel infill structure 164 and the first and second face sheets 102, 104.

Referring to FIGS. 63-66, shown in FIG. 63 is an example of a constant-thickness sandwich panel 122. The constant-thickness sandwich panel 122 has a panel infill structure 164 comprised of unit cell structures 206 in which the unit infill geometry 310 has a Schwarz-P 214 configuration. The panel thickness t is defined by the spacing between the outermost surfaces of the first face sheet 102 and the second face sheet 104. In FIG. 63, the panel thickness t is uniform throughout all regions of the constant-thickness sandwich panel 122.

FIG. 64 shows an example of a variable-thickness sandwich panel 124, also having a panel infill structure 164 comprised of unit cell structures 206 in which the unit infill geometry 310 has a Schwarz-P 214 configuration. The first face sheet 102 and the second face sheet 104 are spaced apart from each other at a non-constant spacing. More specifically, the panel thickness t gradually tapers down from the center of the variable-thickness sandwich panel 124 toward each of the opposing ends of the variable-thickness sandwich panel 124. Although the panel infill geometry 166 of the sandwich panels in FIGS. 63-64 have the same number of unit cell structures 206, the unit cell structures 206 in FIG. 64 are of varying heights, in correspondence with the varying panel thickness t.

Figure 65:
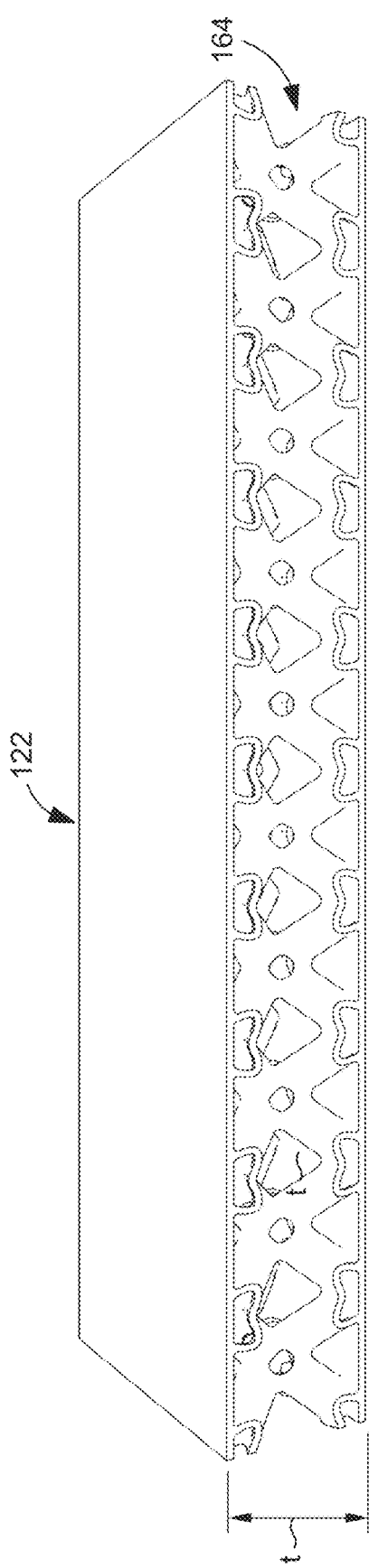
FIG. 65 is a perspective view of an example of a constant-thickness sandwich panel having a panel infill geometry based on a body-centered-cubic lattice configuration of the unit cell geometry.
Figure 66:
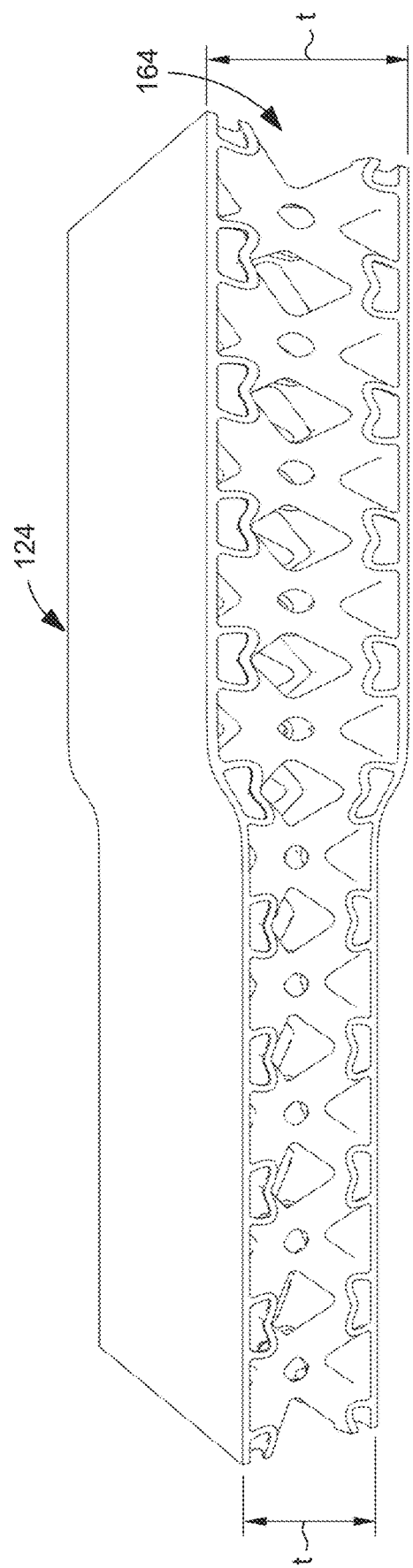
FIG. 66 is a perspective view of an example of a variable-thickness sandwich panel having a panel infill geometry based on the body-centered-cubic lattice configuration of the unit cell geometry.

Referring to FIG. 65-66, shown in FIG. 65 is another example of a constant-thickness sandwich panel 122. FIG. 66 shows a variable-thickness sandwich panel 124 in which the local panel thickness t is uniform along the right-hand side of the variable-thickness sandwich panel 124, and is uniform but reduced along the left-hand side of the variable-thickness sandwich panel 124, with a smooth transition of thickness between these two regions. In both examples, the panel infill structure 164 is comprised of unit cell structures 206 in which the unit infill geometry 310 has a body-centered-cubic lattice 218 configuration.

Figure 68:
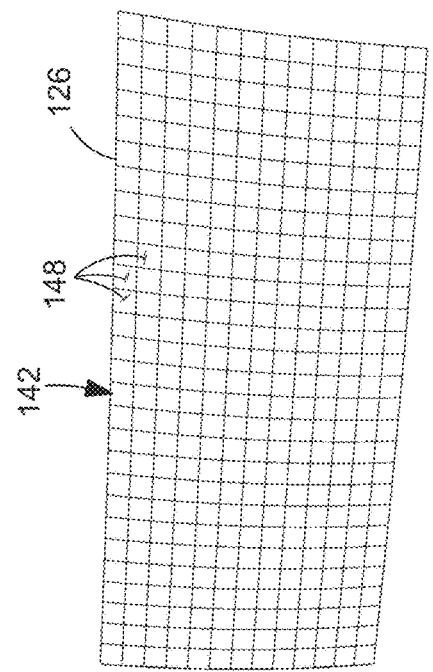
FIG. 68 is a perspective view of a driver mesh representing the panel mid-surface of a portion of the aircraft fuselage of FIG. 67.
Figure 67:
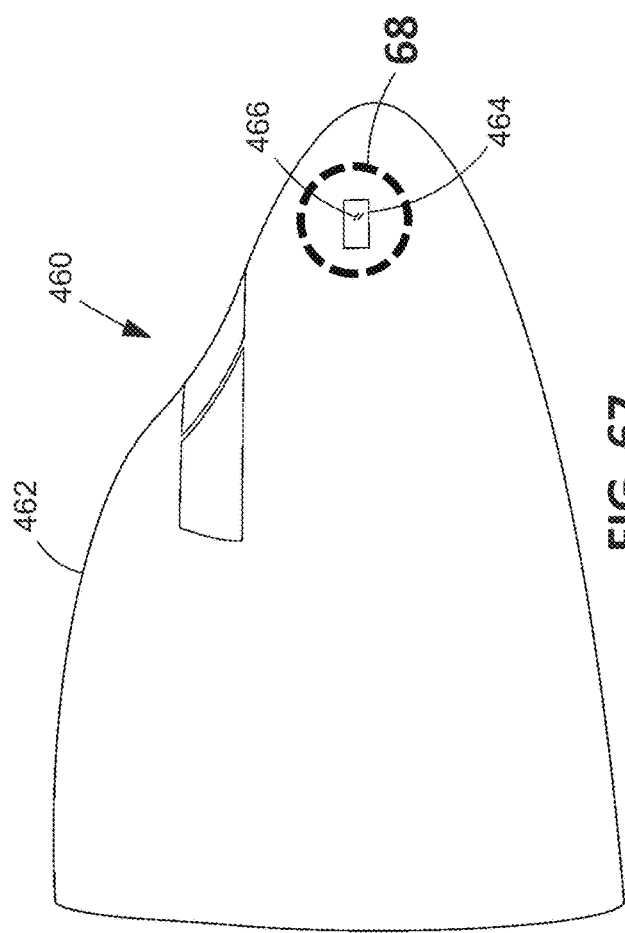
FIG. 67 is a side view of an example of a nose section of an aircraft fuselage.
Figure 69:
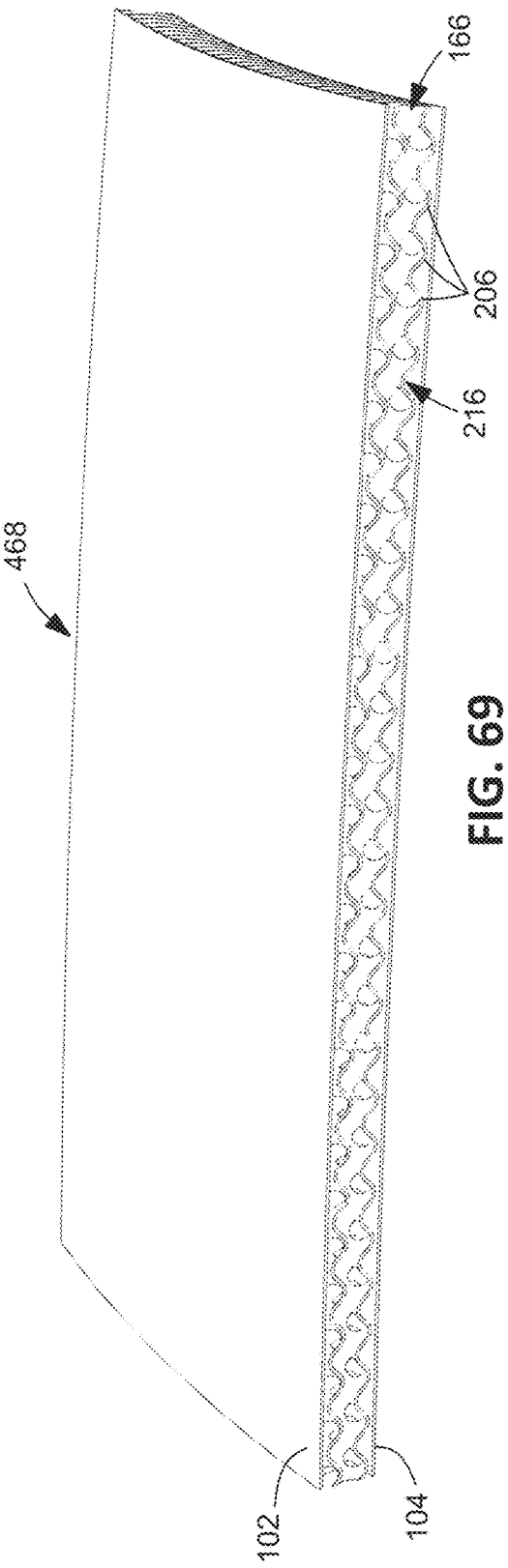
FIG. 69 is a perspective view of an example of a replacement sandwich panel for the aircraft fuselage, generated by mapping a unit cell geometry onto the hexahedral elements respectively associated with the quadrilateral elements of the driver mesh of FIG. 68.

Referring to FIGS. 67-69, shown in FIG. 67 is an example of a nose section of a fuselage 462 of an aircraft 460. The rectangular area identified by reference numeral 68 is a region of the fuselage 462 containing an existing panel 464 to be removed and replaced with a replacement sandwich panel 468 to be manufactured using the presently-disclosed method 700. In order to manufacture the replacement sandwich panel 468, it is necessary to provide a driver mesh 142 that represents the size, shape, and contour of the existing panel 464.

Referring briefly to FIG. 8, in the above-mentioned example, step 702 of providing the driver mesh 142 comprises acquiring a panel surface 466 of the existing panel 464. In one example, the panel surface 466 can be acquired by scanning the panel surface 466 using a laser scanner (not shown) or other suitable scanning device. After generating a point cloud (not shown) representing the panel surface 466, step 702 includes converting the point cloud into a surface digital representation (not shown) of the panel surface 466. The surface digital representation may be edited to remove extraneous features that are non-representative of the panel surface 466. After generating the surface digital representation, step 702 includes constructing a mid-surface digital representation (not shown) of the panel mid-surface 126 of the existing panel 464, based on the surface digital representation of the panel surface 466. The panel mid-surface 126 of the existing panel 464 may be determined by offsetting the surface digital representation by an amount equal to half the distance of the local panel thickness t (which may vary across the sandwich panel 120) of the existing panel 464. Step 702 then includes meshing the mid-surface digital representation of the panel mid-surface 126, to result in a driver mesh 142, as shown in FIG. 68. As described above, the driver mesh 142 is comprised of quadrilateral elements 148 arranged in the desired pattern.

Referring to FIG. 69, shown is an example of a replacement sandwich panel 468, having a panel infill geometry 166 generated by mapping a unit cell geometry 210 (not shown) onto the driver mesh 142 of FIG. 68. The replacement sandwich panel 468 includes first and second face sheets 102, 104, interconnected by the panel infill geometry 166. In the example shown, the panel infill geometry 166 is comprised of uniformly spaced unit cell structures 206, each having a gyroid 216 configuration. However, the panel infill geometry 166 of a replacement sandwich panel 468 can be generated by mapping any one of a variety of other configurations (e.g., honeycomb, waffle, Schwarz-P, body-centered-cubic, etc.) of unit cell geometries 210 onto the driver mesh 142. Additionally, the panel infill geometry 166 of a replacement sandwich panel 468 can be spatially graded as necessary for strength purposes or for other reasons.

Referring now to FIG. 70, the above-described methods 700, 800, and 900, in whole or in part, may be performed in a computer-implemented process, such as on a processor-based system 500 or other suitable computer system. The processor-based system 500 is configured to perform computer readable program instructions 530. The computer readable program instructions 530 are provided to, or are loaded onto, the processor-based system 500 in order to implement the above-described operations or steps of methods 700, 800, and 900. In a non-limiting example, the processor-based system 500 and/or the computer readable program instructions 530 generate a panel infill geometry 166 for a sandwich panel 120.

The block diagram of FIG. 70 illustrates the processor-based system 500 in an advantageous example for generating a panel infill geometry 166 for a sandwich panel 120. The processor-based system 500 includes a data communication path 502 (e.g., a data link) to communicatively couple one or more components, to facilitate transfer of data between such components. The communication path 502 comprises one or more data buses, or any other suitable communication path 502 that facilitates the transfer of data between the components and devices of the processor-based system 500. In a non-limiting example, the components include one or more of a processor 504, a memory device 506, a non-volatile storage device 508, a communications device 512, an input/output device 510, a display device 514, a unit cell mapping module 516, a panel export module 518, and an additive manufacturing program generator 520.

The memory device 506 is configured to store one or more driver meshes 142, each representing a panel mid-surface 126 of a sandwich panel 120. As described above, each driver mesh 142 is comprised of a plurality of quadrilateral elements 148. The quadrilateral elements 148 are linear quadrilateral elements 150, or quadratic quadrilateral elements 152, as described above. Each driver mesh 142 is stored either as a structured driver mesh 144, or as an unstructured driver mesh 146, as is also described above. In some examples, the driver mesh 142 is spatially graded over at least one region of the panel mid-surface 126, to either refine or coarsen the driver mesh 142 in such regions.

In addition to storing one or more driver meshes 142, the memory device 506 is configured to store one or more reference unit cell meshes 300, each having a different unit cell geometry 210, and each configured to fit exactly within a cube 202, as described above. Examples of configurations of the reference unit cell meshes 300 include, but are not limited to, Schwarz-P 214 (with or without holes), gyroid 216, body-centered-cubic lattice 218 (with or without holes), honeycomb 220 (with or without holes), or waffle 222 (with or without holes). The configurations of reference unit cell mesh 300 are periodic with respect to at least the η and ξ directions of the isoparametric cube 202. The periodic nature of a reference unit cell mesh 300, together with the above-described stitching operation, enables adjacent mapped unit cell meshes 302 to be connected to each other, to thereby result in a continuous sandwich panel mesh 132. Some configurations of the reference unit cell mesh 300 can include one or more cell branches 224, each of which terminates at a square face 204 of the cube 202. When mapped onto the hexahedral elements 154 (e.g., FIG. 17) associated with the quadrilateral elements 148 of a driver mesh 142, and after being stitched together, the cell branches 224 of adjacent mapped unit cell meshes 302 are interconnected to form a continuous sandwich panel mesh 132 (i.e., a stitched mesh 130).

Referring still to FIG. 70, the processor-based system 500 includes a unit cell mapping module 516 configured to map a plurality of the reference unit cell meshes 300 respectively onto a plurality of hexahedral elements 154 respectively associated with the plurality of quadrilateral elements 148. The unit cell mapping module 516 performs the above-described mapping operation by applying basis functions to the driver mesh nodes 156 of the plurality of quadrilateral elements 148 in a manner causing adjustment of the size and shape of the plurality of reference unit cell meshes 300 to fit respectively within the plurality of hexahedral elements 154, and resulting in a plurality of mapped unit cell meshes 302 collectively forming a panel infill geometry 166 interconnecting a first face sheet 102 to a second face sheet 104. The unit cell mapping module 516 maps the reference unit cell meshes 300 using either linear basis functions or quadratic basis functions, depending on whether the driver mesh 142 is made up of linear quadrilateral elements 150 or quadratic quadrilateral elements 152, as described above.

FIG. 71 shows a non-limiting example of a user interface 534 of the processor-based system 500. In the example shown, the user interface 534 provides the ability to load a "Driver Mesh File," which defines a driver mesh 142 of quadrilateral elements 148. In addition, the user interface 534 provides the ability to select whether a driver mesh 142 is provided with linear quadrilateral elements 150 or quadratic quadrilateral elements 152. In addition to loading a driver mesh 142, the user interface 534 provides the ability to select a "Cell Geometry" from among a plurality of different configurations of unit cell geometries 210 including, but not limited to, the above-described Schwarz-P, gyroid, body-centered-cubic lattice, honeycomb, waffle configurations, and may also include multi-layer unit cell geometries.

Referring still to FIG. 71, the user interface 534 provides the ability to specify the panel thickness t, and optionally to generate some combination of the panel infill geometry 166, the top face sheet geometry 170, and the bottom face sheet geometry 170, in lieu of generating the full sandwich panel geometry. The user interface 534 also provides a means for controlling the alignment of the orientation of a unit cell geometry 210 with respect to a given quadrilateral element 148. For example, in at least one configuration, the user can specify alignment of the η axis or ξ axis of the reference unit cell mesh 300 with the x, y or z axis of the real space 140. In at least one example of the user interface 534, the user can specify alignment of the η axis or ξ axis with the vectoral average of the first and third edges 162, or the vectoral average of the second and forth edges 162 of the quadrilateral element 148 of the driver mesh 142 (e.g., FIG. 10). The above-noted selections are processed by the unit cell mapping module 516.

After making the above-described selections, a user presses a button (or functional equivalent) on the user interface 534, causing the processor-based system 500 to generate a sandwich panel mesh 132 (i.e., a stitched mesh 130) having a panel infill geometry 166 interconnecting first and second face sheets 102, 104. The processor-based system 500 is configured to convert the sandwich panel mesh 132 into a panel digital representation of the sandwich panel 120. In some examples, the processor-based system includes an additive manufacturing program generator 520 (FIG. 70). The additive manufacturing program generator 520 is configured to use the panel digital representation of the sandwich panel 120 to generate an additive manufacturing program 532 (i.e., a software program). The additive manufacturing program 532 is outputted to an additive manufacturing apparatus 400 (e.g., FIGS. 30-31) configured to manufacture a physical version of the sandwich panel 120, as described above.

Referring still to FIG. 70, in some examples, the processor-based system 500 includes a panel export module 518 configured to generate a digital representation of the sandwich panel mesh 132 (i.e., a stitched mesh 130) as an export file that is suitable as an input file that can be read by a numerical analysis program. Such a numerical analysis program is configured to perform a simulation on the sandwich panel mesh 132. For example, the simulation can determine the distribution of a physical quantity (e.g., displacement, strain, pressure, temperature, etc.) across the sandwich panel mesh 132 in response to the application of a given combination of loads (e.g., mechanical load, thermal load, etc.), constraints (e.g., regions of the sandwich panel 120 that are restrained in some manner, and/or subjected to contact with other bodies), and material properties (e.g., mechanical properties, thermal properties, etc.). In at least one example, the numerical analysis performed on the sandwich panel mesh 132 is a structural simulation employing the finite element method, such as simulating the stress and deflection of the sandwich panel 120 when loaded during a 3-point bending test.

The display device 514 is optionally employed to graphically display any one of the driver meshes 142 and/or reference unit cell meshes 300 stored in the memory device 506. In addition, the display device 514 is configured to graphically display the sandwich panel mesh 132 resulting from mapping a reference unit cell mesh 300 onto a plurality of hexahedral elements 154 respectively associated with the plurality of quadrilateral elements 148 contained in the driver mesh 142. The display device 514 receives the above-noted data from one or more of the corresponding components of the processor-based system 500 via the communication path 502.

The processor-based system 500 includes the processor 504 for executing instructions of computer readable program instructions 530 installed into the memory device 506. Alternatively, the processor-based system 500 comprises a multi-processor core having two or more integrated processor cores. Even further, the processor 504 may comprise a main processor and one or more secondary processors integrated on a chip. The processor 504 may also comprise a multi-processor system having a plurality of similarly configured processors.

Referring still to FIG. 70, the processor-based system 500 includes the memory device 506, which may comprise one or more volatile or non-volatile storage devices 508. However, the memory device 506 can comprise any hardware device for storing data. For example, the memory device 506 can comprise a random access memory or a cache of an interface and/or integrated memory controller hub included in the communication path 502. The memory device 506 can permanently and/or temporarily store any one of a variety of different types of data, computer readable code or program instructions, or any other type of information. The storage device 508 can be provided in a variety of configurations including, but not limited to, a flash memory device, a hard drive, an optical disk, a hard disk, a magnetic tape or any other suitable example for long-term storage. In addition, the storage device 508 can comprise a removable device such as a removable hard drive.

The processor-based system 500 can additionally include one or more of the input/output devices 510 to facilitate the transfer of data between components connected to the processor-based system 500. An input/output device 510 can be directly and/or indirectly coupled to the processor-based system 500. The input/output device 510 facilitates user-input by means of a peripheral device such as a keyboard, a mouse, a joystick, a touch screen, and any other suitable device for inputting data to the processor-based system 500. The input/output device 510 can further include an output device for transferring data representative of the output of the processor-based system 500. For example the input/output device 510 can comprise a display device 514 such as a computer monitor or computer screen for displaying results of data processed by the processor-based system 500. The input/output device 510 can optionally include a printer or fax machine for printing a hardcopy of information processed by the processor-based system 500.

Referring still to FIG. 70, the processor-based system 500 can include one or more communications devices 512 to facilitate communication of the processor-based system 500 within a computer network and/or with other processor-based systems. Communication of the processor-based system 500 with a computer network or with other processor-based systems can be by wireless means and/or by hardwire connection. For example, the communications device 512 can comprise a network interface controller to enable wireless or cable communication between the processor-based system 500 and a computer network. The communications device 512 can also comprise a modem and/or a network adapter, or any one of a variety of alternative devices for transmitting and receiving data.

One or more of the operations of the above-described methods 700, 800, 900 are performed by the processor 504 and/or by one or more of the unit cell mapping module 516, the panel export module 518, and/or the additive manufacturing program generator 520, using the computer readable program instructions 530. The computer readable program instructions 530 can comprise program code, which can include computer usable program code and computer readable program code. The computer readable program instructions 530 are read and executed by the processor 504. The computer readable program instructions 530 enable the processor 504 to perform one or more operations of the above-described examples associated with generating the panel infill geometry 166 of a sandwich panel 120.

Referring still to FIG. 70, the computer readable program instructions 530 include operating instructions for the processor-based system 500, and further include applications and programs. The computer readable program instructions 530 can be contained within and/or loaded onto one or more of a memory device 506 and/or a storage device 508 for execution by the processor 504 and/or by the unit cell mapping module 516, the panel export module 518, and/or the additive manufacturing program generator 520. As indicated above, the memory device 506 and/or storage device 508 can be communicatively coupled to one or more of the remaining components illustrated in FIG. 70 through the communication path 502.

The computer readable program instructions 530 can be contained on tangible or non-tangible, transitory or non-transitory computer readable media 524 and which can be loaded onto or transferred to the processor-based system 500 for execution by the processor 504. The computer readable program instructions 530 and the computer readable media 524 comprise a computer program product 522. In an example, the computer readable media 524 can comprise computer readable storage media 526 and/or computer readable signal media 528.

The computer readable storage media 526 can comprise a variety of different examples including, but not limited to, optical disks and magnetic disks that may be loaded into a drive, a flash memory device, or other storage device or hardware for transfer of data onto a storage device such as a hard drive. The computer readable storage media 526 can be non-removably installed on the processor-based system 500. The computer readable storage media 526 can comprise any suitable storage media including, without limitation, a semiconductor system or a propagation medium. In this regard, the computer readable storage media 526 can comprise electronic media, magnetic media, optical media, electromagnetic media, and infrared media. For example, the computer readable storage media 526 can comprise magnetic tape, a computer diskette, random access memory, and read-only memory. Non-limiting examples of optical disks include compact disks—read only memory, compact disks—read/write, and digital video disks (i.e., digital versatile disks).

The computer readable signal media 528 can contain the computer readable program instructions 530, and can be provided in a variety of data signal configurations including, but not limited to, an electromagnetic signal and an optical signal. Such data signals can be transmitted by any suitable communications link including by wireless or hardwire means. For example, the hardwire means may comprise an optical fiber cable, a coaxial cable, a signal wire, and any other suitable means for transmitting the data by wireless or by physical means.

Referring still to FIG. 70, the computer readable signal media 528 can facilitate the downloading of the computer readable program instructions 530 to the non-volatile storage or other suitable storage or memory device for use within processor-based system 500. For example, the computer readable program instructions 530 contained within the computer readable storage media 526 can be downloaded to the processor-based system 500 over a computer network from a server or a client computer of another system.

Any one of a variety of different examples of the processor-based system 500 can be implemented using any hardware device or system capable of executing the computer readable program instructions 530. For example, the processor 504 can comprise a hardware unit configured for performing one or more particular functions wherein the computer readable program instructions 530 for performing the functions are pre-loaded into the memory device 506.

In an example, the processor 504 can comprise an application specific integrated circuit, a programmable logic device, or any other hardware device configured to perform one or more specific functions or operations. For example, a programmable logic device may be temporarily or permanently programmed to perform one or more of the operations related to generating the panel infill geometry 166 of a sandwich panel 120. The programmable logic device can comprise a programmable logic array, programmable array logic, a field programmable logic array, and a field programmable gate array and any other suitable logic device, without limitation. In an example, the computer readable program instructions 530 can be operated by the processor 504 and/or by other devices, including one or more hardware units in communication with the processor 504. Certain portions of the computer readable program instructions 530 can be run by the one or more hardware units.

Many modifications and other versions and examples of the disclosure will come to mind to one skilled in the art to which this disclosure pertains having the benefit of the teachings presented in the foregoing descriptions and the associated drawings. The versions and examples described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A method of generating a panel infill geometry of a sandwich panel, comprising:

accessing, through a user interface of a computer, a driver mesh file stored in a memory device of the computer, the driver mesh file comprising a three-dimensional driver mesh representing a panel mid-surface of a sandwich panel that is non-planar, and the three-dimensional driver mesh is comprised of a plurality of quadrilateral elements;

accessing, through the user interface, a unit cell geometry file stored in the memory device, the unit cell geometry file comprising a three-dimensional reference unit cell mesh configured to fit exactly within a three-dimensional cube, and the three-dimensional reference unit cell mesh is comprised of a three-dimensional unit infill mesh interconnecting a pair of unit face sheet meshes at opposite ends of the three-dimensional unit infill mesh, and the three-dimensional unit infill mesh and the unit face sheet meshes are made up of a plurality of cell mesh elements and associated cell mesh nodes; and causing a processor of the computer to perform the following, in response to a command received through the user interface:

mapping the cell mesh nodes of a plurality of the three-dimensional reference unit cell meshes respectively onto a plurality of three-dimensional hexahedral elements respectively associated with the plurality of quadrilateral elements, through the use of basis functions defined on each of the plurality of quadrilateral elements in a manner causing adjustment of a size and shape of the plurality of the three-dimensional reference unit cell meshes to conform respectively to the plurality of three-dimensional hexahedral elements in a manner forming a plurality of mapped three-dimensional unit cell meshes collectively forming a panel infill mesh having a panel infill geometry interconnecting a pair of panel face sheet meshes and which is non-planar in a static state and having a consistent topology at each interface location on the infill geometry where the plurality of mapped three-dimensional unit cell meshes are connected to the pair of panel face sheet meshes, and all the interface locations where the mapped three-dimensional unit cell meshes transition into the panel face sheet meshes have a footprint of the same shape, regardless of the physical location of the interface location on the sandwich panel;

stitching together the plurality of mapped three-dimensional unit cell meshes to form a stitched mesh, by checking pairs of cell mesh nodes for duplicates, deleting one of the duplicates, and updating cell information to refer to the cell mesh node that is retained; and constructing a panel digital representation of the sandwich panel based on the stitched mesh and which is non-planar in the static state and comprising the pair of panel face sheets interconnected by the panel infill geometry having the consistent topology.

2. The method of claim 1, wherein the three-dimensional reference unit cell mesh is a multi-layer unit cell mesh comprised of:

two or more layers of three-dimensional unit infill meshes stacked on top of each other; and a pair of unit face sheet meshes respectively located on opposite ends of the multi-layer three-dimensional unit cell mesh.

3. The method of claim 1, further comprising generating the three-dimensional reference unit cell mesh by performing one of the following:

constructing the three-dimensional reference unit cell mesh as one or more trimmed parametric surfaces, followed by meshing the one or more trimmed parametric surfaces, to thereby generate a three-dimensional reference unit cell mesh comprised of shell elements;

constructing the three-dimensional reference unit cell mesh as a solid structure represented by one or more trimmed parametric surfaces enclosing a volume, followed by meshing the volume, to thereby generate a three-dimensional reference unit cell mesh comprised of solid elements.

4. The method of claim 1, further comprising:
constructing the three-dimensional reference unit cell mesh to contain infill geometry that is periodic with respect to two or more principal directions of the three-dimensional cube.

5. The method of claim 1, wherein mapping a plurality of three-dimensional reference unit cell meshes onto the three-dimensional driver mesh comprises one of the following:
using linear basis functions to map the plurality of three-dimensional reference unit cell meshes onto a plurality of three-dimensional hexahedral elements respectively associated with the plurality of quadrilateral elements of the three-dimensional driver mesh;
using quadratic basis functions to map the plurality of three-dimensional reference unit cell meshes onto a plurality of three-dimensional hexahedral elements respectively associated with the plurality of quadrilateral elements of the three-dimensional driver mesh.

6. The method of claim 1, further comprising generating the three-dimensional driver mesh and generating the three-dimensional reference unit cell mesh by performing one of the following two scenarios:
generating the three-dimensional driver mesh as a structured three-dimensional driver mesh, and generating the three-dimensional reference unit cell mesh to have a unit cell geometry of one of the following configurations: Schwarz-P, gyroid, body-centered-cubic lattice, honeycomb, or waffle;
generating the three-dimensional driver mesh as an unstructured three-dimensional driver mesh, and generating the three-dimensional reference unit cell mesh to have a unit cell geometry of one of the following configurations: Schwarz-P, body-centered-cubic lattice, or waffle.

7. The method of claim 1, wherein:
the three-dimensional driver mesh has a density that is spatially graded over at least one region of the mid-surface.

8. The method of claim 1, further comprising generating the three-dimensional driver mesh by performing one of the following:
acquiring a panel surface of an existing panel, to result in a point cloud representing the panel surface;
converting the point cloud into a digital representation of the panel surface;
constructing a digital representation of the mid-surface of the existing panel, based on the digital representation of the panel surface; and
meshing the digital representation of the mid-surface, thereby obtaining the three-dimensional driver mesh.

9. A processor-based system configured to perform computer readable program instructions for generating a panel geometry of a sandwich panel, comprising:
a user interface;
a memory device containing the computer readable program instructions and configured to store:
a driver mesh file, accessible through the user interface, and comprising a three-dimensional driver mesh representing a panel mid-surface of a sandwich panel that is non-planar, the three-dimensional driver mesh is comprised of a plurality of quadrilateral elements;
a unit cell geometry file, accessible through the user interface, and comprising a three-dimensional reference unit cell mesh configured to fit exactly within a three-dimensional cube, the three-dimensional reference unit cell mesh is comprised of a three-dimensional unit infill mesh interconnecting a pair of unit face sheet meshes, and the three-dimensional unit infill mesh and the unit face sheet meshes are made up of a plurality of cell mesh elements and associated cell mesh nodes; and
a processor configured to execute the computer readable program instructions in response to a command received through the user interface, and execution of the instructions causes the processor to perform functions comprising:
mapping the cell mesh nodes of a plurality of the three-dimensional reference unit cell meshes respectively onto a plurality of three-dimensional hexahedral elements respectively associated with the plurality of quadrilateral elements, through the use of basis functions defined on each of the plurality of quadrilateral elements in a manner causing adjustment of a size and shape of the plurality of the three-dimensional reference unit cell meshes to conform respectively to the plurality of three-dimensional hexahedral elements in a manner forming a plurality of mapped three-dimensional unit cell meshes collectively forming a panel infill mesh having a panel infill geometry interconnecting a pair of panel face sheet meshes and which is non-planar in a static state and having a consistent topology at each interface location on the infill geometry where the plurality of mapped three-dimensional unit cell meshes are connected to the pair of panel face sheet meshes, and all the interface locations where the mapped three-dimensional unit cell meshes transition into the panel face sheet meshes have a footprint of the same shape, regardless of the physical location of the interface location on the sandwich panel;
stitching together the plurality of mapped three-dimensional unit cell meshes to form a stitched mesh, by checking pairs of cell mesh nodes for duplicates, deleting one of the duplicates, and updating cell information to refer to the cell mesh node that is retained;
constructing a panel digital representation of the sandwich panel based on the stitched mesh is non-planar in the static state.

10. The processor-based system of claim 9, wherein:
the three-dimensional reference unit cell mesh is periodic with respect to two or more principal directions of the three-dimensional cube.

11. The processor-based system of claim 9, wherein:
the processor is configured to map the plurality of the three-dimensional reference unit cell meshes onto a plurality of three-dimensional hexahedral elements respectively associated with the plurality of quadrilateral elements using one of linear basis functions or quadratic basis functions.

12. The processor-based system of claim 9, wherein the three-dimensional driver mesh and the three-dimensional reference unit cell mesh are stored according to one of the following two scenarios:
the three-dimensional driver mesh is stored as a structured three-dimensional driver mesh, and the three-dimensional reference unit cell mesh is stored as a unit cell geometry having one of the following configurations: Schwarz-P, gyroid, body-centered-cubic lattice, honeycomb, or waffle;

the three-dimensional driver mesh is stored as an unstructured three-dimensional driver mesh, and the three-dimensional reference unit cell mesh is stored as a unit cell geometry having one of the following configurations: Schwarz-P, body-centered-cubic lattice, or waffle.

13. The processor-based system of claim 9, further comprising:
a panel export module configured to export an input file which can be read by a numerical analysis program configured to perform a simulation on a sandwich panel mesh represented by a pair of face sheets and the panel infill geometry, each defined by a plurality of shell elements or solid elements.

14. The processor-based system of claim 9, wherein the three-dimensional reference unit cell mesh is a multi-layer unit cell mesh comprised of:
two or more layers of three-dimensional unit infill meshes stacked on top of each other; and
a pair of unit face sheet meshes respectively located on opposite ends of the multi-layer unit cell mesh.

15. The processor-based system of claim 9, wherein:
the processor is configured to generate the three-dimensional reference unit cell mesh by constructing the three-dimensional reference unit cell mesh as one or more trimmed parametric surfaces, followed by meshing the one or more trimmed parametric surfaces, to thereby result in the three-dimensional reference unit cell mesh comprised of shell elements.

16. The processor-based system of claim 9, wherein:
the processor is configured to generate the three-dimensional reference unit cell mesh by constructing the three-dimensional reference unit cell mesh as a solid structure represented by one or more trimmed parametric surfaces enclosing a volume, followed by meshing the volume, to thereby result in the three-dimensional reference unit cell mesh composed of solid elements.

17. The processor-based system of claim 9, wherein:
the three-dimensional driver mesh has a density that is spatially graded over at least one region of the mid-surface.

18. The processor-based system of claim 9, wherein the processor is configured to:
receive a point cloud representing a panel surface of an existing panel;
convert the point cloud into a digital representation of the panel surface;
construct a digital representation of the mid-surface of the existing panel, based on the digital representation of the panel surface; and
mesh the digital representation of the mid-surface, thereby obtaining the three-dimensional driver mesh.

19. The processor-based system of claim 9, wherein:
the three-dimensional reference unit cell mesh has cell branches, each of which terminates at a square face of the cube.

20. The processor-based system of claim 9, where
the user interface is configured to allow for specifying a local panel thickness of the sandwich, defined as a total thickness of the sandwich panel including the pair of face sheets and the panel infill geometry.

21. The processor-based system of claim 9, wherein:
the user interface is configured to allow accessing and selecting the driver mesh file from a plurality of driver mesh files stored in the memory.

22. The processor-based system of claim 9, wherein:
the user interface is configured to allow accessing and selecting the unit cell geometry file from a plurality unit cell geometry files stored in the memory.

\* \* \* \* \*